US012472611B2

(12) United States Patent
Chung

(10) Patent No.: US 12,472,611 B2
(45) Date of Patent: Nov. 18, 2025

(54) PEG DRIVER

(71) Applicant: TECHTRONIC CORDLESS GP, Anderson, SC (US)

(72) Inventor: Koon For Chung, Hong Kong (CN)

(73) Assignee: Techtronic Cordless GP, Anderson, SC (US)

( * ) Notice: Subject to any disclaimer, the term of this patent is extended or adjusted under 35 U.S.C. 154(b) by 280 days.

(21) Appl. No.: 18/045,775

(22) Filed: Oct. 11, 2022

(65) Prior Publication Data

US 2023/0383580 A1 Nov. 30, 2023

Related U.S. Application Data

(60) Provisional application No. 63/347,405, filed on May 31, 2022.

(51) Int. Cl.

*B25C 1/02* (2006.01)
*B25C 3/00* (2006.01)
*B25C 5/11* (2006.01)

(52) U.S. Cl.

CPC ................ *B25C 3/002* (2013.01); *B25C 1/02* (2013.01); *B25C 3/004* (2013.01); *B25C 5/11* (2013.01)

(58) Field of Classification Search

None
See application file for complete search history.

(56) References Cited

U.S. PATENT DOCUMENTS 371,863 A * 10/1887 Viser .......................... B25C 5/11 227/129
599,486 A * 2/1898 Allshouse ................. B25C 5/11 227/129
923,312 A 6/1909 Alexanderson
2,511,124 A 6/1950 Phelps
2,539,779 A 1/1951 Grosso
2,701,942 A 2/1955 Caldwell, Jr. et al.
(Continued)

FOREIGN PATENT DOCUMENTS

AU 2006100911 A4 11/2006
AU 2011239326 A1 11/2011
(Continued)

OTHER PUBLICATIONS

US 8,272,092 B2, 09/2012, Schnittman et al. (withdrawn)
(Continued)

*Primary Examiner* — Tanzim Imam
(74) *Attorney, Agent, or Firm* — Michael Best & Friedrich LLP

(57) ABSTRACT

A peg driver for use with a peg has a base, a driver shaft, and a driver arm. The base is at least partially defined by a driver channel having an outlet and defines a channel axis. The driver shaft has a first end and a second end. The driver shaft defines a shaft channel open to the driver channel. The first end of the driver shaft is at least partially positioned within and moveable axially along the driver shaft between an at rest position and an actuated position. The driver arm is moveable with respect to the driver shaft between a retracted position and a deployed position. The driver arm is configured to move from the retracted position to the deployed position as the driver shaft moves from the rest position to the actuated position.

20 Claims, 45 Drawing Sheets

(56) References Cited

U.S. PATENT DOCUMENTS

| | | | |
|---|---|---|---|
| 2,751,030 A | 6/1956 | Null | |
| 2,914,902 A | 12/1959 | Beymer | |
| 3,057,140 A | 10/1962 | Amos et al. | |
| 3,147,662 A | 9/1964 | Snook | |
| 3,311,738 A | 3/1967 | Makow | |
| 3,393,598 A | 7/1968 | Bettinger | |
| 3,500,622 A | 3/1970 | Bowen | |
| 3,570,227 A | 3/1971 | Bellinger | |
| 3,612,574 A | 10/1971 | Klopfer et al. | |
| 3,680,295 A | 8/1972 | Rutherford | |
| 3,776,327 A | 12/1973 | Klopfer et al. | |
| 4,065,913 A | 1/1978 | Fisher et al. | |
| 4,126,990 A | 11/1978 | Fisher et al. | |
| 4,126,991 A | 11/1978 | Gobin et al. | |
| 4,165,597 A | 8/1979 | Scanland et al. | |
| 4,205,510 A | 6/1980 | Raniero | |
| 4,268,964 A | 5/1981 | Moore | |
| 4,306,375 A | 12/1981 | Goldfarb et al. | |
| 4,333,202 A | 6/1982 | Block | |
| 4,351,132 A | 9/1982 | Molin | |
| 4,468,884 A | 9/1984 | Goldfarb et al. | |
| 4,492,058 A | 1/1985 | Goldfarb et al. | |
| 4,511,343 A | 4/1985 | Goldfarb et al. | |
| 4,522,606 A | 6/1985 | Goldfarb et al. | |
| 4,547,166 A | 10/1985 | Goldfarb et al. | |
| 4,591,347 A | 5/1986 | Goldfarb et al. | |
| 4,596,412 A | 6/1986 | Everett et al. | |
| 4,627,563 A | 12/1986 | Meyer | |
| 4,652,247 A | 3/1987 | Goldfarb et al. | |
| 4,673,370 A | 6/1987 | Goldfarb et al. | |
| 4,693,656 A | 9/1987 | Guthrie | |
| 4,706,864 A | 11/1987 | Jacobsen et al. | |
| 4,787,794 A | 11/1988 | Guthrie | |
| 4,826,066 A | 5/1989 | Koester et al. | |
| 4,902,260 A | 2/1990 | Im | |
| 4,916,813 A | 4/1990 | Elia | |
| 4,951,985 A | 8/1990 | Pong et al. | |
| 4,958,068 A | 9/1990 | Pong et al. | |
| 4,962,453 A | 10/1990 | Pong et al. | |
| 4,964,265 A | 10/1990 | Young | |
| 4,968,878 A | 11/1990 | Pong et al. | |
| 5,024,728 A | 6/1991 | Morita et al. | |
| 5,025,969 A | 6/1991 | Koester et al. | |
| 5,323,593 A | 6/1994 | Cline et al. | |
| 5,363,633 A | 11/1994 | Masaru | |
| 5,402,110 A | 3/1995 | Oliver et al. | |
| 5,406,778 A | 4/1995 | Lamb et al. | |
| 5,507,137 A | 4/1996 | Norris | |
| 5,540,037 A | 7/1996 | Lamb et al. | |
| 5,548,278 A | 8/1996 | Oliver et al. | |
| 5,553,445 A | 9/1996 | Lamb et al. | |
| 5,561,972 A | 10/1996 | Rolfe | |
| 5,572,856 A | 11/1996 | Ku | |
| 5,577,868 A | 11/1996 | Chen | |
| 5,703,569 A | 12/1997 | Oliver et al. | |
| 5,785,480 A | 7/1998 | Difeo | |
| 5,821,731 A | 10/1998 | Kuki et al. | |
| 5,850,135 A | 12/1998 | Kuki et al. | |
| 5,916,111 A | 6/1999 | Colens | |
| 5,942,869 A | 8/1999 | Katou et al. | |
| 6,076,025 A | 6/2000 | Ueno et al. | |
| 6,101,795 A | 8/2000 | Diekhans | |
| 6,212,917 B1 | 4/2001 | Rathbun | |
| 6,255,793 B1 | 7/2001 | Peless et al. | |
| 6,300,737 B1 | 10/2001 | Bergvall et al. | |
| 6,321,515 B1 | 11/2001 | Colens | |
| D451,931 S | 12/2001 | Abramson et al. | |
| 6,338,013 B1 | 1/2002 | Ruffner | |
| 6,339,735 B1 | 1/2002 | Peless et al. | |
| 6,417,641 B2 | 7/2002 | Peless et al. | |
| 6,442,845 B2 | 9/2002 | Wheeler et al. | |
| 6,443,509 B1 | 9/2002 | Levin et al. | |
| 6,460,253 B1 | 10/2002 | Wheeler et al. | |
| 6,465,982 B1 | 10/2002 | Bergvall et al. | |
| 6,481,515 B1 | 11/2002 | Kirkpatrick et al. | |
| 6,493,613 B2 | 12/2002 | Peless et al. | |
| 6,502,017 B2 | 12/2002 | Ruffner | |
| 6,525,509 B1 | 2/2003 | Petersson et al. | |
| 6,586,908 B2 | 7/2003 | Petersson et al. | |
| 6,594,844 B2 | 7/2003 | Jones | |
| 6,600,981 B2 | 7/2003 | Ruffner | |
| 6,604,348 B2 | 8/2003 | Hunt | |
| 6,611,738 B2 | 8/2003 | Ruffner | |
| 6,615,108 B1 | 9/2003 | Peless et al. | |
| 6,636,847 B1 | 10/2003 | Spires | |
| 6,650,975 B2 | 11/2003 | Ruffner | |
| 6,662,889 B2 | 12/2003 | De Fazio et al. | |
| 6,728,607 B1 | 4/2004 | Anderson | |
| 6,763,282 B2 | 7/2004 | Glenn et al. | |
| 6,779,217 B2 | 8/2004 | Fisher | |
| 6,809,490 B2 | 10/2004 | Jones et al. | |
| 6,813,557 B2 | 11/2004 | Schmidt et al. | |
| 6,850,024 B2 | 2/2005 | Peless et al. | |
| 6,870,792 B2 | 3/2005 | Chiappetta | |
| 6,879,878 B2 | 4/2005 | Glenn et al. | |
| 6,880,252 B1 * | 4/2005 | Drake | B25C 7/00 30/366 |
| 6,885,912 B2 | 4/2005 | Peless et al. | |
| 6,907,336 B2 | 6/2005 | Gray et al. | |
| 6,934,615 B2 | 8/2005 | Flann et al. | |
| 6,984,952 B2 | 1/2006 | Peless et al. | |
| 7,010,425 B2 | 3/2006 | Gray et al. | |
| 7,024,842 B2 | 4/2006 | Hunt et al. | |
| 7,024,843 B2 | 4/2006 | Hunt et al. | |
| 7,047,712 B1 | 5/2006 | Hunt et al. | |
| 7,053,580 B2 | 5/2006 | Aldred | |
| 7,069,111 B2 | 6/2006 | Glenn et al. | |
| 7,076,348 B2 | 7/2006 | Bucher et al. | |
| 7,079,923 B2 | 7/2006 | Abramson et al. | |
| 7,079,943 B2 | 7/2006 | Flann et al. | |
| 7,085,624 B2 | 8/2006 | Aldred et al. | |
| 7,103,457 B2 | 9/2006 | Dean | |
| 7,110,881 B2 | 9/2006 | Gray et al. | |
| 7,114,318 B2 | 10/2006 | Poulson et al. | |
| 7,117,660 B1 | 10/2006 | Colens | |
| 7,133,746 B2 | 11/2006 | Abramson et al. | |
| 7,146,786 B2 | 12/2006 | Brandon | |
| 7,155,308 B2 | 12/2006 | Jones | |
| 7,155,309 B2 | 12/2006 | Peless et al. | |
| 7,166,983 B2 | 1/2007 | Jung | |
| 7,167,775 B2 | 1/2007 | Abramson et al. | |
| 7,173,391 B2 | 2/2007 | Jones et al. | |
| 7,174,157 B2 | 2/2007 | Gassho et al. | |
| 7,211,980 B1 | 5/2007 | Bruemmer et al. | |
| 7,216,033 B2 | 5/2007 | Flann et al. | |
| 7,227,334 B2 | 6/2007 | Yang et al. | |
| 7,228,214 B2 | 6/2007 | Flann et al. | |
| 7,233,683 B2 | 6/2007 | Han et al. | |
| 7,242,791 B2 | 7/2007 | Han et al. | |
| 7,286,902 B2 | 10/2007 | Kim et al. | |
| D559,867 S | 1/2008 | Abramson | |
| 7,332,890 B2 | 2/2008 | Cohen et al. | |
| 7,349,759 B2 | 3/2008 | Peless et al. | |
| 7,363,994 B1 | 4/2008 | Defazio et al. | |
| 7,369,460 B2 | 5/2008 | Chiappetta et al. | |
| 7,369,924 B2 | 5/2008 | Han et al. | |
| 7,388,343 B2 | 6/2008 | Jones et al. | |
| D573,610 S | 7/2008 | Abramson | |
| 7,395,648 B1 | 7/2008 | Silbernagel et al. | |
| 7,418,328 B2 | 8/2008 | Romig | |
| 7,429,843 B2 | 9/2008 | Jones et al. | |
| 7,430,455 B2 | 9/2008 | Casey et al. | |
| 7,444,214 B2 | 10/2008 | Cho et al. | |
| 7,469,525 B2 | 12/2008 | Zeigler et al. | |
| 7,474,941 B2 | 1/2009 | Kim et al. | |
| 7,480,958 B2 | 1/2009 | Song et al. | |
| 7,480,960 B2 | 1/2009 | Kim | |
| 7,497,053 B2 | 3/2009 | Nicolet | |
| 7,499,774 B2 | 3/2009 | Barrett et al. | |
| 7,499,775 B2 | 3/2009 | Filippov et al. | |
| 7,499,776 B2 | 3/2009 | Allard et al. | |
| 7,499,804 B2 | 3/2009 | Svendsen et al. | |
| 7,505,848 B2 | 3/2009 | Flann et al. | |
| 7,539,557 B2 | 5/2009 | Yamauchi | |

(56) References Cited

U.S. PATENT DOCUMENTS

| | | | |
|---|---|---|---|
| 7,568,873 | B1 | 8/2009 | Rambo |
| 7,574,282 | B2 | 8/2009 | Petersson et al. |
| 7,577,499 | B2 | 8/2009 | Sun et al. |
| 7,587,260 | B2 | 9/2009 | Bruemmer et al. |
| 7,590,413 | B2 | 9/2009 | May |
| 7,596,934 | B2 | 10/2009 | Waesche et al. |
| 7,610,122 | B2 | 10/2009 | Anderson |
| 7,610,123 | B2 | 10/2009 | Han et al. |
| 7,613,543 | B2 | 11/2009 | Petersson et al. |
| 7,614,835 | B2 | 11/2009 | Kitamura |
| 7,617,890 | B2 | 11/2009 | Romig |
| 7,647,144 | B2 | 1/2010 | Haegermarck |
| D610,072 | S | 2/2010 | Wallet et al. |
| 7,663,333 | B2 | 2/2010 | Jones et al. |
| 7,688,676 | B2 | 3/2010 | Chiappetta et al. |
| 7,690,066 | B2 | 4/2010 | Stoltz et al. |
| D615,920 | S | 5/2010 | Kline et al. |
| 7,707,812 | B2 | 5/2010 | Cheung |
| 7,720,572 | B2 | 5/2010 | Ziegler et al. |
| 7,729,801 | B2 | 6/2010 | Abramson |
| 7,730,705 | B2 | 6/2010 | Kubinski |
| 7,769,490 | B2 | 8/2010 | Abramson et al. |
| 7,787,989 | B2 | 8/2010 | Colens |
| 7,792,607 | B2 | 9/2010 | Han et al. |
| 7,801,645 | B2 | 9/2010 | Taylor et al. |
| 7,805,220 | B2 | 9/2010 | Taylor et al. |
| 7,805,676 | B2 | 9/2010 | Schemers et al. |
| 7,805,918 | B2 | 10/2010 | Silbernagel et al. |
| D628,145 | S | 11/2010 | Vaidya |
| 7,840,210 | B2 | 11/2010 | May |
| 7,843,431 | B2 | 11/2010 | Robbins et al. |
| 7,844,396 | B2 | 11/2010 | Zeitzew |
| 7,853,373 | B2 | 12/2010 | Traster et al. |
| 7,876,927 | B2 | 1/2011 | Han et al. |
| 7,885,738 | B2 | 2/2011 | Park et al. |
| 7,908,834 | B2 | 3/2011 | Keski-Luopa |
| 7,929,504 | B2 | 4/2011 | Wentink et al. |
| 7,953,526 | B2 | 5/2011 | Durkos et al. |
| 7,957,837 | B2 | 6/2011 | Ziegler et al. |
| 7,957,850 | B2 | 6/2011 | Anderson |
| 7,958,709 | B2 | 6/2011 | Coleman et al. |
| 7,958,712 | B2 | 6/2011 | Cheung |
| 7,979,175 | B2 | 7/2011 | Allard et al. |
| 7,992,251 | B2 | 8/2011 | Chung et al. |
| 8,020,657 | B2 | 9/2011 | Allard et al. |
| 8,022,667 | B2 | 9/2011 | Anderson |
| 8,031,086 | B2 | 10/2011 | Thacher et al. |
| 8,046,103 | B2 | 10/2011 | Abramson et al. |
| 8,065,866 | B2 | 11/2011 | Tamas et al. |
| 8,078,338 | B2 | 12/2011 | Pack et al. |
| 8,079,433 | B2 | 12/2011 | Teague et al. |
| D652,431 | S | 1/2012 | Näslund |
| 8,091,105 | B2 | 1/2012 | Lee |
| 8,106,626 | B2 | 1/2012 | Li et al. |
| 8,107,318 | B2 | 1/2012 | Chiappetta et al. |
| 8,108,092 | B2 | 1/2012 | Phillips et al. |
| 8,121,730 | B2 | 2/2012 | Sung et al. |
| D656,163 | S | 3/2012 | Johansson et al. |
| 8,135,498 | B2 | 3/2012 | Hyung et al. |
| 8,150,574 | B2 | 4/2012 | Han et al. |
| 8,195,333 | B2 | 6/2012 | Ziegler et al. |
| 8,195,342 | B2 | 6/2012 | Anderson |
| 8,195,358 | B2 | 6/2012 | Anderson |
| 8,199,109 | B2 | 6/2012 | Robbins et al. |
| 8,200,428 | B2 | 6/2012 | Anderson |
| 8,208,907 | B2 | 6/2012 | May |
| 8,209,053 | B2 | 6/2012 | Kim et al. |
| 8,224,500 | B2 | 7/2012 | Anderson |
| 8,224,516 | B2 | 7/2012 | Anderson |
| 8,229,618 | B2 | 7/2012 | Tolstedt et al. |
| 8,234,010 | B2 | 7/2012 | Thompson et al. |
| 8,234,848 | B2 | 8/2012 | Messina et al. |
| 8,237,389 | B2 | 8/2012 | Fitch et al. |
| 8,239,992 | B2 | 8/2012 | Schnittman et al. |
| 8,255,092 | B2 | 8/2012 | Phillips et al. |
| 8,271,132 | B2 | 9/2012 | Nielsen et al. |
| 8,292,007 | B2 | 10/2012 | Defazio et al. |
| 8,295,125 | B2 | 10/2012 | Chiappetta et al. |
| 8,295,979 | B2 | 10/2012 | Thacher et al. |
| 8,297,032 | B2 | 10/2012 | Ninomiya et al. |
| 8,297,903 | B2 | 10/2012 | Hohmann et al. |
| 8,306,659 | B2 | 11/2012 | Abramson et al. |
| 8,311,674 | B2 | 11/2012 | Abramson |
| 8,326,469 | B2 | 12/2012 | Phillips et al. |
| 8,336,282 | B2 | 12/2012 | Messina et al. |
| 8,340,438 | B2 | 12/2012 | Anderson |
| 8,347,444 | B2 | 1/2013 | Schnittman et al. |
| 8,350,810 | B2 | 1/2013 | Robbins et al. |
| 8,352,113 | B2 | 1/2013 | Johnson et al. |
| 8,370,985 | B2 | 2/2013 | Schnittman et al. |
| 8,390,251 | B2 | 3/2013 | Cohen et al. |
| 8,392,044 | B2 | 3/2013 | Thompson et al. |
| 8,392,065 | B2 | 3/2013 | Tolstedt et al. |
| 8,396,592 | B2 | 3/2013 | Jones et al. |
| 8,396,597 | B2 | 3/2013 | Anderson |
| 8,396,611 | B2 | 3/2013 | Phillips et al. |
| D679,294 | S | 4/2013 | Tajik et al. |
| D679,295 | S | 4/2013 | Tajik et al. |
| 8,412,377 | B2 | 4/2013 | Casey et al. |
| 8,428,776 | B2 | 4/2013 | Letsky |
| 8,433,468 | B2 | 4/2013 | Johnson et al. |
| 8,438,695 | B2 | 5/2013 | Gilbert, Jr. et al. |
| 8,442,700 | B2 | 5/2013 | Anderson |
| 8,447,440 | B2 | 5/2013 | Phillips et al. |
| 8,447,454 | B2 | 5/2013 | Biber et al. |
| 8,461,803 | B2 | 6/2013 | Cohen et al. |
| 8,463,438 | B2 | 6/2013 | Jones et al. |
| 8,467,928 | B2 | 6/2013 | Anderson |
| 8,471,133 | B1 | 6/2013 | Lin |
| 8,473,187 | B2 | 6/2013 | Kammel et al. |
| 8,476,867 | B2 | 7/2013 | Li et al. |
| 8,478,442 | B2 | 7/2013 | Casey et al. |
| 8,498,788 | B2 | 7/2013 | Kondekar |
| D688,276 | S | 8/2013 | Näslund |
| 8,508,329 | B2 | 8/2013 | Veenstra |
| 8,521,329 | B2 | 8/2013 | Park et al. |
| 8,532,821 | B2 | 9/2013 | Ko |
| 8,532,822 | B2 | 9/2013 | Abramson et al. |
| 8,560,145 | B2 | 10/2013 | Anderson |
| 8,565,920 | B2 | 10/2013 | Casey et al. |
| 8,572,266 | B2 | 10/2013 | Larocca |
| 8,577,517 | B2 | 11/2013 | Phillips et al. |
| 8,577,538 | B2 | 11/2013 | Lenser et al. |
| 8,594,842 | B2 | 11/2013 | Abramson |
| 8,599,645 | B2 | 12/2013 | Chiappetta et al. |
| 8,619,141 | B2 | 12/2013 | Anderson |
| 8,634,960 | B2 | 1/2014 | Sandin et al. |
| 8,635,015 | B2 | 1/2014 | Anderson |
| 8,655,539 | B2 | 2/2014 | Yoo et al. |
| 8,660,879 | B2 | 2/2014 | Machtelinck |
| 8,666,550 | B2 | 3/2014 | Anderson et al. |
| 8,666,554 | B2 | 3/2014 | Anderson |
| 8,666,587 | B2 | 3/2014 | Anderson |
| 8,671,656 | B2 | 3/2014 | Paden |
| 8,676,378 | B2 | 3/2014 | Tian et al. |
| 8,706,339 | B2 | 4/2014 | Thompson et al. |
| 8,712,623 | B2 | 4/2014 | Sato et al. |
| 8,725,316 | B2 | 5/2014 | Thompson et al. |
| 8,726,454 | B2 | 5/2014 | Gilbert, Jr. et al. |
| 8,731,295 | B2 | 5/2014 | Schepelmann et al. |
| 8,739,057 | B2 | 5/2014 | Cheong et al. |
| 8,744,626 | B2 | 6/2014 | Johnson et al. |
| 8,744,663 | B2 | 6/2014 | Sato et al. |
| 8,749,196 | B2 | 6/2014 | Cohen et al. |
| 8,760,397 | B2 | 6/2014 | Robbins et al. |
| 8,761,935 | B2 | 6/2014 | Casey et al. |
| 8,781,627 | B2 | 7/2014 | Sandin et al. |
| 8,788,092 | B2 | 7/2014 | Casey et al. |
| 8,818,567 | B2 | 8/2014 | Anderson |
| 8,818,602 | B2 | 8/2014 | Yamamura et al. |
| 8,838,274 | B2 | 9/2014 | Jones et al. |
| 8,838,291 | B2 | 9/2014 | Jägenstedt et al. |
| 8,839,477 | B2 | 9/2014 | Schnittman et al. |
| 8,843,244 | B2 | 9/2014 | Phillips et al. |

(56) References Cited

U.S. PATENT DOCUMENTS 8,854,001 B2 10/2014 Cohen et al.
8,856,150 B2 10/2014 Machtelinck
8,868,237 B2 10/2014 Sandin et al.
8,869,337 B2 10/2014 Sumonthee
8,869,369 B1 10/2014 Roach
8,874,269 B2 10/2014 Biber et al.
8,874,300 B2 10/2014 Allard et al.
D718,339 S 11/2014 Damshak et al.
D718,340 S 11/2014 Damshak et al.
D718,341 S 11/2014 Gur et al.
8,892,352 B2 11/2014 Petereit et al.
D718,793 S 12/2014 Gur et al.
8,911,192 B2 12/2014 Hohmann et al.
8,918,241 B2 12/2014 Chen et al.
8,925,667 B2 1/2015 Chen
8,930,023 B2 1/2015 Gutmann et al.
8,930,024 B2 1/2015 Abramson
8,938,318 B2 1/2015 Bergström et al.
8,942,862 B2 1/2015 Markusson et al.
8,954,193 B2 2/2015 Sandin et al.
8,958,911 B2 2/2015 Wong et al.
8,958,939 B2 2/2015 Einecke et al.
8,965,578 B2 2/2015 Versteeg et al.
8,989,946 B2 3/2015 Anderson
8,989,972 B2 3/2015 Anderson
8,996,171 B2 3/2015 Anderson et al.
8,996,177 B2 3/2015 Coenen
D729,280 S 5/2015 Näslund et al.
9,021,777 B2 5/2015 Johnson et al.
9,026,299 B2 5/2015 Johnson et al.
9,026,302 B2 5/2015 Stout et al.
9,031,050 B2 5/2015 Cherian et al.
9,037,294 B2 5/2015 Chung et al.
9,043,016 B2 5/2015 Filippov et al.
9,043,129 B2 5/2015 Bonefas et al.
D731,402 S 6/2015 Tedesco et al.
9,043,952 B2 6/2015 Sandin et al.
9,043,953 B2 6/2015 Sandin et al.
9,072,218 B2 7/2015 Johnson et al.
9,072,219 B2 7/2015 Da Rocha et al.
9,079,303 B2 7/2015 Abramson et al.
9,093,868 B2 7/2015 Baxter
9,104,204 B2 8/2015 Jones et al.
9,104,206 B2 8/2015 Biber et al.
9,110,471 B2 8/2015 Pack et al.
9,113,595 B2 8/2015 Roth et al.
9,119,341 B2 9/2015 Jägenstedt
9,137,943 B2 9/2015 Einecke et al.
9,144,193 B2 9/2015 Paden
9,182,763 B2 11/2015 Park et al.
9,186,800 B2 11/2015 Shin et al.
9,188,980 B2 11/2015 Anderson
9,188,983 B2 11/2015 Stout et al.
9,195,256 B2 11/2015 Robbins et al.
D745,897 S 12/2015 Mehra et al.
9,213,934 B1 12/2015 Versteeg et al.
9,215,957 B2 12/2015 Cohen et al.
9,223,312 B2 12/2015 Goel et al.
9,232,692 B2 1/2016 Björn et al.
9,235,214 B2 1/2016 Anderson
9,236,637 B2 1/2016 Anderson
9,241,441 B2 1/2016 Björn et al.
D748,568 S 2/2016 Helin et al.
9,258,942 B2 2/2016 Biber et al.
9,268,331 B2 2/2016 Abramson et al.
9,276,419 B2 3/2016 Borinato et al.
9,278,690 B2 3/2016 Smith
9,301,444 B2 4/2016 Campbell et al.
D757,637 S 5/2016 Horowitz
9,327,407 B2 5/2016 Jones et al.
9,335,767 B2 5/2016 Jang et al.
9,338,130 B2 5/2016 Von Huben et al.
9,348,897 B2 5/2016 Shoham et al.
9,349,187 B2 5/2016 Schepelmann et al.
D758,455 S 6/2016 Maibach et al.
D759,577 S 6/2016 Wang et al.
9,357,699 B2 6/2016 Elonsson
9,363,945 B2 6/2016 Jägenstedt et al.
9,375,842 B2 6/2016 Shamlian et al.
9,376,027 B2 6/2016 Harris
D760,806 S 7/2016 Cmich et al.
9,380,742 B2 7/2016 Biber et al.
9,405,294 B2 8/2016 Jägenstedt et al.
9,412,515 B2 8/2016 Hyde et al.
9,419,453 B2 8/2016 Andersson et al.
9,420,741 B2 8/2016 Balutis et al.
9,421,879 B2 8/2016 Pastoor et al.
9,426,946 B2 8/2016 Fisher
9,429,950 B2 8/2016 Sjöholm
9,436,185 B2 9/2016 Schnittman
9,439,348 B2 9/2016 Biber et al.
9,439,367 B2 9/2016 Abhyanker
9,440,350 B2 9/2016 Mou et al.
9,440,354 B2 9/2016 Gutmann et al.
9,446,521 B2 9/2016 Casey et al.
9,452,525 B2 9/2016 Ziegler et al.
9,452,685 B2 9/2016 Hyde et al.
D769,180 S 10/2016 Wang et al.
9,456,545 B2 10/2016 Biber
9,457,677 B2 10/2016 Hyde et al.
9,463,704 B2 10/2016 Hyde et al.
9,471,063 B2 10/2016 Ouyang
9,480,201 B2 11/2016 Maruyama et al.
9,483,055 B2 11/2016 Johnson et al.
9,491,904 B2 11/2016 Jägenstedt et al.
9,497,901 B2 11/2016 Willgert
9,505,140 B1 11/2016 Fay et al.
9,510,505 B2 12/2016 Halloran et al.
9,516,806 B2 12/2016 Yamauchi et al.
D776,169 S 1/2017 Cmich et al.
9,532,688 B1 1/2017 Ebrahimi Afrouzi et al.
9,538,702 B2 1/2017 Balutis et al.
9,543,680 B2 1/2017 Elonsson
9,545,032 B2 1/2017 Baer et al.
9,550,294 B2 1/2017 Cohen et al.
9,554,508 B2 1/2017 Balutis et al.
9,559,461 B1 1/2017 Diehr
9,560,800 B2 2/2017 Reichen et al.
9,563,204 B2 2/2017 Willgert
9,573,275 B2 2/2017 Reigo et al.
D781,349 S 3/2017 Cmich
D781,926 S 3/2017 Al-hashimi et al.
9,586,563 B2 3/2017 Kanai et al.
9,590,862 B2 3/2017 Larocca
9,606,541 B2 3/2017 Abramson
9,622,399 B2 4/2017 Kremmer et al.
9,623,557 B2 4/2017 Gutmann et al.
9,630,319 B2 4/2017 Vicenti
9,632,489 B2 4/2017 Biber et al.
9,699,964 B2 7/2017 Roth et al.
9,701,020 B1 7/2017 Ebrahimi Afrouzi
9,711,767 B2 7/2017 Juenger et al.
9,713,302 B2 7/2017 Sandin et al.
9,713,303 B2 7/2017 Jägenstedt et al.
D794,089 S 8/2017 Maibach et al.
9,717,175 B2 8/2017 Fay, II et al.
9,720,417 B2 8/2017 Reigo et al.
9,723,782 B2 8/2017 Roth et al.
9,736,981 B2 8/2017 Roth et al.
9,740,210 B2 8/2017 Sjöholm
D796,555 S 9/2017 Landberg et al.
D797,530 S 9/2017 Cmich
9,750,183 B2 9/2017 Haun
9,766,627 B2 9/2017 Jägenstedt et al.
D799,555 S 10/2017 Cmich
9,785,148 B2 10/2017 Yun
9,788,481 B2 10/2017 Das et al.
9,788,483 B2 10/2017 Roth et al.
9,791,860 B2 10/2017 Phillips et al.
9,804,604 B2 10/2017 Mattsson et al.
9,807,925 B2 11/2017 Johnson
9,807,930 B1 11/2017 Lydon et al.
9,817,398 B2 11/2017 Yamamura et al.
9,820,433 B2 11/2017 Borinato

(56) References Cited

U.S. PATENT DOCUMENTS 9,826,678 B2 11/2017 Balutis et al.
9,829,891 B2 11/2017 Smith et al.
9,841,768 B2 12/2017 Hiramatsu et al.
9,844,876 B2 12/2017 Chung et al.
9,848,529 B2 12/2017 Franzius et al.
9,848,532 B2 12/2017 Keski-Luopa et al.
9,851,718 B2 12/2017 Booher
9,853,468 B2 12/2017 Ireland
D807,281 S 1/2018 Irwin et al.
D807,811 S 1/2018 Wang et al.
9,854,737 B2 1/2018 Yamauchi et al.
9,854,956 B2 1/2018 Song et al.
9,857,025 B2 1/2018 Gottinger et al.
9,861,035 B2 1/2018 Kruckeberg et al.
9,872,437 B2 1/2018 Markusson et al.
9,874,876 B2 1/2018 Shimamura
9,876,370 B2 1/2018 Yamamura et al.
D810,664 S 2/2018 Sgreccia et al.
D810,665 S 2/2018 Sgreccia et al.
9,884,423 B2 2/2018 Cohen et al.
9,894,836 B2 2/2018 Garton
9,895,808 B2 2/2018 Stout et al.
9,901,028 B2 2/2018 Hans
9,903,947 B2 2/2018 Das et al.
9,924,632 B2 3/2018 Chenevert et al.
9,924,847 B2 3/2018 Gottinger et al.
9,931,007 B2 4/2018 Morin et al.
9,931,008 B2 4/2018 Yoo et al.
9,931,750 B2 4/2018 Cohen et al.
9,936,635 B2 4/2018 Gottinger et al.
9,968,024 B2 5/2018 Haneda et al.
9,972,098 B1 5/2018 Ebrahimi Afrouzi et al.
9,983,586 B2 5/2018 Borinato
10,011,180 B2 7/2018 Hyde et al.
10,021,830 B2 7/2018 Doughty
10,024,964 B2 7/2018 Pierce et al.
10,029,368 B2 7/2018 Wolowelsky et al.
10,031,527 B2 7/2018 Björn
10,034,421 B2 7/2018 Doughty et al.
10,035,270 B2 7/2018 Fay et al.
10,037,038 B2 7/2018 Sandin et al.
10,046,130 B2 8/2018 Molden et al.
10,054,924 B2 8/2018 Willgert
10,057,813 B1 8/2018 Likar et al.
10,067,232 B2 9/2018 Halloran et al.
10,070,764 B2 9/2018 Schnittman et al.
10,071,475 B2 9/2018 Lin et al.
10,078,336 B2 9/2018 Reigo et al.
10,080,326 B2 9/2018 Yamamura et al.
D830,418 S 10/2018 Näslund et al.
10,091,930 B2 10/2018 Balutis et al.
10,093,194 B2 10/2018 Hyde et al.
10,093,259 B2 10/2018 Pan
10,098,277 B2 10/2018 Ouyang
10,104,835 B2 10/2018 Köhler et al.
10,105,838 B2 10/2018 Mou et al.
10,108,198 B2 10/2018 Björn et al.
D834,185 S 11/2018 Molden et al.
D834,504 S 11/2018 Ropars
D834,505 S 11/2018 Wang et al.
10,117,379 B2 11/2018 Guiet et al.
10,123,479 B2 11/2018 Ladd, Jr. et al.
10,124,494 B2 11/2018 Outa et al.
10,131,057 B2 11/2018 Patel et al.
10,136,576 B2 11/2018 Reigo
10,149,430 B2 12/2018 Bergström et al.
10,152,062 B2 12/2018 Schnittman
10,157,334 B2 12/2018 Schepelmann et al.
10,159,180 B2 12/2018 Balutis et al.
10,162,359 B2 12/2018 Johnson et al.
D837,150 S 1/2019 Näslund et al.
10,165,725 B2 1/2019 Sugumaran et al.
10,172,282 B2 1/2019 Svensson et al.
10,178,826 B2 1/2019 Jägenstedt et al.
10,183,400 B2 1/2019 Trigui et al.
10,183,701 B2 1/2019 Ebrahimi Afrouzi et al.
10,185,325 B2 1/2019 Reigo et al.
10,201,261 B2 2/2019 Tanaka et al.
10,207,557 B2 2/2019 Björn et al.
10,212,880 B2 2/2019 Cmich et al.
10,238,026 B2 3/2019 Köhler et al.
D845,877 S 4/2019 Geng et al.
10,244,678 B2 4/2019 Lydon et al.
10,246,907 B2 4/2019 Shen
10,257,976 B2 4/2019 Ladd, Jr. et al.
10,259,498 B2 4/2019 Jägenstedt et al.
10,268,206 B2 4/2019 Yamamura
10,274,954 B2 4/2019 Balutis et al.
D848,488 S 5/2019 Cmich
10,281,912 B2 5/2019 Hollister
10,281,922 B2 5/2019 Smith et al.
10,299,431 B2 5/2019 Ladd, Jr. et al.
10,299,652 B2 5/2019 Gilbert, Jr. et al.
D852,232 S 6/2019 Eidson et al.
10,310,510 B2 6/2019 Mannefred et al.
10,315,306 B2 6/2019 Abramson
10,321,625 B2 6/2019 Einecke et al.
10,327,384 B2 6/2019 Johansson et al.
D853,447 S 7/2019 Mehra et al.
D853,448 S 7/2019 Mehra et al.
D853,449 S 7/2019 Mehra et al.
10,338,602 B2 7/2019 Grufman et al.
10,343,280 B1 7/2019 Ebrahimi Afrouzi
10,346,995 B1 7/2019 Ebrahimi Afrouzi
10,353,399 B2 7/2019 Ebrahimi Afrouzi
10,362,730 B2 7/2019 Ladd, Jr. et al.
10,365,661 B2 7/2019 Jägenstedt et al.
10,369,705 B2 8/2019 Trigui et al.
10,372,140 B2 8/2019 Sun et al.
10,375,880 B2 8/2019 Morin et al.
10,377,035 B2 8/2019 He et al.
10,379,172 B2 8/2019 Kleiner et al.
10,384,346 B2 8/2019 Hickman et al.
10,386,844 B2 8/2019 Wilcox et al.
10,390,483 B2 8/2019 Balutis et al.
D858,424 S 9/2019 Chattopadhyay
10,405,488 B2 9/2019 Kamfors et al.
10,425,488 B2 9/2019 Larsén et al.
D864,256 S 10/2019 Eidson et al.
10,426,083 B2 10/2019 Doughty
10,440,879 B2 10/2019 Björn et al.
10,442,083 B2 10/2019 Wolowelsky et al.
10,444,756 B2 10/2019 Kamfors et al.
10,444,757 B2 10/2019 Dong et al.
10,444,760 B2 10/2019 Grufman et al.
10,448,565 B2 10/2019 Mannefred et al.
10,454,287 B2 10/2019 Yamamura et al.
10,456,924 B2 10/2019 Outa et al.
10,459,452 B2 10/2019 Eagling et al.
10,462,961 B2 11/2019 Tjernberg et al.
10,463,215 B2 11/2019 Morin et al.
10,464,206 B2 11/2019 Frisby et al.
10,466,710 B2 11/2019 Biber et al.
10,485,164 B2 11/2019 Letsky
10,488,865 B2 11/2019 Afrouzi et al.
10,496,262 B1 12/2019 Ebrahimi Afrouzi et al.
10,500,722 B2 12/2019 Vicenti
10,514,701 B2 12/2019 Windorfer
10,517,211 B2 12/2019 Öhrlund et al.
10,518,651 B2 12/2019 Svensson et al.
10,520,113 B1 12/2019 Thompson
10,542,667 B2 1/2020 Song et al.
10,542,670 B2 1/2020 Cmich et al.
10,549,646 B2 2/2020 Reynolds et al.
10,551,844 B2 2/2020 Biber et al.
10,552,770 B2 2/2020 Brough et al.
10,555,456 B2 2/2020 Borinato
10,555,457 B2 2/2020 Song et al.
10,561,063 B2 2/2020 Hasegawa et al.
10,568,258 B2 2/2020 Wahlgren
10,571,905 B2 2/2020 Yamamura
10,571,928 B2 2/2020 Sun et al.
10,575,465 B2 3/2020 Ran et al.
10,575,696 B2 3/2020 O'Brien et al.

(56) References Cited

U.S. PATENT DOCUMENTS 10,583,562 B2 3/2020 Stout et al.
10,588,255 B2 3/2020 Song et al.
10,589,418 B2 3/2020 Gordon-Carroll et al.
10,589,432 B2 3/2020 Al Nahwi et al.
10,589,433 B2 3/2020 Al Nahwi et al.
10,592,998 B2 3/2020 Eijdenberg et al.
10,594,117 B2 3/2020 Song et al.
10,595,459 B2 3/2020 Aposhian et al.
10,595,692 B2 3/2020 Morin et al.
10,598,793 B2 3/2020 Öhrlund et al.
10,599,154 B2 3/2020 Dean et al.
10,606,275 B2 3/2020 Dean et al.
10,606,279 B2 3/2020 Grufman et al.
D880,532 S 4/2020 Gunnarsson et al.
D881,252 S 4/2020 Vestberg et al.
D882,640 S 4/2020 Estey
10,609,862 B2 4/2020 Wu et al.
10,611,028 B1 4/2020 Zhou et al.
10,612,929 B2 4/2020 Afrouzi et al.
10,613,541 B1 4/2020 Ebrahimi Afrouzi et al.
10,621,537 B2 4/2020 Ben-Alexander
D884,762 S 5/2020 Gunnarsson et al.
D884,763 S 5/2020 Gunnarsson et al.
10,643,377 B2 5/2020 Grufman et al.
10,646,997 B2 5/2020 Reigo et al.
10,649,466 B2 5/2020 Holmström et al.
10,651,594 B1 5/2020 Tsai et al.
10,653,057 B2 5/2020 Choi et al.
10,653,058 B2 5/2020 Yamanaka et al.
10,653,282 B2 5/2020 Song et al.
10,656,652 B2 5/2020 Dean et al.
D887,464 S 6/2020 Gunnarsson et al.
D887,465 S 6/2020 Gunnarsson et al.
D887,466 S 6/2020 Gunnarsson et al.
10,670,406 B2 6/2020 Eguchi et al.
10,673,630 B2 6/2020 Pakkan et al.
10,674,659 B2 6/2020 Ladd, Jr. et al.
10,674,660 B2 6/2020 Matsuzawa et al.
10,681,863 B2 6/2020 Hans et al.
10,681,864 B2 6/2020 Matt et al.
10,691,000 B2 6/2020 Du et al.
10,698,417 B2 6/2020 Churavy et al.
D889,517 S 7/2020 Prybor et al.
10,716,258 B2 7/2020 Pellenc et al.
10,721,860 B2 7/2020 Liljedahl
D892,187 S 8/2020 Maggard
10,737,369 B2 8/2020 Steinhauser et al.
10,737,395 B2 8/2020 Wolff et al.
10,738,495 B2 8/2020 Durvasula et al.
10,739,769 B2 8/2020 Dean et al.
10,747,413 B2 8/2020 Schneider et al.
10,750,667 B2 8/2020 Yamauchi et al.
10,750,918 B2 8/2020 Jung et al.
D896,737 S 9/2020 Phely
10,758,100 B2 9/2020 Cohen et al.
10,765,284 B2 9/2020 Song et al.
10,766,147 B2 9/2020 Trigui et al.
10,777,000 B2 9/2020 Grufman et al.
10,782,705 B2 9/2020 Reigo et al.
10,785,907 B2 9/2020 Doughty et al.
10,788,832 B2 9/2020 Nykamp
10,791,684 B2 10/2020 He et al.
10,795,377 B2 10/2020 Afrouzi et al.
10,806,075 B2 10/2020 Grufman et al.
10,809,071 B2 10/2020 Afrouzi et al.
10,809,740 B2 10/2020 Reinert et al.
10,814,495 B2 10/2020 Patel et al.
10,820,493 B2 11/2020 Ritzer et al.
10,824,163 B2 11/2020 Einecke et al.
10,842,074 B2 11/2020 Jägenstedt et al.
10,843,734 B1 11/2020 Ebrahimi Afrouzi et al.
10,843,735 B1 11/2020 Ebrahimi Afrouzi et al.
10,845,481 B2 11/2020 Pierce et al.
10,845,804 B2 11/2020 Holgersson et al.
D906,373 S 12/2020 Morin et al.
10,849,267 B2 12/2020 Strandberg et al.
10,849,270 B2 12/2020 Johansson et al.
10,850,400 B2 12/2020 Park
10,852,735 B2 12/2020 Tan et al.
10,852,738 B2 12/2020 Mannefred et al.
10,856,467 B2 12/2020 Maggard
10,858,041 B2 12/2020 Jägenstedt et al.
10,869,432 B2 12/2020 Wykman et al.
10,873,194 B2 12/2020 Lydon et al.
10,874,045 B2 12/2020 Balutis et al.
10,874,049 B2 12/2020 Ladd, Jr. et al.
10,874,051 B2 12/2020 Kasai et al.
10,874,278 B2 12/2020 Matt et al.
D908,597 S 1/2021 Meng et al.
D908,598 S 1/2021 Meng et al.
10,882,187 B2 1/2021 Li et al.
10,888,046 B2 1/2021 Gorenflo et al.
10,890,921 B2 1/2021 Gillett
10,895,876 B2 1/2021 Arenz et al.
10,899,171 B2 1/2021 Cmich
10,912,253 B2 2/2021 Einecke et al.
10,928,833 B2 2/2021 Reigo
10,932,409 B2 3/2021 Ingvalson et al.
10,935,383 B1 3/2021 Ebrahimi Afrouzi et al.
10,939,611 B2 3/2021 Liljedahl
10,952,578 B2 3/2021 Gill et al.
10,959,371 B2 3/2021 Zhou et al.
10,966,368 B2 4/2021 Desai et al.
10,967,752 B2 4/2021 Liu et al.
10,973,168 B2 4/2021 Hans et al.
10,986,775 B2 4/2021 Matt et al.
10,986,971 B1 4/2021 Ebrahimi Afrouzi
10,993,598 B2 5/2021 Park et al.
11,003,192 B2 5/2021 Dalfra et al.
11,009,869 B2 5/2021 Moroi et al.
11,013,655 B1 5/2021 Ebrahimi Afrouzi et al.
11,014,460 B2 5/2021 Schnittman et al.
11,016,481 B2 5/2021 Gustavsson et al.
D922,444 S 6/2021 Morin et al.
11,019,975 B2 6/2021 Jang et al.
11,020,857 B2 6/2021 Xiong et al.
11,039,582 B2 6/2021 Gilliam et al.
11,039,583 B2 6/2021 Gilliam et al.
11,044,844 B2 6/2021 Keski-luopa et al.
11,048,268 B2 6/2021 Ouyang
11,051,449 B2 7/2021 Bergh et al.
11,051,671 B2 7/2021 Jang et al.
11,052,535 B2 7/2021 Parks, II et al.
11,052,540 B2 7/2021 Stout et al.
11,054,822 B2 7/2021 Özmen
11,054,836 B2 7/2021 Wang et al.
11,058,053 B2 7/2021 Patel et al.
11,064,652 B2 7/2021 Matt et al.
11,065,762 B2 7/2021 Sakai et al.
11,069,082 B1 7/2021 Ebrahimi Afrouzi et al.
11,071,429 B2 7/2021 Jang et al.
11,072,250 B2 7/2021 Gilbert, Jr. et al.
11,072,255 B2 7/2021 Svensson et al.
11,075,910 B2 7/2021 Dean et al.
11,076,529 B2 8/2021 Chen et al.
11,079,755 B2 8/2021 Schlacks, IV et al.
11,084,172 B2 8/2021 Casey et al.
11,089,732 B2 8/2021 Jägenstedt et al.
11,097,428 B2 8/2021 Al Nahwi et al.
11,099,572 B2 8/2021 Cestonaro et al.
11,104,006 B2 8/2021 Fay et al.
11,105,109 B2 8/2021 Durvasula et al.
11,106,215 B2 8/2021 Dalfra
11,109,528 B2 9/2021 Strang
11,109,731 B2 9/2021 Jang et al.
11,112,505 B2 9/2021 Öhrlund et al.
11,112,532 B2 9/2021 Jägenstedt et al.
11,115,798 B2 9/2021 Beaulieu et al.
11,117,264 B2 9/2021 Tsai et al.
11,119,496 B1 9/2021 Ebrahimi Afrouzi et al.
11,126,193 B2 9/2021 Mannefred et al.
11,134,609 B2 10/2021 Willgert et al.
11,140,815 B2 10/2021 Matt et al.
11,140,819 B2 10/2021 Chen et al.

(56) References Cited

U.S. PATENT DOCUMENTS

| | | | |
|---|---|---|---|
| 11,141,034 B2 | 10/2021 | Jang et al. | |
| 11,154,006 B2 | 10/2021 | Liljedahl | |
| 11,154,442 B1 | 10/2021 | Dean et al. | |
| 11,157,015 B2 | 10/2021 | Schnittman | |
| D937,181 S | 11/2021 | Guidry | |
| 11,161,235 B2 | 11/2021 | He et al. | |
| 11,161,381 B2 | 11/2021 | Svensson et al. | |
| 11,161,422 B2 | 11/2021 | Andriolo et al. | |
| 11,161,578 B2 | 11/2021 | Wu et al. | |
| 11,163,292 B2 | 11/2021 | Adler et al. | |
| 11,166,411 B2 | 11/2021 | Fuse et al. | |
| 11,169,527 B2 | 11/2021 | Dalfra | |
| 11,169,530 B1 | 11/2021 | Ärlig et al. | |
| 11,171,497 B2 | 11/2021 | Jiao et al. | |
| 11,173,594 B2 | 11/2021 | Kim | |
| 11,175,374 B2 | 11/2021 | Kameyama et al. | |
| 11,191,403 B2 | 12/2021 | Gill et al. | |
| 11,197,414 B2 | 12/2021 | Zeiler et al. | |
| 11,199,853 B1 | 12/2021 | Afrouzi et al. | |
| 11,202,547 B2 | 12/2021 | Jang et al. | |
| 11,215,461 B1 | 1/2022 | Ebrahimi Afrouzi et al. | |
| 11,221,628 B2 | 1/2022 | Holgersson et al. | |
| 11,225,228 B2 | 1/2022 | Liu et al. | |
| 11,229,154 B2 | 1/2022 | Hershbarger | |
| 11,231,708 B2 | 1/2022 | Hyakusawa | |
| D943,638 S | 2/2022 | Rauch et al. | |
| 11,235,451 B2 | 2/2022 | Bombulie | |
| 11,235,472 B2 | 2/2022 | Al Nahwi et al. | |
| 11,253,126 B2 | 2/2022 | Jang et al. | |
| 11,260,765 B2 | 3/2022 | Namiki et al. | |
| 11,269,349 B2 | 3/2022 | Shao et al. | |
| 11,274,929 B1 | 3/2022 | Afrouzi et al. | |
| 11,278,176 B2 | 3/2022 | Huang et al. | |
| 11,278,177 B2 | 3/2022 | Lin et al. | |
| 11,284,766 B2 | 3/2022 | Jang et al. | |
| 11,287,821 B2 | 3/2022 | Borinato | |
| 11,287,832 B2 | 3/2022 | Ebrahimi Afrouzi | |
| 11,291,343 B2 | 4/2022 | Jang et al. | |
| 11,292,136 B2 | 4/2022 | Wolff et al. | |
| 11,298,831 B2 | 4/2022 | Tsai et al. | |
| 11,300,975 B2 | 4/2022 | Dalfra et al. | |
| 11,320,828 B1 | 5/2022 | Ebrahimi Afrouzi et al. | |
| 11,325,590 B2 | 5/2022 | Han et al. | |
| 11,340,079 B1 | 5/2022 | Ebrahimi Afrouzi et al. | |
| 11,347,230 B2 | 5/2022 | Wang et al. | |
| 11,351,670 B2 | 6/2022 | Wolowelsky et al. | |
| 11,357,166 B2 | 6/2022 | Hahn et al. | |
| 11,357,167 B2 | 6/2022 | Aposhian et al. | |
| 11,378,979 B2 | 7/2022 | Zhou et al. | |
| 11,380,320 B2 | 7/2022 | Duncan | |
| 11,393,114 B1 | 7/2022 | Ebrahimi Afrouzi et al. | |
| 11,415,998 B2 | 8/2022 | Strandberg | |
| 11,464,164 B2 | 10/2022 | Cmich et al. | |
| 11,596,117 B2 | 3/2023 | Koehler et al. | |
| 11,614,744 B2 | 3/2023 | Ran et al. | |
| 11,654,574 B2 | 5/2023 | Zhang et al. | |
| 11,662,723 B2 | 5/2023 | Schlacks, IV et al. | |
| 2002/0005237 A1 | 1/2002 | Musat et al. | |
| 2003/0144774 A1 | 7/2003 | Trissel et al. | |
| 2003/0218046 A1 | 11/2003 | Peter, Jr. | |
| 2003/0236590 A1 | 12/2003 | Park et al. | |
| 2004/0000823 A1 | 1/2004 | Patridge | |
| 2004/0158358 A1 | 8/2004 | Anezaki et al. | |
| 2004/0187457 A1 | 9/2004 | Colens | |
| 2004/0190376 A1 | 9/2004 | Hulden et al. | |
| 2004/0200505 A1 | 10/2004 | Taylor et al. | |
| 2004/0204792 A1 | 10/2004 | Taylor et al. | |
| 2004/0211444 A1 | 10/2004 | Taylor et al. | |
| 2004/0236468 A1 | 11/2004 | Taylor et al. | |
| 2004/0244138 A1 | 12/2004 | Taylor et al. | |
| 2005/0010331 A1 | 1/2005 | Taylor et al. | |
| 2005/0028346 A1 | 2/2005 | Mangone, Jr. | |
| 2005/0034437 A1 | 2/2005 | McMurtry et al. | |
| 2005/0039428 A1 | 2/2005 | McMurtry et al. | |
| 2005/0042059 A1 | 2/2005 | Bremer | |
| 2005/0060975 A1 | 3/2005 | McClymonds | |
| 2005/0171637 A1 | 8/2005 | Tani et al. | |
| 2005/0171644 A1 | 8/2005 | Tani | |
| 2005/0273967 A1 | 12/2005 | Taylor et al. | |
| 2006/0010844 A1 | 1/2006 | Angott | |
| 2006/0020369 A1 | 1/2006 | Taylor et al. | |
| 2006/0020370 A1 | 1/2006 | Abramson | |
| 2006/0191096 A1 | 8/2006 | Sudo et al. | |
| 2006/0212191 A1 | 9/2006 | Saeki | |
| 2006/0217854 A1 | 9/2006 | Takenaka et al. | |
| 2006/0219838 A1 | 10/2006 | Audet | |
| 2007/0100496 A1 | 5/2007 | Forell | |
| 2007/0119137 A1 | 5/2007 | Brandon | |
| 2007/0142972 A1 | 6/2007 | Abramson et al. | |
| 2007/0143949 A1 | 6/2007 | Chiu | |
| 2007/0145943 A1 | 6/2007 | Sudo | |
| 2007/0150109 A1 | 6/2007 | Peless et al. | |
| 2007/0234698 A1 | 10/2007 | Silbernagel et al. | |
| 2007/0276541 A1 | 11/2007 | Sawasaki | |
| 2008/0143065 A1 | 6/2008 | Defazio et al. | |
| 2008/0163117 A1 | 7/2008 | Machtelinck et al. | |
| 2008/0167753 A1 | 7/2008 | Peless et al. | |
| 2008/0281470 A1 | 11/2008 | Gilbert, Jr. et al. | |
| 2008/0294288 A1 | 11/2008 | Yamauchi | |
| 2009/0090759 A1 | 4/2009 | Leimbach et al. | |
| 2009/0112679 A1 | 4/2009 | Machtelinck | |
| 2009/0157259 A1 | 6/2009 | Han et al. | |
| 2009/0182464 A1 | 7/2009 | Myeong et al. | |
| 2009/0276277 A1 | 11/2009 | Vansteenkiste et al. | |
| 2009/0313038 A1 | 12/2009 | Machtelinck | |
| 2010/0057286 A1 | 3/2010 | Kerchner | |
| 2010/0063652 A1 | 3/2010 | Anderson | |
| 2010/0066587 A1 | 3/2010 | Yamauchi et al. | |
| 2010/0299016 A1 | 11/2010 | Benzler et al. | |
| 2011/0046784 A1 | 2/2011 | Anderson | |
| 2011/0046836 A1 | 2/2011 | Anderson | |
| 2011/0112713 A1 | 5/2011 | Teng et al. | |
| 2011/0153172 A1 | 6/2011 | Anderson | |
| 2011/0153338 A1 | 6/2011 | Anderson | |
| 2011/0202307 A1 | 8/2011 | Petereit et al. | |
| 2011/0208357 A1 | 8/2011 | Yamauchi | |
| 2011/0225800 A1 | 9/2011 | Lacy et al. | |
| 2011/0295423 A1 | 12/2011 | Anderson | |
| 2012/0012635 A1* | 1/2012 | Jaffe | B25C 5/1668 227/139 |
| 2012/0029752 A1 | 2/2012 | Johnson et al. | |
| 2012/0101679 A1 | 4/2012 | Anderson et al. | |
| 2012/0143429 A1 | 6/2012 | Anderson | |
| 2012/0215380 A1 | 8/2012 | Fouillade et al. | |
| 2012/0226381 A1 | 9/2012 | Abramson et al. | |
| 2012/0253581 A1 | 10/2012 | Anderson | |
| 2012/0265346 A1 | 10/2012 | Gilbert, Jr. et al. | |
| 2012/0303160 A1 | 11/2012 | Ziegler et al. | |
| 2013/0000677 A1 | 1/2013 | Sumonthee | |
| 2013/0031787 A1 | 2/2013 | Kamiya et al. | |
| 2013/0031788 A1 | 2/2013 | Ohno | |
| 2013/0098402 A1 | 4/2013 | Yoon et al. | |
| 2013/0167495 A1 | 7/2013 | Borinato | |
| 2013/0214498 A1 | 8/2013 | Defazio et al. | |
| 2014/0000231 A1 | 1/2014 | Bernini | |
| 2014/0126952 A1 | 5/2014 | Fay, II | |
| 2014/0163733 A1 | 6/2014 | Sadowski et al. | |
| 2014/0197222 A1 | 7/2014 | Howe | |
| 2014/0203776 A1 | 7/2014 | Ireland et al. | |
| 2014/0204510 A1 | 7/2014 | Ireland | |
| 2014/0330496 A1 | 11/2014 | Crouse et al. | |
| 2015/0012164 A1 | 1/2015 | Yu et al. | |
| 2015/0045992 A1 | 2/2015 | Ashby et al. | |
| 2015/0120057 A1 | 4/2015 | Wong et al. | |
| 2015/0128547 A1 | 5/2015 | Einecke et al. | |
| 2015/0163993 A1 | 6/2015 | Pettersson | |
| 2015/0181806 A1 | 7/2015 | Lim et al. | |
| 2015/0270729 A1 | 9/2015 | Isobe | |
| 2015/0301532 A1 | 10/2015 | Norris et al. | |
| 2015/0379785 A1 | 12/2015 | Brown, Jr. et al. | |
| 2016/0014957 A1 | 1/2016 | Johansson et al. | |
| 2016/0075032 A1 | 3/2016 | Goel et al. | |
| 2016/0100523 A1 | 4/2016 | Anderson | |
| 2016/0128275 A1 | 5/2016 | Johnson | |

(56) References Cited

U.S. PATENT DOCUMENTS

| | | | |
|---|---|---|---|
| 2016/0146611 | A1 | 5/2016 | Matthews |
| 2016/0157275 | A1 | 6/2016 | Matthews |
| 2016/0174140 | A1 | 6/2016 | Wu et al. |
| 2016/0179095 | A1 | 6/2016 | Sarid et al. |
| 2016/0187885 | A1 | 6/2016 | Pack et al. |
| 2016/0198644 | A1 | 7/2016 | Lameli et al. |
| 2016/0311076 | A1 | 10/2016 | Matsumoto et al. |
| 2016/0316619 | A1 | 11/2016 | Johanek et al. |
| 2016/0338262 | A1 | 11/2016 | Liu et al. |
| 2016/0354931 | A1 | 12/2016 | Jones et al. |
| 2016/0360695 | A1 | 12/2016 | Klackensjö |
| 2016/0378111 | A1 | 12/2016 | Lenser et al. |
| 2017/0046663 | A1 | 2/2017 | Wong et al. |
| 2017/0088010 | A1 | 3/2017 | Tonks et al. |
| 2017/0269595 | A1 | 9/2017 | Chen |
| 2017/0303466 | A1 | 10/2017 | Grufman et al. |
| 2017/0308092 | A1 | 10/2017 | Altinger et al. |
| 2017/0325648 | A1 | 11/2017 | Huang |
| 2017/0351260 | A1 | 12/2017 | Willgert et al. |
| 2017/0361468 | A1 | 12/2017 | Cheuvront et al. |
| 2018/0103583 | A1 | 4/2018 | Stridh |
| 2018/0120852 | A1 | 5/2018 | Cho |
| 2018/0184585 | A1 | 7/2018 | Song et al. |
| 2018/0184591 | A1 | 7/2018 | Song et al. |
| 2018/0232134 | A1 | 8/2018 | Ebrahimi Afrouzi et al. |
| 2018/0246516 | A1 | 8/2018 | Franzius et al. |
| 2018/0263182 | A1 | 9/2018 | Albinger et al. |
| 2018/0267552 | A1 | 9/2018 | Artes et al. |
| 2018/0317368 | A1 | 11/2018 | Du et al. |
| 2018/0344116 | A1 | 12/2018 | Schriesheim et al. |
| 2018/0348787 | A1 | 12/2018 | Sandin et al. |
| 2019/0041869 | A1 | 2/2019 | Shao et al. |
| 2019/0049593 | A1 | 2/2019 | He et al. |
| 2019/0049968 | A1 | 2/2019 | Dean et al. |
| 2019/0049984 | A1 | 2/2019 | Wong et al. |
| 2019/0053423 | A1 | 2/2019 | Guiet et al. |
| 2019/0069330 | A1 | 2/2019 | Ebrahimi Afrouzi et al. |
| 2019/0113931 | A1 | 4/2019 | Zha et al. |
| 2019/0118877 | A1 | 4/2019 | Ran et al. |
| 2019/0141886 | A1 | 5/2019 | Liu et al. |
| 2019/0141888 | A1 | 5/2019 | Balutis et al. |
| 2019/0166487 | A1 | 5/2019 | Russ et al. |
| 2019/0176321 | A1 | 6/2019 | Afrouzi et al. |
| 2019/0187714 | A1 | 6/2019 | He et al. |
| 2019/0227574 | A1 | 7/2019 | Du et al. |
| 2019/0239428 | A1 | 8/2019 | Levin et al. |
| 2019/0246862 | A1 | 8/2019 | Gilbert, Jr. et al. |
| 2019/0248007 | A1 | 8/2019 | Duffy et al. |
| 2019/0250604 | A1 | 8/2019 | Balutis et al. |
| 2019/0265724 | A1 | 8/2019 | Sheng et al. |
| 2019/0270124 | A1 | 9/2019 | Jang et al. |
| 2019/0275666 | A1 | 9/2019 | Abramson |
| 2019/0278269 | A1 | 9/2019 | He et al. |
| 2019/0297869 | A1 | 10/2019 | Michaels et al. |
| 2019/0299398 | A1 | 10/2019 | Svensson |
| 2019/0313576 | A1 | 10/2019 | Haneda et al. |
| 2019/0320580 | A1 | 10/2019 | Haneda et al. |
| 2019/0339719 | A1 | 11/2019 | Wang et al. |
| 2019/0343040 | A1 | 11/2019 | Testolin et al. |
| 2019/0346848 | A1 | 11/2019 | Zhou et al. |
| 2019/0357430 | A1 | 11/2019 | Kraft |
| 2019/0357431 | A1 | 11/2019 | Kamfors et al. |
| 2019/0369620 | A1 | 12/2019 | Zhou et al. |
| 2019/0369629 | A1 | 12/2019 | Dalfra |
| 2019/0369640 | A1 | 12/2019 | He et al. |
| 2019/0375084 | A1 | 12/2019 | Bierdeman et al. |
| 2019/0378360 | A1 | 12/2019 | Bergenholm et al. |
| 2019/0380266 | A1 | 12/2019 | Liljedahl |
| 2019/0383887 | A1 | 12/2019 | Kleiner et al. |
| 2019/0384306 | A1 | 12/2019 | Jang et al. |
| 2019/0391589 | A1 | 12/2019 | Komorida et al. |
| 2020/0000023 | A1 | 1/2020 | Chung |
| 2020/0019156 | A1 | 1/2020 | Drew et al. |
| 2020/0022553 | A1 | 1/2020 | Gill et al. |
| 2020/0033386 | A1 | 1/2020 | Abramson |
| 2020/0037498 | A1 | 2/2020 | Ko et al. |
| 2020/0039079 | A1 | 2/2020 | Brouwers et al. |
| 2020/0042011 | A1 | 2/2020 | Ärlig et al. |
| 2020/0050208 | A1 | 2/2020 | Frick et al. |
| 2020/0073403 | A1 | 3/2020 | Abramson et al. |
| 2020/0093058 | A1 | 3/2020 | Ritzer et al. |
| 2020/0100425 | A1 | 4/2020 | Li |
| 2020/0108499 | A1 | 4/2020 | Vicenti |
| 2020/0120863 | A1 | 4/2020 | Liu et al. |
| 2020/0128750 | A1 | 4/2020 | Svensson et al. |
| 2020/0129029 | A1 | 4/2020 | Kim et al. |
| 2020/0139536 | A1 | 5/2020 | Frisby et al. |
| 2020/0146211 | A1 | 5/2020 | Wahlgren |
| 2020/0154637 | A1 | 5/2020 | Doughty |
| 2020/0170180 | A1 | 6/2020 | Kong et al. |
| 2020/0172166 | A1 | 6/2020 | Chang et al. |
| 2020/0173784 | A1 | 6/2020 | Chang |
| 2020/0193071 | A1 | 6/2020 | Yu et al. |
| 2020/0196523 | A1 | 6/2020 | Ran et al. |
| 2020/0198488 | A1 | 6/2020 | Liljedahl |
| 2020/0201328 | A1 | 6/2020 | Abramson |
| 2020/0201347 | A1 | 6/2020 | Dalfra et al. |
| 2020/0206896 | A1 | 7/2020 | Wong et al. |
| 2020/0221633 | A1 | 7/2020 | Einecke et al. |
| 2020/0229344 | A1 | 7/2020 | Du et al. |
| 2020/0233658 | A1 | 7/2020 | Yang et al. |
| 2020/0236846 | A1 | 7/2020 | Choi et al. |
| 2020/0237169 | A1 | 7/2020 | Song et al. |
| 2020/0239090 | A1 | 7/2020 | Kong et al. |
| 2020/0245550 | A1 | 8/2020 | Smith et al. |
| 2020/0253116 | A1 | 8/2020 | Ladd, Jr. et al. |
| 2020/0256369 | A1 | 8/2020 | Gao |
| 2020/0260638 | A1 | 8/2020 | Rotole |
| 2020/0267903 | A1 | 8/2020 | Gao et al. |
| 2020/0278680 | A1 | 9/2020 | Schulz et al. |
| 2020/0278683 | A1 | 9/2020 | Dean et al. |
| 2020/0281114 | A1 | 9/2020 | Jägenstedt et al. |
| 2020/0281430 | A1 | 9/2020 | Morin et al. |
| 2020/0285963 | A1 | 9/2020 | Velkey et al. |
| 2020/0287397 | A1 | 9/2020 | Jiao et al. |
| 2020/0297180 | A1 | 9/2020 | Kang et al. |
| 2020/0315087 | A1 | 10/2020 | Svensson et al. |
| 2020/0323191 | A1 | 10/2020 | Duncan et al. |
| 2020/0323408 | A1 | 10/2020 | Cohen et al. |
| 2020/0326725 | A1 | 10/2020 | Churavy et al. |
| 2020/0337201 | A1 | 10/2020 | Siekmann |
| 2020/0352082 | A1 | 11/2020 | Maeder et al. |
| 2020/0352091 | A1 | 11/2020 | Ambros et al. |
| 2020/0356093 | A1 | 11/2020 | Shimamura et al. |
| 2020/0362536 | A1 | 11/2020 | Shimamura et al. |
| 2020/0363810 | A1 | 11/2020 | Arras et al. |
| 2020/0366481 | A1 | 11/2020 | Pakkan et al. |
| 2020/0367429 | A1 | 11/2020 | Yuan |
| 2020/0369080 | A1 | 11/2020 | Cmich |
| 2020/0375096 | A1 | 12/2020 | Coleman |
| 2020/0375097 | A1 | 12/2020 | Coleman |
| 2020/0375098 | A1 | 12/2020 | Muro et al. |
| 2020/0376639 | A1 | 12/2020 | Hargis et al. |
| 2020/0383265 | A1 | 12/2020 | Holgersson |
| 2020/0393844 | A1 | 12/2020 | Ritzer et al. |
| 2020/0396916 | A1 | 12/2020 | He et al. |
| 2020/0401146 | A1 | 12/2020 | Strandberg |
| 2021/0000005 | A1 | 1/2021 | Robinson |
| 2021/0000008 | A1 | 1/2021 | Svensson et al. |
| 2021/0003405 | A1 | 1/2021 | Choi |
| 2021/0004895 | A1 | 1/2021 | Kuriyagawa et al. |
| 2021/0016453 | A1 | 1/2021 | Patel et al. |
| 2021/0018927 | A1 | 1/2021 | Ackerman et al. |
| 2021/0029873 | A1 | 2/2021 | Yamauchi et al. |
| 2021/0029874 | A1 | 2/2021 | Robertsson |
| 2021/0031367 | A1 | 2/2021 | Mirzaei et al. |
| 2021/0037703 | A1 | 2/2021 | Holgersson |
| 2021/0041871 | A1 | 2/2021 | Lai et al. |
| 2021/0048831 | A1 | 2/2021 | Yun et al. |
| 2021/0059112 | A1 | 3/2021 | Kim |
| 2021/0064036 | A1 | 3/2021 | Muro et al. |
| 2021/0064050 | A1 | 3/2021 | Pickett et al. |
| 2021/0070356 | A1 | 3/2021 | Lyzen et al. |
| 2021/0072764 | A1 | 3/2021 | Kean |

(56) References Cited

U.S. PATENT DOCUMENTS

2021/0076562 A1 3/2021 Doughty et al.
2021/0076563 A1 3/2021 Andriolo et al.
2021/0076892 A1 3/2021 Schriesheim et al.
2021/0083492 A1 3/2021 Towner et al.
2021/0083493 A1 3/2021 Towner et al.
2021/0083494 A1 3/2021 Towner et al.
2021/0084815 A1 3/2021 Li et al.
2021/0089034 A1 3/2021 Hjelmaker
2021/0092912 A1 4/2021 Wykman et al.
2021/0094346 A1 4/2021 Cmich
2021/0100160 A1 4/2021 Kang et al.
2021/0100161 A1 4/2021 Balutis et al.
2021/0107363 A1 4/2021 Han et al.
2021/0114810 A1 4/2021 Matsuoka et al.
2021/0116933 A1 4/2021 Ouyang
2021/0125366 A1 4/2021 Hasberg et al.
2021/0127569 A1 5/2021 Gruhler et al.
2021/0132604 A1 5/2021 Gillett
2021/0132624 A1 5/2021 Andriolo et al.
2021/0132625 A1 5/2021 Gillett
2021/0132626 A1 5/2021 Gillett
2021/0153428 A1 5/2021 Mittmann et al.
2021/0153710 A1 5/2021 Mosebach et al.
2021/0157331 A1 5/2021 He
2021/0161065 A1 6/2021 Holgersson
2021/0165109 A1 6/2021 Yang et al.
2021/0165411 A1 6/2021 Andriolo et al.
2021/0168999 A1 6/2021 Xu
2021/0176915 A1 6/2021 Vines et al.
2021/0179137 A1 6/2021 Gillett
2021/0185911 A1 6/2021 Agerhall
2021/0191764 A1 6/2021 Dalfra
2021/0200226 A1 7/2021 Wang et al.
2021/0200228 A1 7/2021 Grufman et al.
2021/0204473 A1 7/2021 Andriolo et al.
2021/0206367 A1 7/2021 Liu et al.
2021/0216070 A1 7/2021 Vankampen et al.
2021/0219488 A1 7/2021 Zhao et al.
2021/0221246 A1 7/2021 Liu et al.
2021/0223787 A1 7/2021 Pellisari
2021/0227744 A1 7/2021 Zhou et al.
2021/0228043 A1 7/2021 Jang et al.
2021/0230622 A1 7/2021 Crow et al.
2021/0235616 A1 8/2021 Stark et al.
2021/0255638 A1 8/2021 Ma et al.
2021/0259497 A1 8/2021 Park et al.
2021/0263131 A1 8/2021 Dalfra
2021/0263529 A1 8/2021 Takahashi et al.
2021/0270338 A1 9/2021 Ederfors
2021/0272438 A1 9/2021 Askenmalm
2021/0274705 A1 9/2021 Mårtensson et al.
2021/0282322 A1 9/2021 Yoon et al.
2021/0289695 A1 9/2021 Grufman et al.
2021/0294348 A1 9/2021 Lan et al.
2021/0298232 A1 9/2021 Wolf et al.
2021/0302999 A1 9/2021 Yokoyama et al.
2021/0311484 A1 10/2021 Lee et al.
2021/0315155 A1 10/2021 Lee et al.
2021/0321854 A1 10/2021 Zhang et al.
2021/0325872 A1 10/2021 Schlacks, IV et al.
2021/0325874 A1 10/2021 Schlacks, IV et al.
2021/0325875 A1 10/2021 Schlacks, IV et al.
2021/0325876 A1 10/2021 Schlacks, IV et al.
2021/0325877 A1 10/2021 Schlacks, IV et al.
2021/0325878 A1 10/2021 Schlacks, IV et al.
2021/0328991 A1 10/2021 Dean et al.
2021/0329841 A1 10/2021 Cuong et al.
2021/0331594 A1 10/2021 Svensson et al.
2021/0337726 A1 11/2021 Keski-Luopa et al.
2021/0344299 A1 11/2021 Layne et al.
2021/0345544 A1 11/2021 Han et al.
2021/0345545 A1 11/2021 Zhao et al.
2021/0347204 A1 11/2021 Cmich
2021/0352841 A1 11/2021 Edfors et al.
2021/0352842 A1 11/2021 Pu et al.
2021/0352843 A1 11/2021 Zhao et al.
2021/0360853 A1 11/2021 Herrera
2021/0365044 A1 11/2021 Xue et al.
2021/0382476 A1 12/2021 Morrison et al.
2022/0009363 A1 1/2022 Gilbert, Jr. et al.
2022/0022371 A1 1/2022 Askenmalm et al.
2022/0022386 A1 1/2022 Danling
2022/0029477 A1 1/2022 He et al.
2022/0030766 A1 2/2022 Johansson
2022/0039313 A1 2/2022 Morrison et al.
2022/0061212 A1 3/2022 Zeiler et al.
2022/0066456 A1 3/2022 Ebrahimi Afrouzi et al.
2022/0071086 A1 3/2022 Levin et al.
2022/0071465 A1 3/2022 Kim et al.
2022/0083075 A1 3/2022 Heiss et al.
2022/0091257 A1 3/2022 Almers et al.
2022/0100197 A1 3/2022 Chao
2022/0124973 A1 4/2022 Juel
2022/0129000 A1 4/2022 Ingvalson et al.
2022/0142438 A1 5/2022 Chen et al.
2022/0143798 A1 5/2022 Cholst et al.
2022/0151143 A1 5/2022 Liljedahl et al.
2022/0151147 A1 5/2022 Chen et al.
2022/0167552 A1 6/2022 Frick et al.
2022/0167553 A1 6/2022 Rogöet al.
2022/0174868 A1 6/2022 Flygare
2022/0180282 A1 6/2022 Powell et al.
2022/0183223 A1 6/2022 Svensson et al.
2022/0183226 A1 6/2022 Paolo Andriolo
2022/0217902 A1 7/2022 Chen et al.
2022/0217904 A1 7/2022 Svensson et al.
2022/0240444 A1 8/2022 Wang et al.
2022/0261006 A1 8/2022 Zaslavsky et al.
2022/0272897 A1 9/2022 Jiao et al.
2022/0295696 A1 9/2022 Holgersson et al.
2022/0295709 A1 9/2022 Wisse et al.
2022/0322603 A1 10/2022 Inaba et al.
2022/0322908 A1 10/2022 Cha et al.
2022/0324112 A1 10/2022 Wolowelsky et al.
2022/0326709 A1 10/2022 Andriolo
2022/0334244 A1 10/2022 Li et al.
2022/0342425 A1 10/2022 Glimberg et al.
2022/0354050 A1 11/2022 Du et al.
2022/0396969 A1 12/2022 Arvidsson et al.
2023/0008134 A1 1/2023 Olofsson et al.
2023/0008169 A1 1/2023 Cuong et al.
2023/0009964 A1 1/2023 Jonsson et al.
2023/0010420 A1 1/2023 Glimberg et al.
2023/0015812 A1 1/2023 Wikestad et al.
2023/0017821 A1 1/2023 Ma et al.
2023/0034100 A1 2/2023 Holgersson et al.
2023/0042864 A1 2/2023 Danling et al.
2023/0051150 A1 2/2023 Pu et al.
2023/0059610 A1 2/2023 Mei et al.
2023/0071262 A1 3/2023 Lundkvist et al.
2023/0074101 A1 3/2023 Mårtensson et al.
2023/0081732 A1 3/2023 Abramson
2023/0085538 A1 3/2023 Lundkvist et al.
2023/0092131 A1 3/2023 Lao et al.
2023/0117845 A1 4/2023 Holgersson et al.
2023/0119277 A1 4/2023 Leijonberger
2023/0138339 A1 5/2023 Wikestad
2023/0145580 A1 5/2023 Hong et al.
2023/0152817 A1 5/2023 Huang et al.
2023/0161357 A1 5/2023 Liljedahl et al.
2023/0176000 A1 6/2023 Abbott et al.
2023/0176225 A1 6/2023 Mårtensson et al.
2023/0185309 A1 6/2023 Glimberg et al.
2023/0189705 A1 6/2023 Svensson et al.

FOREIGN PATENT DOCUMENTS

AU 2011239328 A1 11/2011
AU 2012101338 A4 11/2012
AU 2014201952 A1 4/2014
AU 2015230722 A1 10/2015
CA 1079076 A 6/1980
CN 2382585 Y 6/2000
CN 2693167 Y 4/2005

(56) References Cited

FOREIGN PATENT DOCUMENTS

| | | | |
|---|---|---|---|
| CN | 3512456 | | 3/2006 |
| CN | 3599999 | | 1/2007 |
| CN | 3626101 | | 3/2007 |
| CN | 101185088 | A | 5/2008 |
| CN | 300775531 | | 5/2008 |
| CN | 201127182 | Y | 10/2008 |
| CN | 101313319 | A | 11/2008 |
| CN | 201226676 | Y | 4/2009 |
| CN | 201226677 | Y | 4/2009 |
| CN | 100485567 | C | 5/2009 |
| CN | 100498602 | C | 6/2009 |
| CN | 201260303 | Y | 6/2009 |
| CN | 301144405 | | 2/2010 |
| CN | 301276003 | | 6/2010 |
| CN | 301290512 | | 7/2010 |
| CN | 201557392 | U | 8/2010 |
| CN | 301328063 | | 8/2010 |
| CN | 101292244 | B | 12/2010 |
| CN | 301444971 | | 1/2011 |
| CN | 101982037 | A | 3/2011 |
| CN | 201797741 | U | 4/2011 |
| CN | 301506267 | | 4/2011 |
| CN | 201846616 | U | 6/2011 |
| CN | 301573109 | | 6/2011 |
| CN | 301611305 | | 7/2011 |
| CN | 301653707 | | 8/2011 |
| CN | 301660006 | | 8/2011 |
| CN | 301742022 | | 11/2011 |
| CN | 202077380 | U | 12/2011 |
| CN | 102523841 | A | 7/2012 |
| CN | 302020661 | | 8/2012 |
| CN | 102687620 | A | 9/2012 |
| CN | 102687625 | A | 9/2012 |
| CN | 302080704 | | 9/2012 |
| CN | 102771246 | A | 11/2012 |
| CN | 102771259 | A | 11/2012 |
| CN | 302218376 | | 12/2012 |
| CN | 102880175 | A | 1/2013 |
| CN | 302299693 | | 1/2013 |
| CN | 302350176 | | 3/2013 |
| CN | 302456271 | | 6/2013 |
| CN | 302483861 | | 6/2013 |
| CN | 103294056 | A | 9/2013 |
| CN | 103324191 | A | 9/2013 |
| CN | 103324192 | A | 9/2013 |
| CN | 203233683 | U | 10/2013 |
| CN | 302629702 | | 11/2013 |
| CN | 103473497 | A | 12/2013 |
| CN | 302702748 | | 1/2014 |
| CN | 103578164 | A | 2/2014 |
| CN | 103676947 | A | 3/2014 |
| CN | 203575087 | U | 5/2014 |
| CN | 103858584 | A | 6/2014 |
| CN | 203691948 | U | 7/2014 |
| CN | 203735069 | U | 7/2014 |
| CN | 302881351 | | 7/2014 |
| CN | 104007765 | A | 8/2014 |
| CN | 104025796 | A | 9/2014 |
| CN | 203840762 | U | 9/2014 |
| CN | 302943247 | | 9/2014 |
| CN | 302943249 | | 9/2014 |
| CN | 104094727 | A | 10/2014 |
| CN | 104111460 | A | 10/2014 |
| CN | 104111651 | A | 10/2014 |
| CN | 104111652 | A | 10/2014 |
| CN | 104111653 | A | 10/2014 |
| CN | 203851480 | U | 10/2014 |
| CN | 302974154 | | 10/2014 |
| CN | 104160830 | A | 11/2014 |
| CN | 302993652 | | 11/2014 |
| CN | 204014494 | U | 12/2014 |
| CN | 204047176 | U | 12/2014 |
| CN | 303058887 | | 12/2014 |
| CN | 303075143 | | 1/2015 |
| CN | 104360684 | A | 2/2015 |
| CN | 204143255 | U | 2/2015 |
| CN | 104571102 | A | 4/2015 |
| CN | 104686050 | A | 6/2015 |
| CN | 104704979 | A | 6/2015 |
| CN | 104704980 | A | 6/2015 |
| CN | 204362599 | U | 6/2015 |
| CN | 303232131 | | 6/2015 |
| CN | 104737699 | A | 7/2015 |
| CN | 104750104 | A | 7/2015 |
| CN | 104782314 | A | 7/2015 |
| CN | 104793614 | A | 7/2015 |
| CN | 104793617 | A | 7/2015 |
| CN | 204443108 | U | 7/2015 |
| CN | 204462853 | U | 7/2015 |
| CN | 204495362 | U | 7/2015 |
| CN | 204515530 | U | 7/2015 |
| CN | 204539960 | U | 8/2015 |
| CN | 303318601 | | 8/2015 |
| CN | 104904403 | A | 9/2015 |
| CN | 104904404 | A | 9/2015 |
| CN | 204613789 | U | 9/2015 |
| CN | 204649212 | U | 9/2015 |
| CN | 303408640 | | 10/2015 |
| CN | 105082080 | A | 11/2015 |
| CN | 105096177 | A | 11/2015 |
| CN | 303452341 | | 11/2015 |
| CN | 303452355 | | 11/2015 |
| CN | 105163037 | A | 12/2015 |
| CN | 204810982 | U | 12/2015 |
| CN | 204858702 | U | 12/2015 |
| CN | 204925588 | U | 12/2015 |
| CN | 303478376 | | 12/2015 |
| CN | 303519781 | | 12/2015 |
| CN | 105230225 | A | 1/2016 |
| CN | 103621244 | B | 2/2016 |
| CN | 105353758 | A | 2/2016 |
| CN | 303579400 | | 2/2016 |
| CN | 105432212 | A | 3/2016 |
| CN | 105512689 | A | 4/2016 |
| CN | 303654613 | | 4/2016 |
| CN | 105557175 | A | 5/2016 |
| CN | 105573308 | A | 5/2016 |
| CN | 105573311 | A | 5/2016 |
| CN | 303670522 | | 5/2016 |
| CN | 105660039 | A | 6/2016 |
| CN | 105684630 | A | 6/2016 |
| CN | 105700521 | A | 6/2016 |
| CN | 205335882 | U | 6/2016 |
| CN | 205336853 | U | 6/2016 |
| CN | 303690781 | | 6/2016 |
| CN | 105759813 | A | 7/2016 |
| CN | 205431101 | U | 8/2016 |
| CN | 205489586 | U | 8/2016 |
| CN | 303778782 | | 8/2016 |
| CN | 303862286 | | 9/2016 |
| CN | 103283404 | B | 10/2016 |
| CN | 105988469 | A | 10/2016 |
| CN | 105988470 | A | 10/2016 |
| CN | 106020207 | A | 10/2016 |
| CN | 303888354 | | 10/2016 |
| CN | 303888360 | | 10/2016 |
| CN | 106142023 | A | 11/2016 |
| CN | 205694315 | U | 11/2016 |
| CN | 303933081 | | 11/2016 |
| CN | 103941600 | B | 12/2016 |
| CN | 106171248 | A | 12/2016 |
| CN | 205812811 | U | 12/2016 |
| CN | 205829192 | U | 12/2016 |
| CN | 205830138 | U | 12/2016 |
| CN | 303969591 | | 12/2016 |
| CN | 106258166 | A | 1/2017 |
| CN | 106325280 | A | 1/2017 |
| CN | 106355609 | A | 1/2017 |
| CN | 304004639 | | 1/2017 |
| CN | 106393094 | A | 2/2017 |
| CN | 106406301 | A | 2/2017 |
| CN | 304055132 | | 2/2017 |
| CN | 304055134 | | 2/2017 |
| CN | 304055136 | | 2/2017 |

(56) References Cited

FOREIGN PATENT DOCUMENTS

CN 106489412 A 3/2017
CN 205993268 U 3/2017
CN 103576681 B 4/2017
CN 206115269 U 4/2017
CN 304095129 4/2017
CN 106647727 A 5/2017
CN 106708033 A 5/2017
CN 206196372 U 5/2017
CN 304129527 5/2017
CN 304129534 5/2017
CN 106852225 A 6/2017
CN 106877420 A 6/2017
CN 206274765 U 6/2017
CN 206278169 U 6/2017
CN 304175254 6/2017
CN 304208974 7/2017
CN 107024910 A 8/2017
CN 304227934 8/2017
CN 304241160 8/2017
CN 206472500 U 9/2017
CN 304283754 9/2017
CN 206547328 U 10/2017
CN 206547363 U 10/2017
CN 206611777 U 11/2017
CN 206611791 U 11/2017
CN 206611812 U 11/2017
CN 206619022 U 11/2017
CN 107463166 A 12/2017
CN 107463168 A 12/2017
CN 107505939 A 12/2017
CN 107515603 A 12/2017
CN 107516226 A 12/2017
CN 107517642 A 12/2017
CN 206686605 U 12/2017
CN 206808075 U 12/2017
CN 107544483 A 1/2018
CN 107600209 A 1/2018
CN 107624368 A 1/2018
CN 207037461 U 2/2018
CN 107800200 A 3/2018
CN 207075257 U 3/2018
CN 304529661 3/2018
CN 304544247 3/2018
CN 107888751 A 4/2018
CN 107913034 A 4/2018
CN 107960191 A 4/2018
CN 207201326 U 4/2018
CN 304565875 4/2018
CN 108055906 A 5/2018
CN 108064539 A 5/2018
CN 108073179 A 5/2018
CN 108156957 A 6/2018
CN 108205313 A 6/2018
CN 207496811 U 6/2018
CN 108323326 A 7/2018
CN 108337987 A 7/2018
CN 108345297 A 7/2018
CN 108345298 A 7/2018
CN 207639110 U 7/2018
CN 207651536 U 7/2018
CN 207692389 U 8/2018
CN 304767946 8/2018
CN 304794944 8/2018
CN 207851614 U 9/2018
CN 304806495 9/2018
CN 304811825 9/2018
CN 108664014 A 10/2018
CN 108693873 A 10/2018
CN 207965652 U 10/2018
CN 108919814 A 11/2018
CN 208159284 U 11/2018
CN 108957512 A 12/2018
CN 109062225 A 12/2018
CN 109075284 A 12/2018
CN 208175354 U 12/2018
CN 208285831 U 12/2018
CN 304926953 12/2018
CN 304926955 12/2018
CN 109213123 A 1/2019
CN 208387297 U 1/2019
CN 304980236 1/2019
CN 305010344 1/2019
CN 305010365 1/2019
CN 305017366 1/2019
CN 105875063 B 2/2019
CN 208480301 U 2/2019
CN 208521989 U 2/2019
CN 305027640 2/2019
CN 109542092 A 3/2019
CN 208638993 U 3/2019
CN 109566065 A 4/2019
CN 109601114 A 4/2019
CN 109658937 A 4/2019
CN 109682368 A 4/2019
CN 109682371 A 4/2019
CN 109683604 A 4/2019
CN 109696888 A 4/2019
CN 208739598 U 4/2019
CN 208752461 U 4/2019
CN 109757189 A 5/2019
CN 106982585 B 6/2019
CN 109892096 A 6/2019
CN 209002355 U 6/2019
CN 209002393 U 6/2019
CN 305196413 6/2019
CN 305225230 6/2019
CN 305227797 6/2019
CN 305227798 6/2019
CN 305227800 6/2019
CN 305503785 6/2019
CN 109960253 A 7/2019
CN 109962512 A 7/2019
CN 109983907 A 7/2019
CN 109983908 A 7/2019
CN 110018686 A 7/2019
CN 209170907 U 7/2019
CN 305261165 7/2019
CN 305261166 7/2019
CN 305265564 7/2019
CN 209265268 U 8/2019
CN 209299766 U 8/2019
CN 106155056 B 9/2019
CN 110221594 A 9/2019
CN 110268858 A 9/2019
CN 209409782 U 9/2019
CN 305355791 9/2019
CN 305357008 9/2019
CN 110347144 A 10/2019
CN 110366368 A 10/2019
CN 305407445 10/2019
CN 110447372 A 11/2019
CN 209676901 U 11/2019
CN 305447400 11/2019
CN 305452583 11/2019
CN 110584551 A 12/2019
CN 110622680 A 12/2019
CN 209861609 U 12/2019
CN 305523640 12/2019
CN 209955654 U 1/2020
CN 209964645 U 1/2020
CN 305574602 1/2020
CN 110764495 A 2/2020
CN 110850858 A 2/2020
CN 110850860 A 2/2020
CN 110852133 A 2/2020
CN 210016305 U 2/2020
CN 210116329 U 2/2020
CN 305596393 2/2020
CN 105988472 B 3/2020
CN 107493797 B 3/2020
CN 110881903 A 3/2020
CN 110895411 A 3/2020
CN 110915409 A 3/2020
CN 110928280 A 3/2020

(56) References Cited

FOREIGN PATENT DOCUMENTS

| | | | |
|---|---|---|---|
| CN | 110928285 | A | 3/2020 |
| CN | 107643751 | B | 4/2020 |
| CN | 111034450 | A | 4/2020 |
| CN | 111045423 | A | 4/2020 |
| CN | 305716236 | | 4/2020 |
| CN | 107643750 | B | 5/2020 |
| CN | 108142070 | B | 5/2020 |
| CN | 111123910 | A | 5/2020 |
| CN | 111165158 | A | 5/2020 |
| CN | 210444878 | U | 5/2020 |
| CN | 210580043 | U | 5/2020 |
| CN | 305750432 | | 5/2020 |
| CN | 305757781 | | 5/2020 |
| CN | 305789888 | | 5/2020 |
| CN | 111226569 | A | 6/2020 |
| CN | 210782124 | U | 6/2020 |
| CN | 210808273 | U | 6/2020 |
| CN | 210821640 | U | 6/2020 |
| CN | 210839520 | U | 6/2020 |
| CN | 305827495 | | 6/2020 |
| CN | 305827496 | | 6/2020 |
| CN | 305827503 | | 6/2020 |
| CN | 305860595 | | 6/2020 |
| CN | 305860598 | | 6/2020 |
| CN | 305869411 | | 6/2020 |
| CN | 106717462 | B | 7/2020 |
| CN | 108811699 | B | 7/2020 |
| CN | 210900401 | U | 7/2020 |
| CN | 210987056 | U | 7/2020 |
| CN | 211015146 | U | 7/2020 |
| CN | 305946746 | | 7/2020 |
| CN | 305946760 | | 7/2020 |
| CN | 111487982 | A | 8/2020 |
| CN | 111512766 | A | 8/2020 |
| CN | 211212948 | U | 8/2020 |
| CN | 305989577 | | 8/2020 |
| CN | 306019404 | | 8/2020 |
| CN | 105988471 | B | 9/2020 |
| CN | 111685651 | A | 9/2020 |
| CN | 211531846 | U | 9/2020 |
| CN | 211580673 | U | 9/2020 |
| CN | 107637255 | B | 10/2020 |
| CN | 110754204 | B | 10/2020 |
| CN | 111742692 | A | 10/2020 |
| CN | 111766589 | A | 10/2020 |
| CN | 111819988 | A | 10/2020 |
| CN | 211721118 | U | 10/2020 |
| CN | 211721119 | U | 10/2020 |
| CN | 211741921 | U | 10/2020 |
| CN | 211741924 | U | 10/2020 |
| CN | 306085189 | | 10/2020 |
| CN | 306128197 | | 10/2020 |
| CN | 306140210 | | 10/2020 |
| CN | 306174630 | | 11/2020 |
| CN | 112009175 | A | 12/2020 |
| CN | 112119742 | A | 12/2020 |
| CN | 112120620 | A | 12/2020 |
| CN | 112134314 | A | 12/2020 |
| CN | 112147992 | A | 12/2020 |
| CN | 212061111 | U | 12/2020 |
| CN | 212116218 | U | 12/2020 |
| CN | 212116223 | U | 12/2020 |
| CN | 306223128 | | 12/2020 |
| CN | 306236075 | | 12/2020 |
| CN | 306236808 | | 12/2020 |
| CN | 112230636 | A | 1/2021 |
| CN | 112230637 | A | 1/2021 |
| CN | 112230644 | A | 1/2021 |
| CN | 112235760 | A | 1/2021 |
| CN | 112259866 | A | 1/2021 |
| CN | 112261631 | A | 1/2021 |
| CN | 212304892 | U | 1/2021 |
| CN | 212305863 | U | 1/2021 |
| CN | 306278588 | | 1/2021 |
| CN | 306303188 | | 1/2021 |
| CN | 106909140 | B | 2/2021 |
| CN | 109247117 | B | 2/2021 |
| CN | 109683556 | B | 2/2021 |
| CN | 112306049 | A | 2/2021 |
| CN | 112385401 | A | 2/2021 |
| CN | 112400453 | A | 2/2021 |
| CN | 212499740 | U | 2/2021 |
| CN | 212515710 | U | 2/2021 |
| CN | 212520009 | U | 2/2021 |
| CN | 212539202 | U | 2/2021 |
| CN | 212572469 | U | 2/2021 |
| CN | 212621511 | U | 2/2021 |
| CN | 306328112 | | 2/2021 |
| CN | 112435422 | A | 3/2021 |
| CN | 112438114 | A | 3/2021 |
| CN | 112445221 | A | 3/2021 |
| CN | 112449864 | A | 3/2021 |
| CN | 112492956 | A | 3/2021 |
| CN | 112514637 | A | 3/2021 |
| CN | 112567959 | A | 3/2021 |
| CN | 112567961 | A | 3/2021 |
| CN | 212696648 | U | 3/2021 |
| CN | 212696668 | U | 3/2021 |
| CN | 306358736 | | 3/2021 |
| CN | 112602441 | A | 4/2021 |
| CN | 112720451 | A | 4/2021 |
| CN | 112731935 | A | 4/2021 |
| CN | 212876733 | U | 4/2021 |
| CN | 212906002 | U | 4/2021 |
| CN | 212933333 | U | 4/2021 |
| CN | 212970834 | U | 4/2021 |
| CN | 213075541 | U | 4/2021 |
| CN | 213091901 | U | 4/2021 |
| CN | 112740889 | A | 5/2021 |
| CN | 112764419 | A | 5/2021 |
| CN | 112769424 | A | 5/2021 |
| CN | 112773264 | A | 5/2021 |
| CN | 112799395 | A | 5/2021 |
| CN | 112799399 | A | 5/2021 |
| CN | 112823584 | A | 5/2021 |
| CN | 112824993 | A | 5/2021 |
| CN | 112826376 | A | 5/2021 |
| CN | 112840828 | A | 5/2021 |
| CN | 112859828 | A | 5/2021 |
| CN | 213187216 | U | 5/2021 |
| CN | 213210764 | U | 5/2021 |
| CN | 213214364 | U | 5/2021 |
| CN | 213240579 | U | 5/2021 |
| CN | 306511371 | | 5/2021 |
| CN | 306530808 | | 5/2021 |
| CN | 306569554 | | 5/2021 |
| CN | 306569555 | | 5/2021 |
| CN | 306569560 | | 5/2021 |
| CN | 107976995 | B | 6/2021 |
| CN | 110122045 | B | 6/2021 |
| CN | 112947399 | A | 6/2021 |
| CN | 112970414 | A | 6/2021 |
| CN | 113039919 | A | 6/2021 |
| CN | 213306269 | U | 6/2021 |
| CN | 306604261 | | 6/2021 |
| CN | 113064419 | A | 7/2021 |
| CN | 113156928 | A | 7/2021 |
| CN | 113156929 | A | 7/2021 |
| CN | 213814000 | U | 7/2021 |
| CN | 306670241 | | 7/2021 |
| CN | 306680105 | | 7/2021 |
| CN | 306694791 | | 7/2021 |
| CN | 106300578 | B | 8/2021 |
| CN | 108781704 | B | 8/2021 |
| CN | 113311830 | A | 8/2021 |
| CN | 213850492 | U | 8/2021 |
| CN | 213921292 | U | 8/2021 |
| CN | 306745285 | | 8/2021 |
| CN | 306753239 | | 8/2021 |
| CN | 306768440 | | 8/2021 |
| CN | 113366964 | A | 9/2021 |
| CN | 113439526 | A | 9/2021 |
| CN | 113448259 | A | 9/2021 |
| CN | 214126036 | U | 9/2021 |

(56) References Cited

FOREIGN PATENT DOCUMENTS

| | | | |
|---|---|---|---|
| CN | 214151499 | U | 9/2021 |
| CN | 214178073 | U | 9/2021 |
| CN | 214240309 | U | 9/2021 |
| CN | 306824139 | | 9/2021 |
| CN | 306839148 | | 9/2021 |
| CN | 306846782 | | 9/2021 |
| CN | 113455167 | A | 10/2021 |
| CN | 113552873 | A | 10/2021 |
| CN | 113552874 | A | 10/2021 |
| CN | 214508006 | U | 10/2021 |
| CN | 306880401 | | 10/2021 |
| CN | 113721749 | A | 11/2021 |
| CN | 214852822 | U | 11/2021 |
| CN | 113759377 | A | 12/2021 |
| CN | 113759886 | A | 12/2021 |
| CN | 113771556 | A | 12/2021 |
| CN | 113778084 | A | 12/2021 |
| CN | 113805573 | A | 12/2021 |
| CN | 113812251 | A | 12/2021 |
| CN | 215011658 | U | 12/2021 |
| CN | 215041875 | U | 12/2021 |
| CN | 215073955 | U | 12/2021 |
| CN | 215122126 | U | 12/2021 |
| CN | 215223139 | U | 12/2021 |
| CN | 215223140 | U | 12/2021 |
| CN | 215244172 | U | 12/2021 |
| CN | 215269503 | U | 12/2021 |
| CN | 215321765 | U | 12/2021 |
| CN | 307001745 | | 12/2021 |
| CN | 307035324 | | 12/2021 |
| CN | 113892332 | A | 1/2022 |
| CN | 113970918 | A | 1/2022 |
| CN | 307047963 | | 1/2022 |
| CN | 307047966 | | 1/2022 |
| CN | 114089423 | A | 2/2022 |
| CN | 215774282 | U | 2/2022 |
| CN | 215813854 | U | 2/2022 |
| CN | 215911524 | U | 2/2022 |
| CN | 307125064 | | 2/2022 |
| CN | 114097400 | A | 3/2022 |
| CN | 307168522 | | 3/2022 |
| CN | 307168531 | | 3/2022 |
| CN | 307168534 | | 3/2022 |
| CN | 307168536 | | 3/2022 |
| CN | 307202311 | | 3/2022 |
| CN | 216153511 | U | 4/2022 |
| CN | 216253986 | U | 4/2022 |
| CN | 307222105 | | 4/2022 |
| CN | 307243485 | | 4/2022 |
| CN | 307265564 | | 4/2022 |
| CN | 307265565 | | 4/2022 |
| CN | 307278021 | | 4/2022 |
| CN | 307278029 | | 4/2022 |
| CN | 307301254 | | 4/2022 |
| CN | 216507708 | U | 5/2022 |
| CN | 216610752 | U | 5/2022 |
| CN | 307325242 | | 5/2022 |
| CN | 307337031 | | 5/2022 |
| CN | 307347754 | | 5/2022 |
| CN | 307347757 | | 5/2022 |
| CN | 307369096 | | 5/2022 |
| CN | 307369129 | | 5/2022 |
| CN | 307376792 | | 5/2022 |
| CN | 115666221 | A | 1/2023 |
| DE | 7345220 | U | 6/1974 |
| DE | 7345211 | U | 11/1974 |
| DE | 2437756 | A1 | 3/1975 |
| DE | 2448130 | A1 | 4/1976 |
| DE | 7609000 | U1 | 9/1977 |
| DE | 2612381 | A1 | 10/1977 |
| DE | 19521067 | A1 | 12/1996 |
| DE | 19644057 | A1 | 5/1998 |
| DE | 29823263 | U1 | 4/1999 |
| DE | 19933340 | A1 | 1/2001 |
| DE | 20308046 | U1 | 7/2003 |
| DE | 10302908 | A1 | 8/2004 |
| DE | 102006038553 | A1 | 2/2008 |
| DE | 102007053310 | A1 | 6/2009 |
| DE | 102007060056 | A1 | 6/2009 |
| DE | 102008011947 | A1 | 9/2009 |
| DE | 202010007832 | U1 | 8/2010 |
| DE | 402010004757-0001 | | 12/2010 |
| DE | 102009027557 | A1 | 1/2011 |
| DE | 202012011298 | U1 | 1/2013 |
| DE | 202012009375 | U1 | 4/2013 |
| DE | 102013202075 | A1 | 8/2014 |
| DE | 102013203549 | A1 | 9/2014 |
| DE | 102013203705 | A1 | 9/2014 |
| DE | 202014005547 | U1 | 9/2014 |
| DE | 202014102390 | U1 | 9/2014 |
| DE | 102014211712 | A1 | 2/2015 |
| DE | 102014112587 | A1 | 3/2015 |
| DE | 102014208434 | A1 | 11/2015 |
| DE | 102014210277 | A1 | 12/2015 |
| DE | 102014212399 | A1 | 12/2015 |
| DE | 102016205336 | A1 | 10/2017 |
| DE | 102016219270 | A1 | 4/2018 |
| DE | 102016222659 | A1 | 5/2018 |
| DE | 202018100833 | U1 | 5/2018 |
| DE | 202018100835 | U1 | 5/2018 |
| DE | 202018100836 | U1 | 5/2018 |
| DE | 102017204865 | A1 | 9/2018 |
| DE | 102018206803 | A1 | 11/2019 |
| DE | 202015009764 | U1 | 1/2020 |
| DE | 102019206856 | A1 | 11/2020 |
| DE | 102019214995 | A1 | 4/2021 |
| DE | 102019215913 | A1 | 4/2021 |
| DE | 102021100122 | A1 | 7/2021 |
| DE | 102020202740 | A1 | 9/2021 |
| EP | 1364571 | A2 | 11/2003 |
| EP | 1709859 | A1 | 10/2006 |
| EP | 2006708 | A1 | 12/2008 |
| EP | 2026161 | A1 | 2/2009 |
| EP | 2163352 | A2 | 3/2010 |
| EP | 2248409 | A1 | 11/2010 |
| EP | 2269433 | A1 | 1/2011 |
| EP | 2286653 | A2 | 2/2011 |
| EP | 2296072 | A2 | 3/2011 |
| EP | 2425700 | A2 | 3/2012 |
| EP | 2586283 | A1 | 5/2013 |
| EP | 2687077 | A2 | 1/2014 |
| EP | 2693072 | A1 | 2/2014 |
| EP | 2798937 | A1 | 11/2014 |
| EP | 2823936 | A2 | 1/2015 |
| EP | 2851760 | A1 | 3/2015 |
| EP | 2875712 | A1 | 5/2015 |
| EP | 2717110 | B1 | 8/2015 |
| EP | 2959764 | A1 | 12/2015 |
| EP | 2960741 | A2 | 12/2015 |
| EP | 2960742 | A1 | 12/2015 |
| EP | 2783561 | B1 | 3/2016 |
| EP | 2692220 | B1 | 4/2016 |
| EP | 3047719 | A1 | 7/2016 |
| EP | 3118016 | A1 | 1/2017 |
| EP | 3165075 | A1 | 5/2017 |
| EP | 3167699 | A1 | 5/2017 |
| EP | 3167700 | A1 | 5/2017 |
| EP | 3222132 | A2 | 9/2017 |
| EP | 2883437 | B1 | 3/2018 |
| EP | 3308907 | A1 | 4/2018 |
| EP | 3316067 | A1 | 5/2018 |
| EP | 2743789 | B1 | 6/2018 |
| EP | 3330824 | A1 | 6/2018 |
| EP | 3366102 | A1 | 8/2018 |
| EP | 3381258 | A1 | 10/2018 |
| EP | 3479682 | A1 | 5/2019 |
| EP | 2960100 | B1 | 8/2019 |
| EP | 3520593 | A1 | 8/2019 |
| EP | 3528213 | A1 | 8/2019 |
| EP | 3534183 | A1 | 9/2019 |
| EP | 3597090 | A1 | 1/2020 |
| EP | 3660618 | A1 | 6/2020 |
| EP | 3725146 | A1 | 10/2020 |
| EP | 3753387 | A1 | 12/2020 |

(56) References Cited

FOREIGN PATENT DOCUMENTS

| | | | |
|---|---|---|---|
| EP | 3791708 | A1 | 3/2021 |
| EP | 3831544 | A1 | 6/2021 |
| EP | 3837944 | A1 | 6/2021 |
| EP | 3837945 | A1 | 6/2021 |
| EP | 3837946 | A1 | 6/2021 |
| EP | 3861911 | A2 | 8/2021 |
| ES | 199267 | U | 7/1975 |
| ES | 451339 | A1 | 12/1977 |
| FR | 2771141 | A1 | 5/1999 |
| FR | 3114537 | A1 | 4/2022 |
| GB | 1288108 | A | 3/1971 |
| GB | 1371959 | A | 10/1974 |
| GB | 1451896 | A | 10/1976 |
| GB | 1452308 | A | 10/1976 |
| GB | 1489373 | A | 10/1977 |
| GB | 1526519 | A | 9/1978 |
| GB | 1557379 | A | 12/1979 |
| GB | 2287170 | A | 9/1995 |
| GB | 2295304 | A | 5/1996 |
| GB | 2305840 | A | 4/1997 |
| GB | 2419430 | A | 4/2006 |
| GB | 2432922 | A | 6/2007 |
| GB | 2433791 | A | 7/2007 |
| GB | 90017056580001 | | 5/2010 |
| GB | 2500168 | A | 9/2013 |
| GB | 90024715400001 | | 8/2014 |
| GB | 2513960 | A | 11/2014 |
| GB | 2515556 | A | 12/2014 |
| GB | 2516370 | A | 1/2015 |
| GB | 90027012680001 | | 5/2015 |
| GB | 90027378900001 | | 10/2015 |
| GB | 90041329260001 | | 9/2017 |
| GB | 90029638920001 | | 3/2018 |
| GB | 90056318840001 | | 9/2018 |
| GB | 2563347 | A | 12/2018 |
| GB | 90040756950001 | | 6/2019 |
| GB | 90073918420006 | | 1/2020 |
| GB | 90080413210001 | | 8/2020 |
| GB | 2581956 | A | 9/2020 |
| GB | 90081876860001 | | 10/2020 |
| GB | 6195686 | | 5/2022 |
| JP | 2006251883 | A | 9/2006 |
| JP | 2006268497 | A | 10/2006 |
| JP | 2011020615 | A | 2/2011 |
| JP | 2015149963 | A | 8/2015 |
| KR | 20130044130 | A | 5/2013 |
| KR | 20150125305 | A | 11/2015 |
| SE | 538774 | C2 | 11/2016 |
| SE | 540834 | C2 | 11/2018 |
| SE | 542098 | C2 | 2/2020 |
| SE | 543019 | C2 | 9/2020 |
| SE | 543247 | C2 | 10/2020 |
| SE | 2150377 | A1 | 3/2021 |
| SE | 1951390 | A1 | 6/2021 |
| SE | 2150080 | A1 | 6/2021 |
| SE | 2050216 | A1 | 8/2021 |
| SE | 543941 | C2 | 9/2021 |
| SE | 543943 | C2 | 9/2021 |
| SE | 2150193 | A1 | 10/2021 |
| SE | 2150394 | A1 | 10/2021 |
| WO | WO9106435 | A1 | 5/1991 |
| WO | WO9749528 | A1 | 12/1997 |
| WO | WO0060921 | A1 | 10/2000 |
| WO | WO0074466 | A1 | 12/2000 |
| WO | WO03040846 | A1 | 5/2003 |
| WO | WO03103375 | A1 | 12/2003 |
| WO | WO2005002320 | A1 | 1/2005 |
| WO | WO2006094887 | A2 | 9/2006 |
| WO | WO2006094889 | A1 | 9/2006 |
| WO | WO2006102740 | A1 | 10/2006 |
| WO | WO2007091967 | A1 | 8/2007 |
| WO | WO2007140930 | A1 | 12/2007 |
| WO | WO2008015479 | A2 | 2/2008 |
| WO | WO2008060689 | A2 | 5/2008 |
| WO | WO2008068494 | A1 | 6/2008 |
| WO | WO2008095715 | A2 | 8/2008 |
| WO | WO2008144135 | A1 | 11/2008 |
| WO | WO2009036644 | A1 | 3/2009 |
| WO | WO2009071379 | A1 | 6/2009 |
| WO | WO2009077239 | A1 | 6/2009 |
| WO | WO-2009079698 | A1 * | 7/2009 ............... B25C 1/02 |
| WO | WO2009083319 | A1 | 7/2009 |
| WO | WO2010077198 | A1 | 7/2010 |
| WO | WO2010130479 | A2 | 11/2010 |
| WO | WO2011115536 | A1 | 9/2011 |
| WO | WO2012047176 | A1 | 4/2012 |
| WO | WO2013010475 | A1 | 1/2013 |
| WO | WO2013011252 | A1 | 1/2013 |
| WO | WO2013025135 | A1 | 2/2013 |
| WO | WO2013064301 | A1 | 5/2013 |
| WO | WO2013081516 | A1 | 6/2013 |
| WO | WO2013083311 | A1 | 6/2013 |
| WO | WO2013102417 | A1 | 7/2013 |
| WO | WO2013107266 | A1 | 7/2013 |
| WO | WO2013107374 | A1 | 7/2013 |
| WO | WO2013125992 | A1 | 8/2013 |
| WO | WO2013185622 | A1 | 12/2013 |
| WO | WO2014007694 | A1 | 1/2014 |
| WO | WO2014056443 | A1 | 4/2014 |
| WO | WO2014071860 | A1 | 5/2014 |
| WO | WO2014079363 | A1 | 5/2014 |
| WO | WO2014079632 | A1 | 5/2014 |
| WO | WO2014086267 | A1 | 6/2014 |
| WO | WO2014173290 | A1 | 10/2014 |
| WO | WO2015010277 | A1 | 1/2015 |
| WO | WO2015053488 | A1 | 4/2015 |
| WO | WO2015144998 | A1 | 10/2015 |
| WO | WO2015154822 | A1 | 10/2015 |
| WO | WO2015161829 | A1 | 10/2015 |
| WO | WO2015169343 | A1 | 11/2015 |
| WO | WO2015172831 | A1 | 11/2015 |
| WO | WO2015182514 | A1 | 12/2015 |
| WO | WO2015192903 | A1 | 12/2015 |
| WO | WO2016038512 | A1 | 3/2016 |
| WO | WO2016097891 | A1 | 6/2016 |
| WO | WO2016097892 | A1 | 6/2016 |
| WO | WO2016097897 | A1 | 6/2016 |
| WO | WO2016103070 | A1 | 6/2016 |
| WO | WO2016108104 | A1 | 7/2016 |
| WO | WO2016109721 | A1 | 7/2016 |
| WO | WO2016119751 | A1 | 8/2016 |
| WO | WO2016127923 | A1 | 8/2016 |
| WO | WO2016131399 | A1 | 8/2016 |
| WO | 2016160699 | A1 | 10/2016 |
| WO | WO2016184398 | A1 | 11/2016 |
| WO | WO2017101882 | A1 | 6/2017 |
| WO | WO2017123137 | A1 | 7/2017 |
| WO | WO2017129551 | A1 | 8/2017 |
| WO | WO2017133625 | A1 | 8/2017 |
| WO | WO2017148438 | A1 | 9/2017 |
| WO | WO2017167207 | A1 | 10/2017 |
| WO | WO2017181995 | A1 | 10/2017 |
| WO | WO2017186372 | A1 | 11/2017 |
| WO | WO2017190784 | A1 | 11/2017 |
| WO | WO2017198222 | A1 | 11/2017 |
| WO | WO2017206950 | A1 | 12/2017 |
| WO | WO2017211308 | A1 | 12/2017 |
| WO | WO2018001340 | A1 | 1/2018 |
| WO | WO2018010650 | A1 | 1/2018 |
| WO | WO2018028624 | A1 | 2/2018 |
| WO | WO2018057250 | A1 | 3/2018 |
| WO | WO2018057452 | A2 | 3/2018 |
| WO | WO2018057589 | A1 | 3/2018 |
| WO | WO2018059323 | A1 | 4/2018 |
| WO | WO2018103178 | A1 | 6/2018 |
| WO | WO2018117190 | A1 | 6/2018 |
| WO | WO2018125222 | A1 | 7/2018 |
| WO | WO2018127209 | A1 | 7/2018 |
| WO | WO2018146518 | A1 | 8/2018 |
| WO | WO2018153599 | A1 | 8/2018 |
| WO | WO2018174777 | A1 | 9/2018 |
| WO | WO2018185376 | A1 | 10/2018 |
| WO | WO2018199829 | A1 | 11/2018 |
| WO | WO2019034382 | A1 | 2/2019 |

(56) References Cited

FOREIGN PATENT DOCUMENTS

WO WO2019063012 A1 4/2019
WO WO2019080935 A1 5/2019
WO WO2019096052 A1 5/2019
WO WO2019096463 A1 5/2019
WO WO2019109982 A1 6/2019
WO WO2019110013 A1 6/2019
WO WO2019144916 A1 8/2019
WO WO2019157841 A1 8/2019
WO WO2019158090 A1 8/2019
WO WO2019158452 A1 8/2019
WO WO2019168069 A1 9/2019
WO WO2019170142 A1 9/2019
WO WO2019206274 A1 10/2019
WO WO2019238099 A1 12/2019
WO WO2020020652 A1 1/2020
WO WO2020063811 A1 4/2020
WO WO2020064087 A1 4/2020
WO WO2020093970 A1 5/2020
WO WO2020093992 A1 5/2020
WO WO2020098666 A1 5/2020
WO WO2020098670 A1 5/2020
WO WO2020103696 A1 5/2020
WO WO2020104242 A1 5/2020
WO WO2020107007 A1 5/2020
WO WO2020107772 A1 6/2020
WO WO2020108267 A1 6/2020
WO WO2020108550 A1 6/2020
WO WO2020114415 A1 6/2020
WO WO2020125450 A1 6/2020
WO WO2020134667 A1 7/2020
WO WO2020148138 A1 7/2020
WO WO2020155853 A1 8/2020
WO WO2020156519 A1 8/2020
WO WO2020156684 A1 8/2020
WO WO2020156851 A1 8/2020
WO WO2020161021 A1 8/2020
WO WO2020170933 A1 8/2020
WO WO2020193513 A1 10/2020
WO WO2020199055 A1 10/2020
WO WO2020218960 A1 10/2020
WO WO2020256619 A1 12/2020
WO WO2020259586 A1 12/2020
WO WODM212022 12/2020
WO WO2021013173 A1 1/2021
WO WO2021023227 A1 2/2021
WO WO2021031418 A1 2/2021
WO WO2021031423 A1 2/2021
WO WO2021031451 A1 2/2021
WO WO2021036033 A1 3/2021
WO WO2021036077 A1 3/2021
WO WO2021047063 A1 3/2021
WO WO2021047068 A1 3/2021
WO WO2021047602 A1 3/2021
WO WO2021068370 A1 4/2021
WO WO2021068928 A1 4/2021
WO WO2021078220 A1 4/2021
WO WO2021082817 A1 5/2021
WO WO2021088551 A1 5/2021
WO WO2021088553 A1 5/2021
WO WO2021088558 A1 5/2021
WO WO2021093474 A1 5/2021
WO WO2021093526 A1 5/2021
WO WO2021093851 A1 5/2021
WO WO2021098382 A1 5/2021
WO WO2021103803 A1 6/2021
WO WO2021103804 A1 6/2021
WO WO2021110414 A1 6/2021
WO WO2021114988 A1 6/2021
WO WO2021115364 A1 6/2021
WO WO2021136234 A1 7/2021
WO WO2021139389 A1 7/2021
WO WO2021139683 A1 7/2021
WO WO2021139685 A1 7/2021
WO WO2021139809 A1 7/2021
WO WO2021147494 A1 7/2021
WO WO2021147792 A1 7/2021
WO WO2021164738 A1 8/2021
WO WO2021175331 A1 9/2021
WO WO2021180123 A1 9/2021
WO WO2021190627 A1 9/2021
WO WO2021208308 A1 10/2021
WO WO2021215980 A1 10/2021
WO WODM217452 10/2021
WO WO2021225494 A1 11/2021
WO WO2021230791 A1 11/2021
WO WO2021233205 A1 11/2021
WO WO2022042362 A1 3/2022

OTHER PUBLICATIONS

US 8,275,482 B2, 09/2012, Casey et al. (withdrawn)
US 10,675,758 B2, 06/2020, Cohen et al. (withdrawn)
US 10,798,874 B2, 10/2020, Balutis et al. (withdrawn)
US 10,952,370 B2, 03/2021, Matt et al. (withdrawn)
Extended European Search Report for Application No. 23166187.7 dated Oct. 16, 2023 (9 pages).

* cited by examiner

PEG DRIVER

CROSS-REFERENCE TO RELATED APPLICATIONS

This application claims priority to prior-filed, co-pending U.S. Provisional Patent Application No. 63/347,405 filed on May 31, 2022, the entire contents of which is incorporated herein by reference.

FIELD OF THE INVENTION

The embodiments described herein are related to a peg driver.

BACKGROUND OF THE INVENTION

Driving steaks into the ground is generally required for some outdoor operations.

SUMMARY

In one aspect, a peg driver for use with a peg has a base, a driver shaft, and a driver arm. The peg includes a hook member and defines a peg axis. The base is at least partially defined by a driver channel having an outlet. The driver channel defines a channel axis. The driver shaft has a first end and a second end opposite the first end. The driver shaft defines a shaft channel open to the driver channel. The first end of the driver shaft is at least partially positioned within and moveable axially along the driver shaft between an at rest position and an actuated position. The driver arm is movably coupled to the driver shaft proximate the first end. The driver arm is moveable with respect to the driver shaft between a retracted position, in which the driver arm obstructs the shaft channel by a first amount, and a deployed position in which the driver arm obstructs the shaft channel by a second amount. The driver arm is configured to move from the retracted position to the deployed position as the driver shaft moves from the rest position to the actuated position.

In another aspect, a peg driver for use with a peg has a base, a handle shaft, a handle, a plunger, and barrel, and an indexing assembly. The peg includes a hook member and defines a peg axis. The base is at least partially defined by a driver channel having an outlet. The driver channel defines a channel axis. The handle shaft is fixedly coupled to the base and extends from the base. The handle is coupled to the handle shaft opposite the base. The plunger is at least partially positioned within the driver channel. The plunger is axially moveable within the driver channel between a retracted position and an actuated position. The barrel is rotatable with respect to the base. The barrel is in operable communication with the plunger such that the rotation of the barrel in a first direction with respect to the base causes the plunger to reciprocate between the retracted position and the actuated position.

In yet another aspect, a peg driver for use with a peg has a base, a plunger, magazine, and an indexing assembly. The peg includes a hook member and defines a peg axis. The base at least partially defines a driver channel having an outlet. The driver channel defines a channel axis. The plunger is at least partially positioned within the driver channel. The plunger is moveably axially within the driver channel between a retracted and an actuated position. The magazine is selectively open to the driver channel and configured to store one or more pegs therein. The indexing assembly is in operable communication with both the magazine and the driver channel. The indexing assembly is configured to permit one peg from within the indexing to enter the driver channel while maintaining any remaining pegs within the magazine. The indexing assembly is operable independent the plunger.

Other aspects will become apparent by consideration of the detailed description and accompanying drawings.

DETAILED DESCRIPTION

Figure 1:
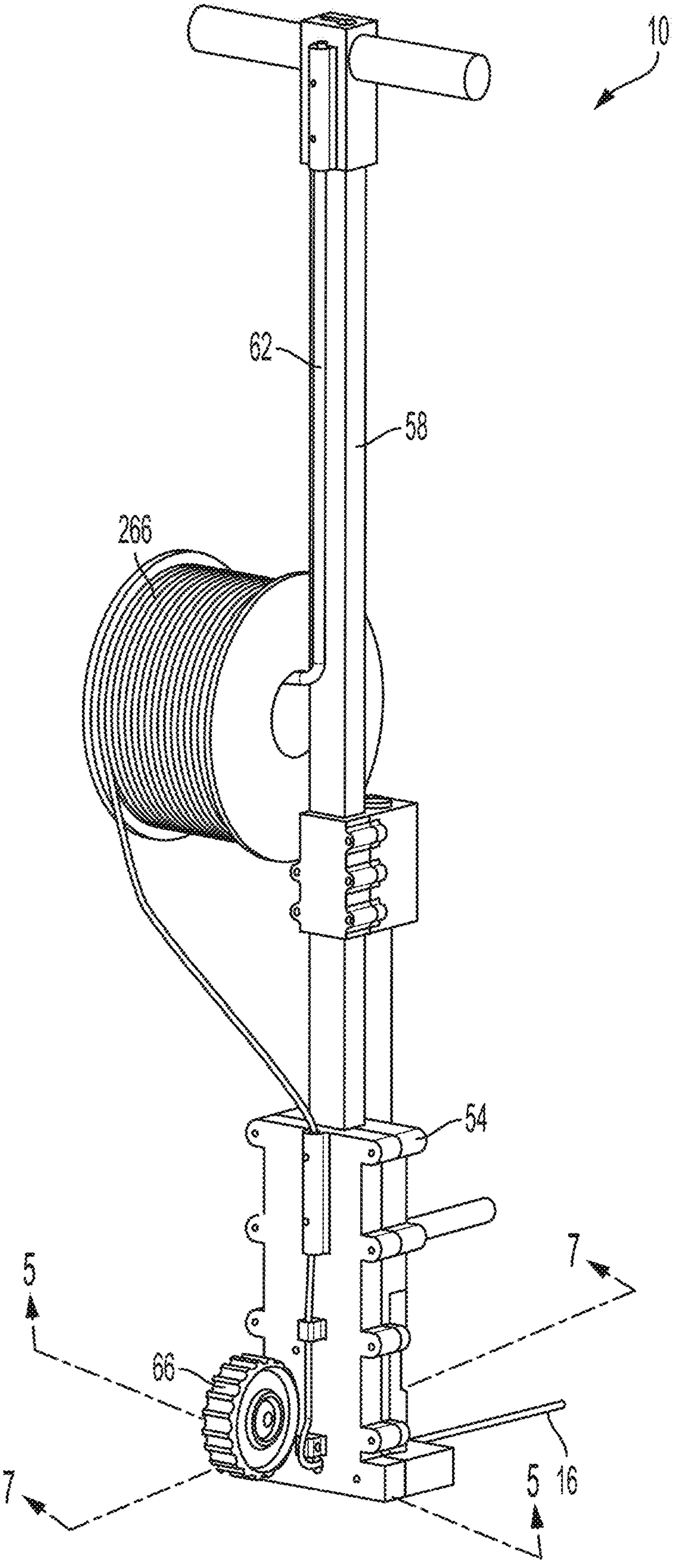
FIG. 1 is a perspective view of a peg driver.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

FIGS. 1-7 illustrate a peg driver 10 for driving a peg or stake 14 into a support surface 18 (e.g., the ground). More specifically, the peg driver 10 is configured to lay a length of boundary wire 16 along the support surface 18 in a first direction of travel T, orient the peg 14 relative to a support surface 18 and the boundary wire 16, and drive the peg 14 into the support surface 18 such that the peg 14 captures and retains a portion of the boundary wire 16 relative to the support surface 18.

Figure 17:
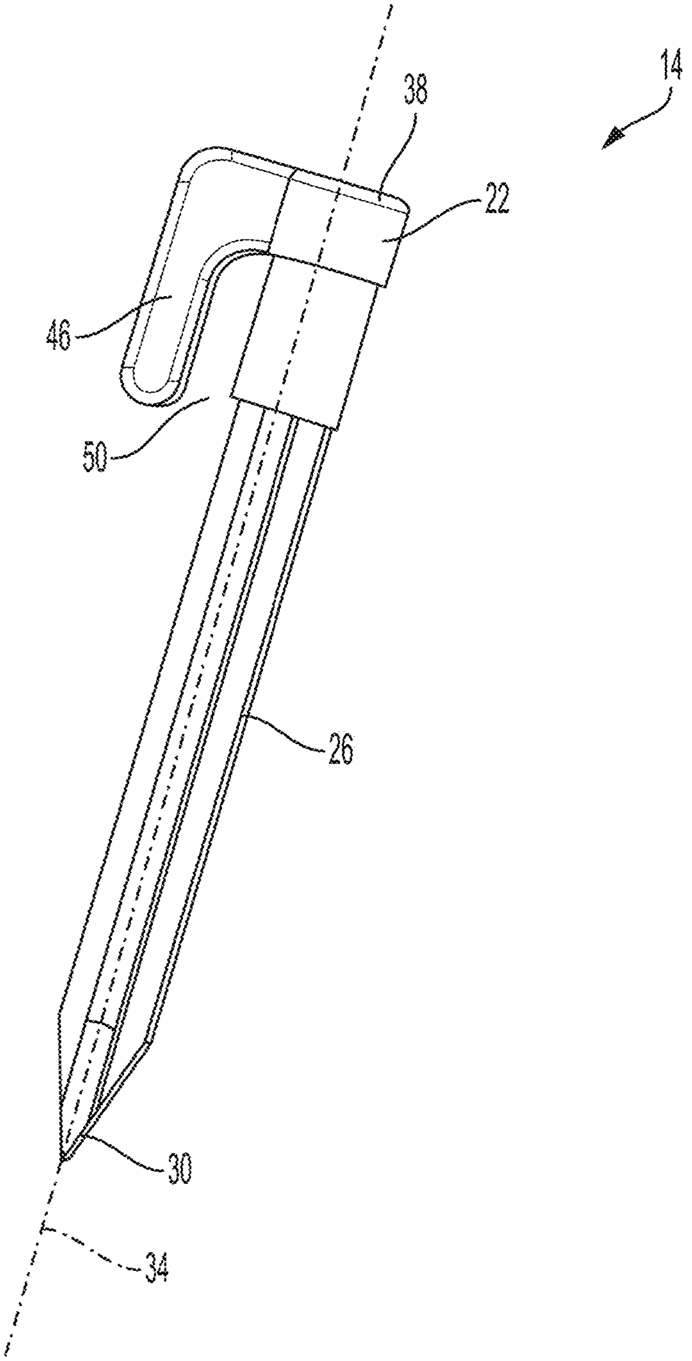
FIG. 17 is a perspective view of a peg.
Figure 18:
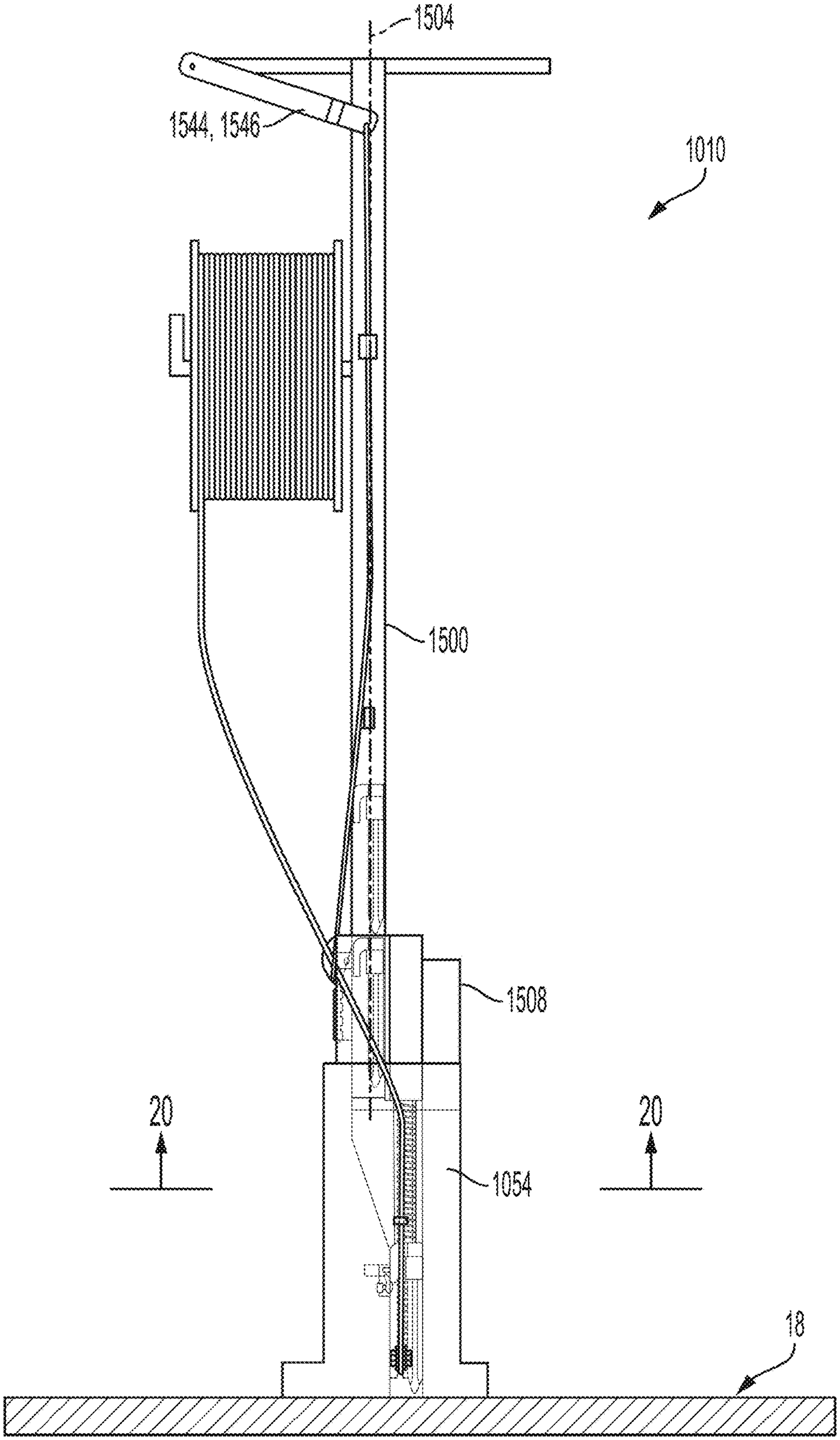
FIG. 18 is a front view of another embodiment of a peg driver.

As shown in FIG. 17, the peg 14 configured for use with the peg driver 10 includes a head portion 22 and a shaft portion 26 extending from the head portion 22 to produce a distal end or tip 30 and an individual peg axis 34. The peg 14 may have a length between 110 mm and 100 mm, or a length between 108 mm and 105 mm, or a length of 103 mm. The head portion 22 of the peg 14 includes a contact surface 38, opposite the distal end 30, configured to be engaged by the driver assembly 58 of the peg driver 10 (described below) and a hook member 46 extending from the head portion 22. During the driving process, the open end 50 of the hook member 46 is configured to collect the boundary wire 16 and capture the boundary wire 16 between itself and the support surface 18, securing the boundary wire 16 in place.

As shown in FIGS. 1-8, the peg driver 10 includes a base 54, a driver assembly 58 movably coupled to the base 54, and boundary wire deployment assembly 62. The peg driver 10 may also include one or more wheels 66 coupled to the base 54 and configured to allow the peg driver 10 to be more easily rolled or otherwise conveyed along the support surface 18 while at least partially supporting the weight thereof.

Figure 5:
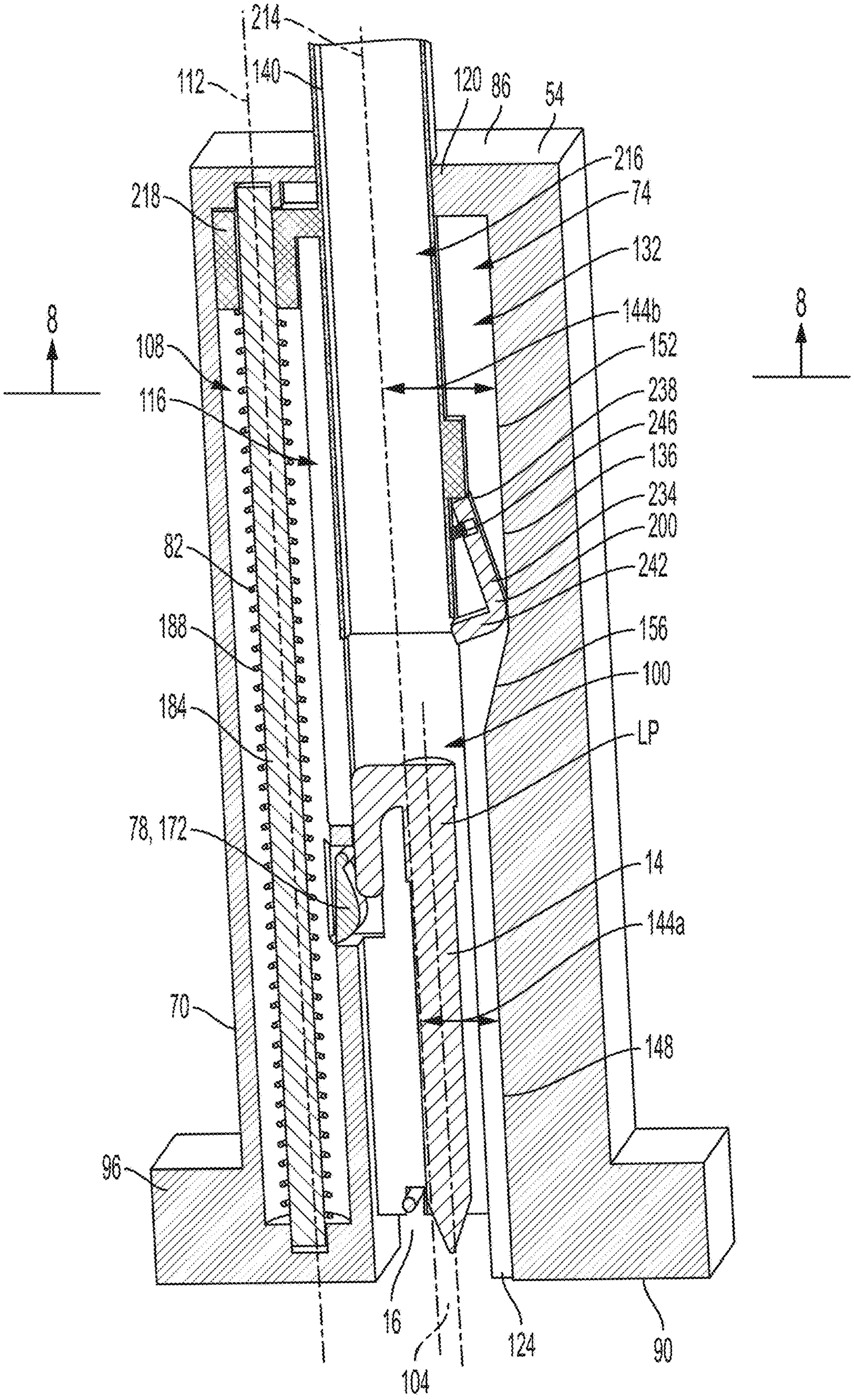
FIG. 5 is a section view taken along line 5-5 of FIG. 1 with the driver assembly in a retracted position.

The base 54 of the peg driver 10 includes a body 70 defining a driver channel 74, a retention mechanism 78 in operable communication with the driver channel 74, and a recoil assembly 82 at least partially positioned within the driver channel 74. The body 70, in turn, includes a top or first side 86, and a bottom or second side 90 opposite the first side 86. As shown in FIG. 5, the body 70 may also include a pair of feet or footpads 96 extending outwardly from the body 70 adjacent the second side 90 thereof. During use, the footpads 96 are configured to permit the user to stand or otherwise apply weight to the base 54 to hold the peg driver 10 in place. While the illustrated footpads 96 are rectangular in shape, it is understood that any size or shape may be used that permits the user to step onto and apply downward force into the base 54 of the peg driver 10.

The driver channel 74 of the base 54 includes a first passage 100 defining a first axis 104, and a second passage 108 parallel to and offset laterally from the first passage 100 defining a second axis 112. The driver channel 74 also includes an intermediate passage 116 extending between and open to both the first passage 100 and the second passage 108 over at least a portion of the axial length thereof. During use, the driver channel 74 is configured to generally align the peg 14, the driver assembly 58, and the boundary wire 16 during the installation process.

Figure 8:
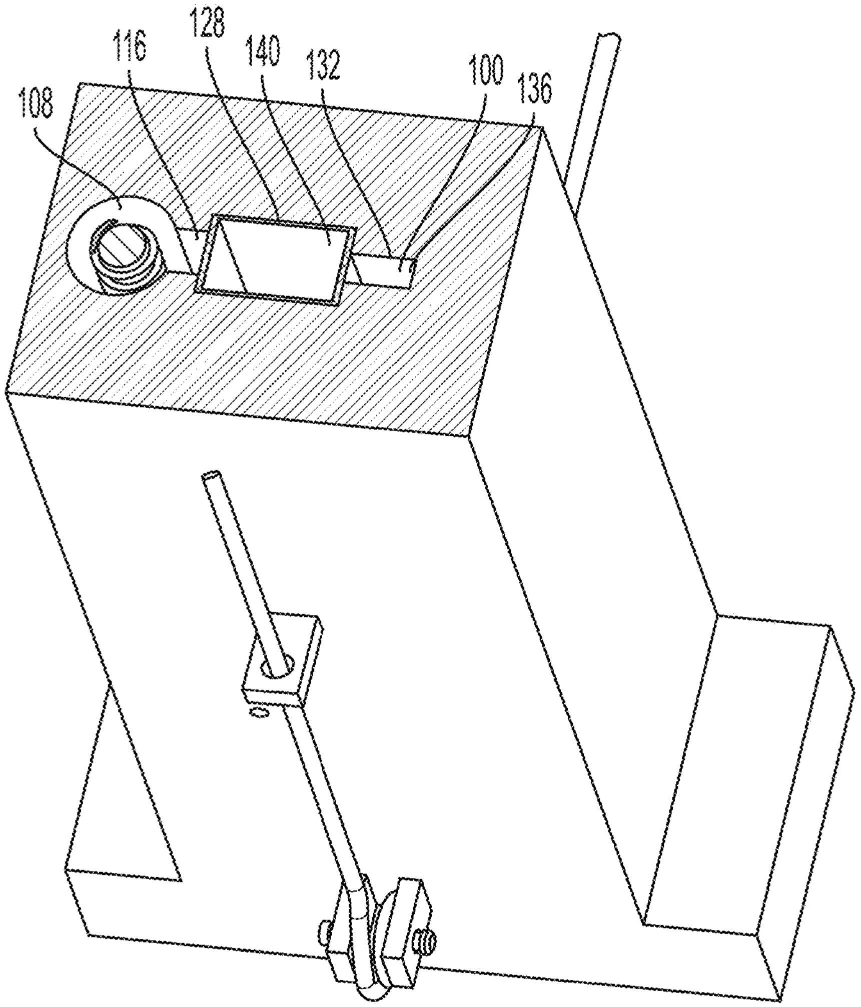
FIG. 8 is a section view taken along line 8-8 of FIG. 5.

The first passage 100 of the driver channel 74 is oriented vertically within the base 54 having a first end 120 open to the first side 86 of the body 70 and a second end or outlet 124 open to the second side 90 of the body 70. As shown in FIG. 8, the cross-sectional shape of the first passage 100 includes a first portion 128, generally corresponding to the cross-sectional shape of the driver shaft 140 of the driver assembly 58 (described below), and a second portion 132 extending radially outwardly from the first portion 128 to define a cam surface 136. More specifically, the cross-sectional shape of the first portion 128 of the first passage 100 is generally rectangular in shape having a width and depth that substantially corresponds to the width and depth of the driver shaft 140. During use, the first portion 128 of the first passage 100 is sized so that the driver shaft 140 can travel axially along the length of the first passage 100 but is unable to rotate with respect thereto. While the illustrated embodiment of the first portion 128 is rectangular in cross-sectional shape to correspond to the shape of the driver shaft 140, it is understood that in other embodiments different cross-sectional shapes may be used.

As shown in FIGS. 5 and 8, the second portion 132 of the first passage 100 extends radially outwardly from the first portion 128 to produce a cam surface 136 spaced a cam length from the first axis 104. More specifically, the second portion 132 is open to and extends radially away from the first portion 128 while extending axially along the length thereof whereby the cam length generally decreases as the cam surface 136 extends from the first end 120 toward the outlet 124. In the illustrated embodiment, the second portion 132 includes a first region 148 positioned proximate the outlet 124 and defining a first cam length 144*a*, a second region 152 positioned proximate the first end 120 and defining a second cam length 144*b* that is greater than the first cam length 144*a*, and an intermediate region 156 extending between the first region 148 and the second region 152 and having the cam surface 136 smoothly transition from the first cam length 144*a* to the second cam length 144*b*. The cross-sectional shape of the second portion 132 is sized and shaped to receive the driver arm 200 of the driver assembly 58 therein (described below).

The second passage 108 of the driver channel 74 is parallel to and offset laterally from the first passage 100 being enclosed on both ends. The second passage 108 is generally sized and shaped to receive the recoil assembly 82 of the base 54 therein (described below).

The intermediate passage 116 of the driver channel 74 extends between and is open to both the first passage 100 and the second passage 108 providing an open corridor therebetween. During use, the intermediate passage 116 is configured to allow a recoil lug 218 of the driver shaft 140 extend into and travel axially along the second passage 108. In the illustrated embodiment, the intermediate passage 116 is narrower than both the first passage 100 and the second passage 108.

Figure 7:
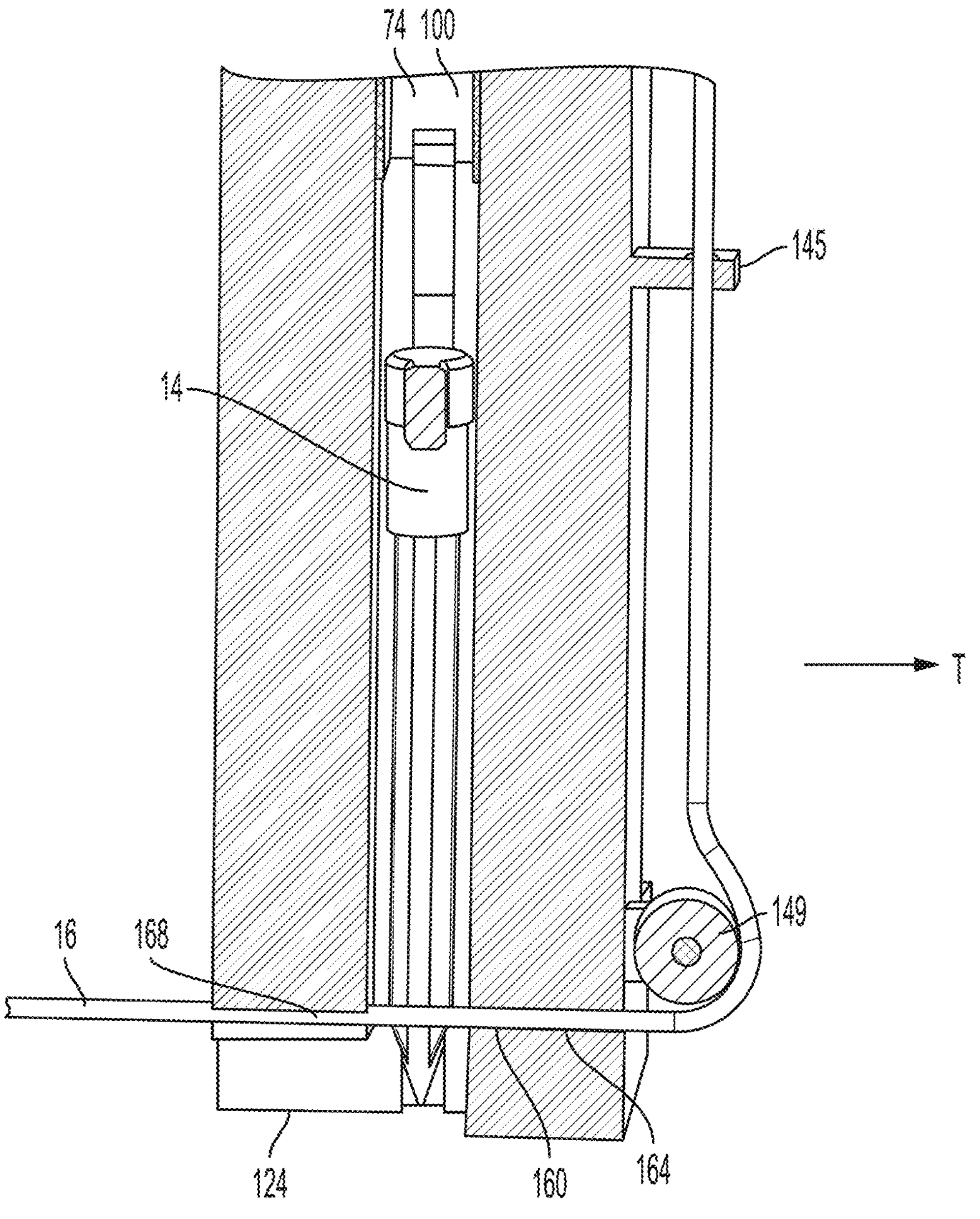
FIG. 7 is a section view taken along line 7-7 of FIG. 1.

The driver channel 74 also defines a boundary wire feed channel 160. The boundary wire feed channel 160 is oriented perpendicular to the first axis 104 extending perpendicularly through the first passage 100 proximate the outlet 124 thereof. The boundary wire feed channel 160 is sized and shaped so that a length of boundary wire 16 may be fed therethrough during the installation process. In the illustrated embodiment, the boundary wire feed channel 160 has an upstream portion 164 extending from the first passage 100 in the direction of travel T and a downstream portion 168 extending from the first passage 100 opposite the direction of travel T. As shown in FIG. 7, the upstream portion 164 completely encompasses the wire 16 while the downstream portion 168 is open to the underside thereof. More specifically, the downstream portion 168 of the boundary wire feed channel 160 includes a first portion **168*a* that has a semi-circular cross-sectional shape that is generally sized to correspond with the diameter of the boundary wire 16 and a second portion 168*b* that is wider than the first portion 168*a* that extends between the first portion 168*a* and the second side 90 (see FIG. 4). By doing so, the wire 16 is completely constrained as it enters the first passage 100 but is free to be released downwardly toward the support surface 18 after passing through the first passage 100**.

In the illustrated embodiment, the boundary wire feed channel 160 is perpendicular to and laterally offset from the axis 104 of the first passage 100 (see FIG. 5). More specifically, the channel 160 is positioned such that it is vertically aligned the hook member 46 of a peg 14 being held in the loaded position within the passage 100. As such, the wire 16 passing through the channel 160 is properly positioned relative to the loaded peg 14 that, when being installed, the hook member 46 of the peg 14 will collect and capture the wire 16 between itself and the support surface 18.

Figure 9:
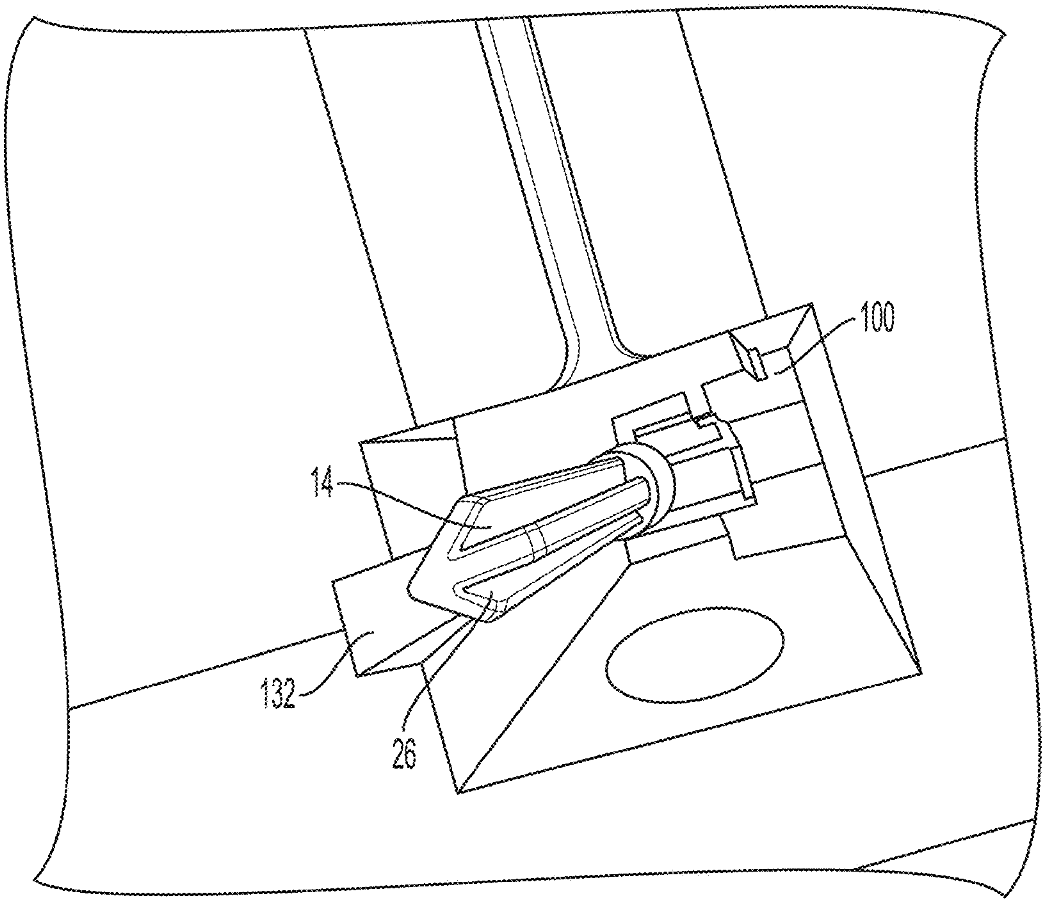
FIG. 9 is a detailed bottom view of the outlet of the driver channel of the peg driver of FIG. 1.

As shown in FIG. 5, the retention mechanism 78 of the base 54 is in operable communication with the first passage 100 of the driver channel 74 and configured to maintain the peg 14 in a "loaded position" (LP) to await final driving and installation. The retention mechanism 78 includes a detent 172 movably coupled to the body 70, and a biasing member (not shown) configured to bias the detent 172 radially inwardly into the first passage 100. In the illustrated embodiment, the detent 172 is shaped so that when it engages the head portion 22 of the peg 14, the peg 14 is maintained in the desired loaded position (LP). More specifically, the detent 172 maintains the peg 14 in a substantially vertical position within the first passage 100 so that the peg axis 34 is parallel to the first axis 104 with the distal end 30 pointed downwardly and positioned proximate to the outlet 124 (described below). During use, the biasing member biases the detent 172 into engagement with the peg 14 whereby the detent 172 maintains the peg 14 in the loaded position (LP) until acted upon by the driver assembly 58. More specifically, the detent 172 is generally configured to engage the hook member 46 of the peg 14 thereby biasing the shaft portion 26 into the opposite sidewall of the first passage 100. As shown in FIG. 9, the shaft portion 26, itself may also be aligned laterally by the groove formed by the second portion 132 of the first passage 100.

As shown in FIG. 5, the recoil assembly 82 of the base 54 includes a biasing member 180 configured to act upon the driver shaft 140 of the driver assembly 58 to bias the driver shaft 140 toward a rest or neutral position (see FIG. 5, described below). More specifically, the recoil assembly 82 includes a guide rod 184 co-axially positioned within the second passage 108 of the driver channel 74 and a coil spring 188 wrapped about the guide rod 184. In the illustrated embodiment, the coil spring 188 generally rests against the bottom of the second passage (e.g., proximate the second side 90) to apply an upward force against the driver assembly 58. However, in other embodiments different layouts may be used as needed. Furthermore, while the illustrated embodiment utilizes a coil spring, it is understood that in other embodiments different forms of biasing may be used (e.g., a gas strut and the like).

Figure 4:
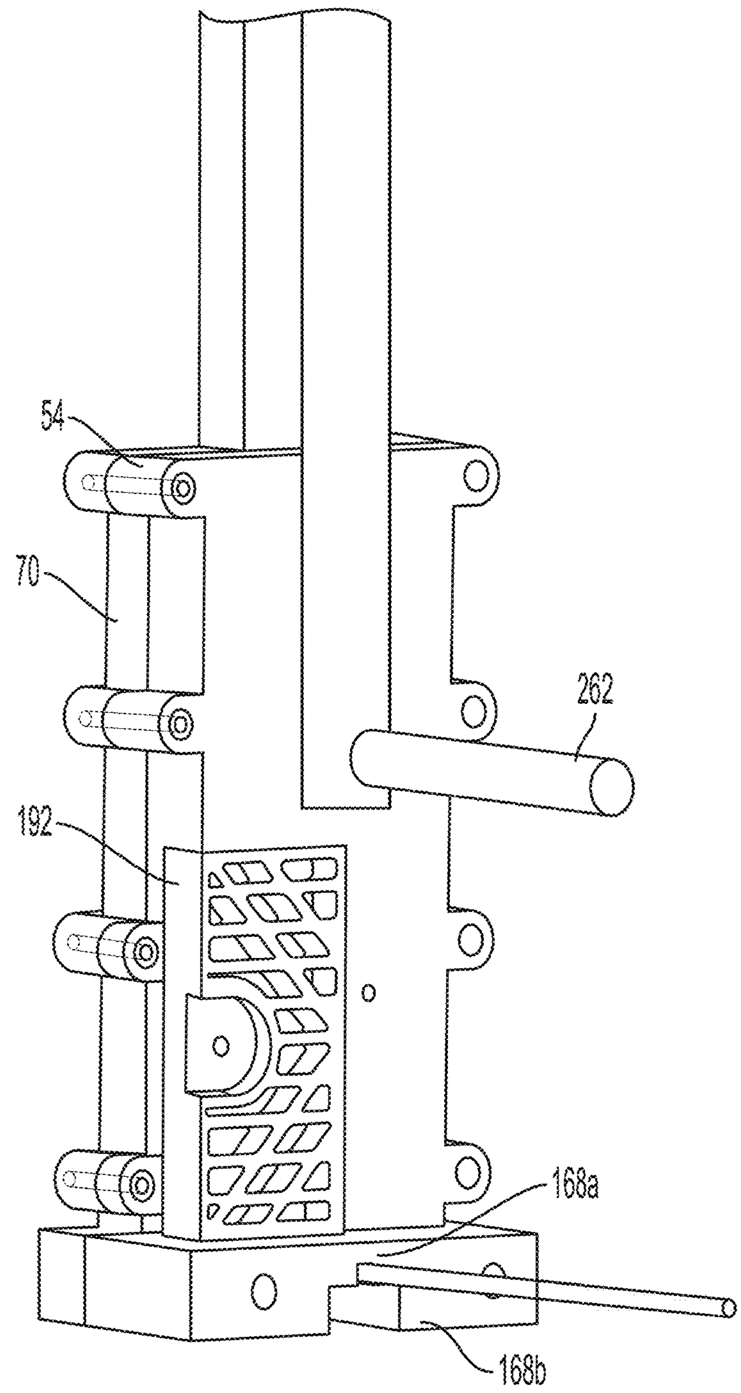
FIG. 4 is a detailed perspective view of the base of the peg driver of FIG. 1.

In some embodiments, the body 70 of base 54 may include one or more service doors 192 to allow selective access to the driver channel 74 and the elements contained therein (see FIG. 4). More specifically, the presence of the service door 192 allows the user to dislodge or otherwise remove a jammed peg 14 from the driver channel 74 and/or to adjust the configuration of the retention mechanism 78. While not shown, another service door may also be present to provide selective access to the second passage 108 or other elements of the base 54.

Figure 2:
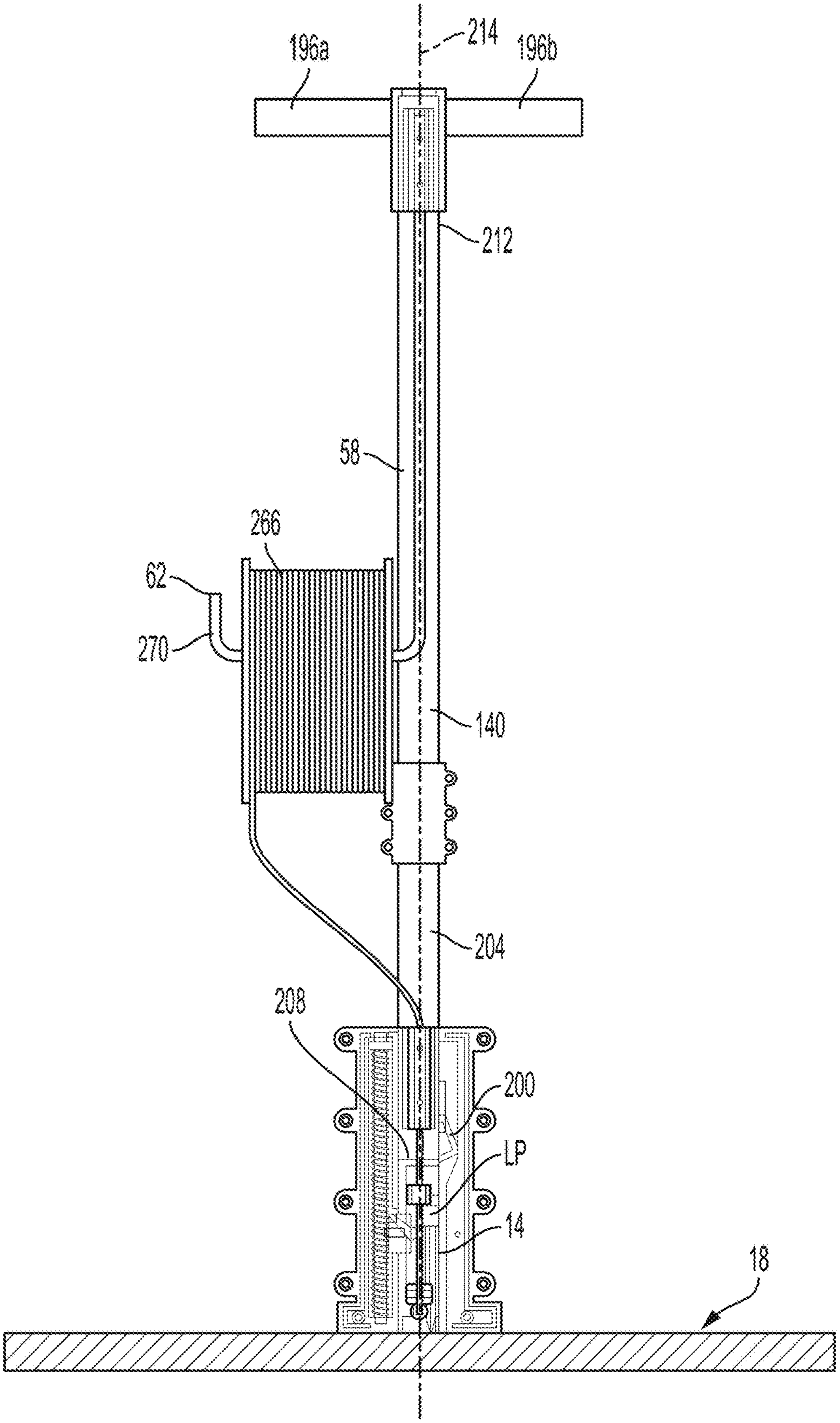
FIG. 2 is a semi-transparent front view of the peg driver of FIG. 1.

As shown in FIG. 2, the driver assembly 58 of the peg driver 10 is configured to engage a peg 14 in the loaded position within the driver channel 74 and apply a downward driving force thereto so the peg 14 becomes embedded within the support surface 18. More specifically, the driver assembly 58 includes a driver shaft 140, a driver handle 196 coupled to one end of the driver shaft 140, and a driver arm 200 coupled to the driver shaft 140 opposite the driver handle 196.

The driver shaft 140 of the driver assembly 58 includes an elongated body 204 having a first end 208, a second end 212 opposite the first end 208, and defines a shaft axis 214 therethrough. The body 204 is also hollow defining a shaft channel 216 extending axially therethrough that is open to both the first end 208 and the second end 212. While the illustrated shaft 140 is rectangular in cross-sectional shape having an exterior size and shape that generally corresponds with the size and shape of the first portion 128 of the first passage 100, it is understood that the shaft 140 may have other cross-sectional shapes as well.

When assembled, the first end 208 of the driver shaft 140 is positioned within the first passage 100 of the driver channel 74 (e.g., via the first end 120) such that the shaft channel 216 is open thereto and the shaft axis 214 is co-axial with the first axis 104. During use, the user is able to slide the shaft 140 axially along the length of the passage 100 (e.g., with respect to the base 54) between a first or neutral position (see FIG. 5), in which the first end 208 is positioned proximate the first end 120 of the first passage 100, and an actuated position (see FIG. 6), in which the first end 208 is positioned proximate the outlet 124 of the first passage 100.

The driver shaft 140 also includes a recoil lug 218 extending therefrom and configured to operatively engage the recoil assembly 82 of the base 54. More specifically, the recoil lug 218 includes a member extending radially outwardly from the shaft 140, proximate the first end 208 thereof, that is configured to engage the recoil assembly 82 to permit the transfer of forces therebetween. In the illustrated embodiment, the recoil lug 218 encompasses and travels along the guide rod 184 to selectively compress the coil spring 188. More specifically, the recoil lug 218 is configured such that the recoil lug 218 compresses the coil spring 188 as the shaft 140 travels from the neutral position (see FIG. 5) toward the actuated position (see FIG. 6). By doing so, the spring 188 exerts a counter-force against the recoil lug 218 toward the neutral position. As such, the recoil assembly 82 generally biases the shaft 140 toward the first or neutral position.

Figure 10:
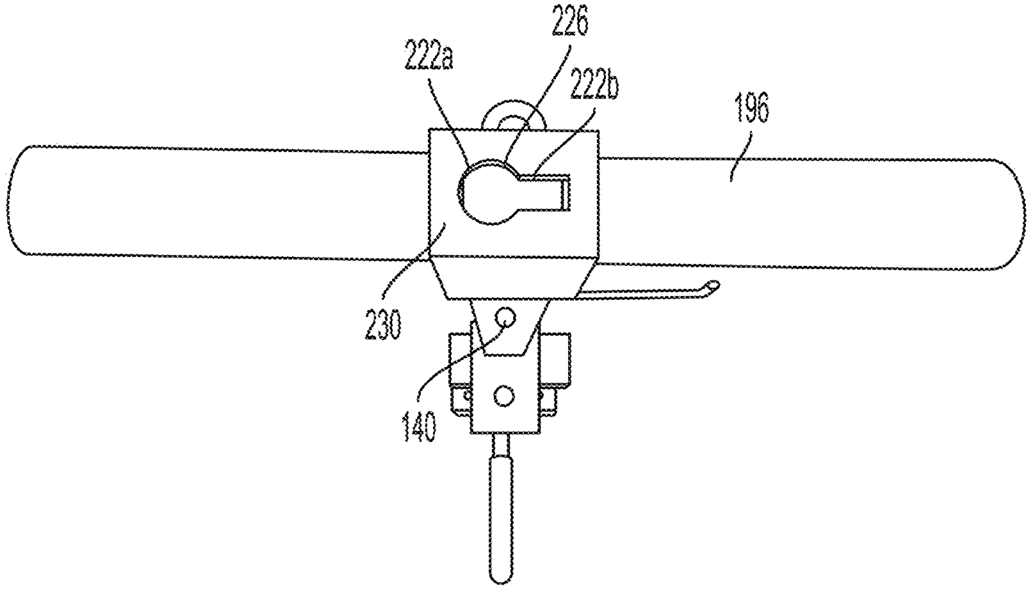
FIG. 10 is a detailed view of the handle of the peg deriver of FIG. 1.
Figure 11:
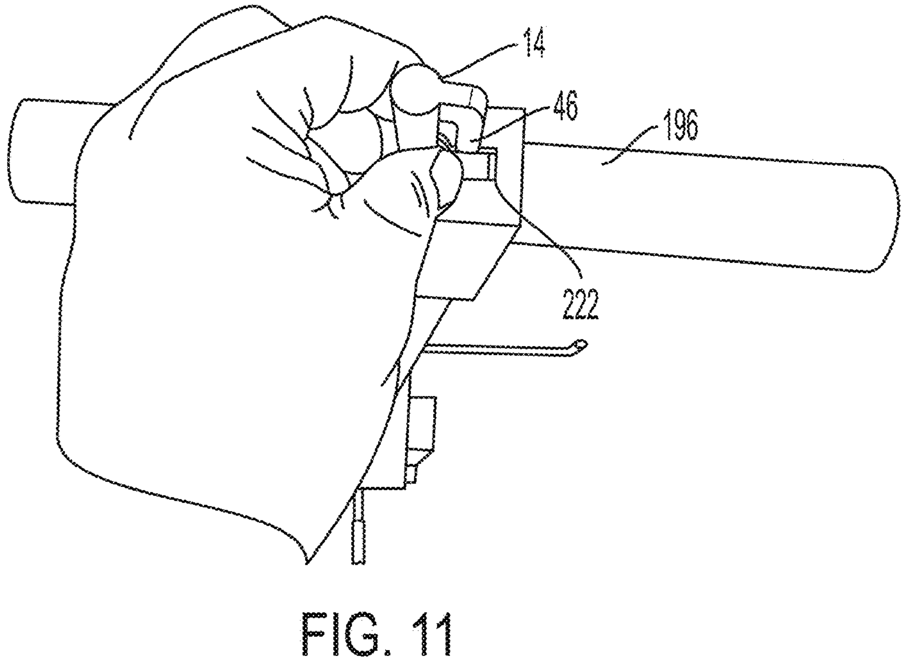
FIG. 11 is the handle of FIG. 10 with a peg being inserted into an inlet gate.

The driver shaft 140 also includes an inlet gate 222 (see FIGS. 10 and 11). The inlet gate 222 encompasses or otherwise covers the second end 212 of the shaft 140 and is configured to restrict the orientation in which a peg 14 may be inserted into the shaft channel 216 during use. As shown in FIG. 10, the inlet gate 222 defines an aperture 226 sized and shaped such that the peg 14 can only pass therethrough so long as the hook member 46 is directed in a predetermined direction (e.g., toward the retention mechanism 78). In the illustrated embodiment, the aperture 226 includes a wide portion **222*a* to accommodate the shaft portion 26 of the peg 14 and a narrow portion 222*b* to accommodate the hook member 46**.

The driver handle 196 of the driver assembly 58 is fixedly coupled to the shaft 140 proximate the second end 212 thereof to provide one or more handles or grips **196*a*, 196*b* for the user to grasp during operation. More specifically, the user is configured to grasp the handles 196*a*, 196*b* and manipulate the position of the shaft 140 relative to the base 54 by applying force thereto. During use, the handle 196 may travel an axial length between 140 mm and 100 mm, a length between 130 and 110 mm, or length of 120 mm. In the illustrated embodiment, two cylindrical handles 196*a*, 196*b* are provided, however, in other embodiments different sizes, shapes, and number of handles (not shown) may be present. In some embodiments, the shaft 140 may include multiple handles at different axial positions along the shaft 140 to accommodate users of different heights and the like. In still other embodiments, the handles 196 may be adjustable along the axial length of the shaft 140**.

As shown in FIG. 10, the illustrated embodiment of the handle 196 incorporates the handles **196*a*, 196*b* and the inlet gate 222. More specifically, the member includes a central body or cap 230 configured to encompass the second end 212 of the shaft 140 completely covering the opening to the shaft channel 216, and the two cylindrical handles 196*a*, 196*b* extending radially outwardly therefrom. The central body 230, in turn, defines the inlet gate 222** therein.

Figure 6:
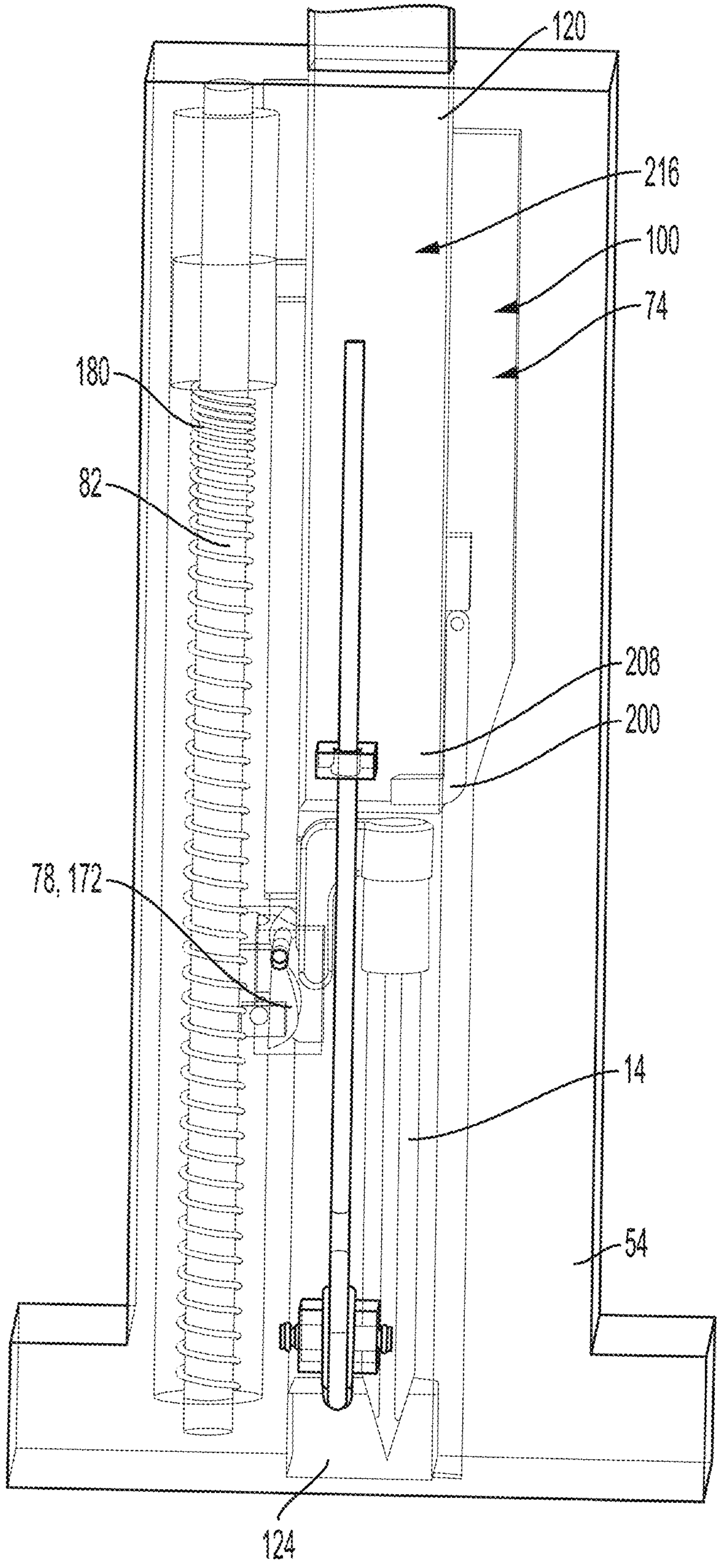
FIG. 6 is a section view taken long line 5-5 of FIG. 1 with the driver assembly in a semi-actuated position.

The driver arm 200 of the driver assembly 58 is coupled to the first end 208 of the driver shaft 140 and is configured to selectively engage and transmit forces exerted by the user (e.g., via the driver handle 196) into the contact surface 38 of the peg 14. The driver arm 200 is substantially "L" shaped having a first leg 234 defining a pivot point 238, and a second leg 242 extending from the first leg 234 opposite the pivot point 238. When assembled, the driver arm 200 is pivotably coupled to the first end 208 of the driver shaft 140 via the pivot point 238. More specifically, the arm 200 is pivotable between a rest or stowed position (see FIG. 5), in which the arm 200 is pivoted away from the shaft 140 such that the second leg 242 obstructs a first amount of the first open end 208 of the shaft channel 216, and an engaged position (see FIG. 6) in which the arm 200 is pivoted toward the shaft 140 such that the second leg 242 obstructs a second amount of the first open end 208 of the shaft channel 216 that is greater than the first amount. In the illustrated embodiment, the arm 200 does not obstruct the shaft channel 216 when in the stowed position. As shown in FIG. 6, the arm 200 is configured so that the second leg 242 is substantially perpendicular to the first axis 104 when the arm 200 is in the second position.

During use, the arm 200 is biased into engagement with the cam surface 136 of the first passage 100 via a biasing member or spring 246. As such, the cam length generally determines the angular orientation of the arm 200 relative to the shaft 140 for a given shaft 140 position within the passage 100. More specifically, the arm 200 is biased into the deployed position when the cam surface 136 is at the first cam length **144*a* from the first axis 104 (e.g., when the arm 200 is in contact with the first region 148 of the second portion 132 of the first passage 100; see FIG. 6) while the arm 200 is biased into the stowed position when the cam surface 136 is at the second cam length 144*b* from the axis 104 (e.g., when the arm 200 is in contact with the second region 152 of the second portion 132 of the first passage 100; see FIG. 5). As such, the overall contour of the cam surface 136 causes the arm 200 to pivot from the stowed into the deployed position as the shaft 140** travels axially from the neutral position toward the actuated position.

Figure 3:
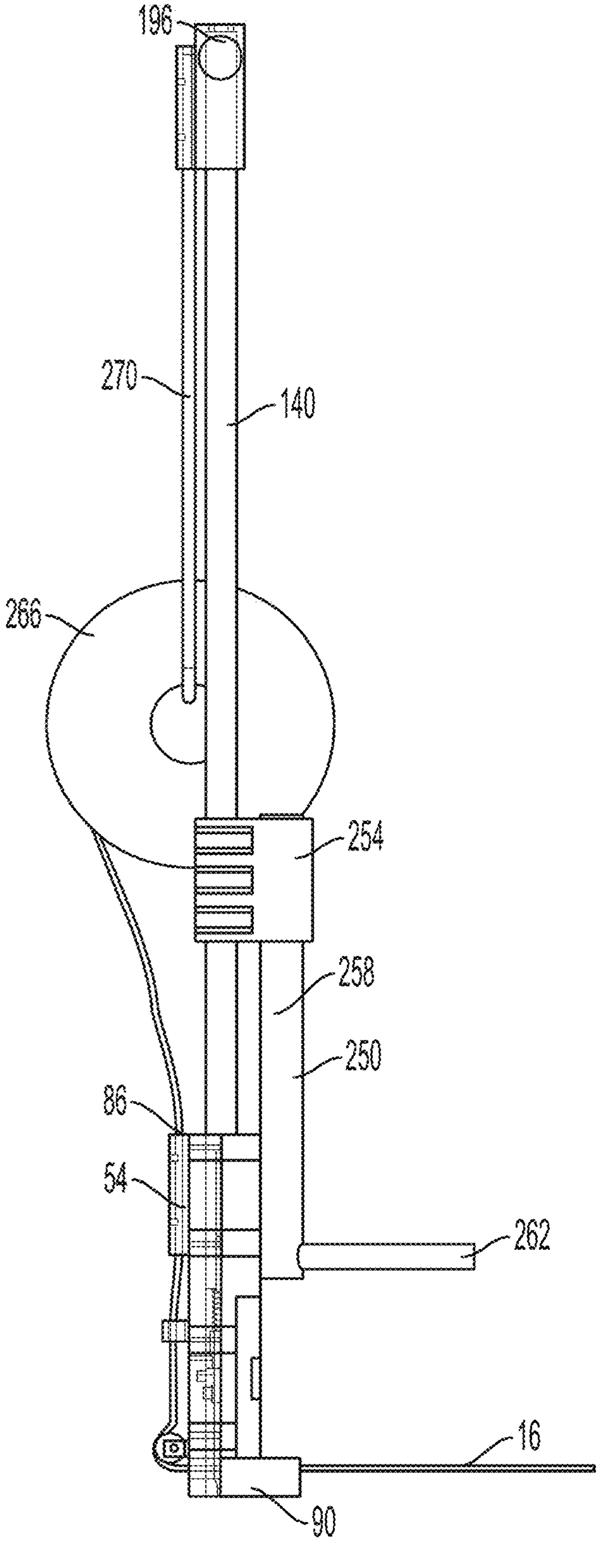
FIG. 3 is a semi-transparent side view of the peg driver of FIG. 1.

As shown in FIG. 3, the driver assembly 58 also includes a foot driver 250 fixedly coupled to the shaft 140 and moveable together therewith. During use, the foot driver 250 is configured to provide a supplemental point against which the user can apply force to the driver shaft 140 to drive the peg 14 into the support surface 18. More specifically, the foot driver 250 includes an anchor clamp 254 fixedly coupled to the driver shaft 140 above the base 54, a drop shaft 258 extending from the anchor clamp 254, and a pedal 262 against which the user can apply force using his or her feet.

In the illustrated embodiment, the pedal 262 of the foot driver 250 is positioned as close to the driver shaft 140 as possible and as close to the bottom side 90 of the base 54 as possible to minimize the twisting torque applied to the peg driver 10 during the installation process. More specifically, the pedal 262 of the foot driver 250 is positioned vertically below the first side 86 of the base 54 and rests against the side thereof.

Figure 12:
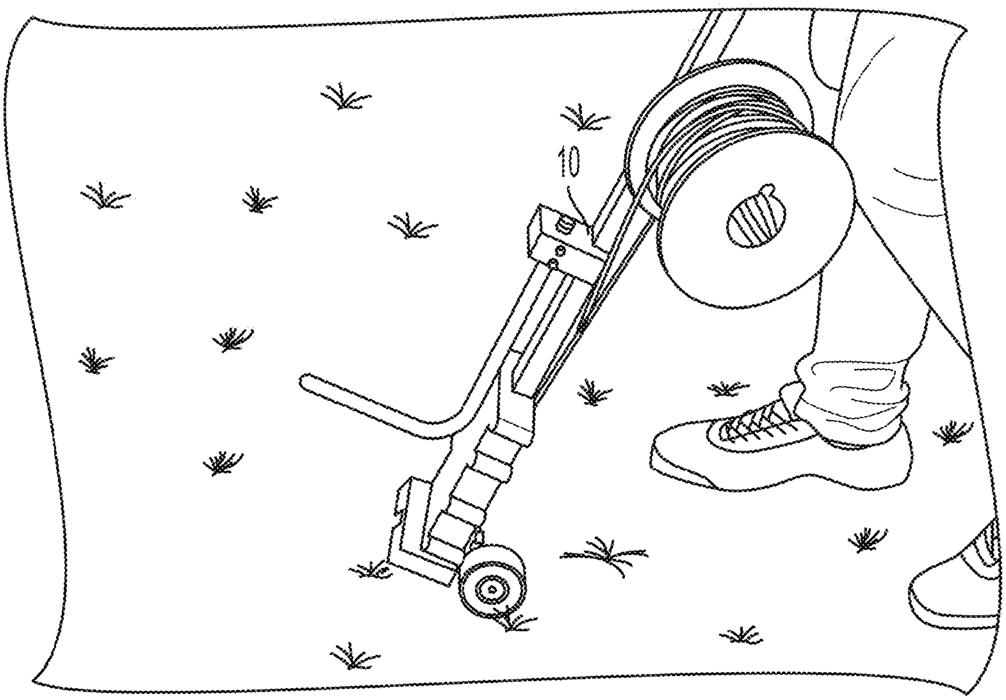
FIGS. 12-16 illustrate the peg driver of FIG. 1 in various stages of a peg installation process.

In some embodiments, the foot driver 250 may be adjustable such that the pedal 262 can be re-oriented relative to the base 54 for ease of use. More specifically, the pedal 262 may be fixed axially with respect to the shaft 140 while being rotatable about an axis parallel to the shaft axis 214 so that the pedal 262 may extend either outwardly forward (e.g., opposite the direction of travel T, see FIG. 12) or to either side (see FIG. 15). By doing so, the pedal 262 can be more ergonomically placed for a particular user depending if they are left footed, right footed, to avoid an obstacle (e.g., a fence), and the like. In other embodiments, the pedal 262 may be adjustable both parallel to the axis (e.g., to adjust the vertical height of the pedal 262) and in a direction perpendicular to the shaft axis 214 (e.g., horizontally).

The boundary wire deployment assembly 62 of the peg driver 10 is configured to rotatably support a spool 266 of boundary wire 16 and feed a continuous length of the boundary wire 16 from the spool 266 into and through the boundary wire feed channel 160 during installation. More specifically, the deployment assembly 62 includes a spool holder 270 coupled to the driver shaft 140 (e.g., via the handle 196) and a series of loops 145 and pullies 149 configured to constrain and re-direct the wire 16 into the upstream portion 164 of the boundary wire feed channel 160 (see FIG. 7). In the illustrated embodiment, the spool holder 270 generally includes a hook or peg extending outwardly from the shaft 140. However, in other embodiments, the holder 270 may include a hook or peg extending from the base 54. In still other embodiment, the holder 270 may include an integral spool and the like.

The peg driver 10 may have a total tool length (e.g., from the handle 196 to the second side 3090 of the base 3054) between 1100 mm and 700 mm, a total tool length between 1000 mm and 800 mm, or a total tool length of 900 mm. The base 54 may have width between 140 mm and 100 mm, a width between 130 mm and 110 mm, or a width of 120 mm. The base 54 may have a depth between 90 mm and 50 mm, a depth between 80 mm and 60 mm, or a depth of 70 mm.

To install a boundary wire 16 along the perimeter of a working area using the peg driver 10, the user first places a fresh spool 266 of boundary wire 16 onto the spool holder 270. With the spool 266 in place, the use can then feed the length of boundary wire 16 wound about the spool 266 through the loop 145, around the pulley 149, and into the upstream portion 164 of the boundary wire feed channel 160. The user then pulls the wire 16 through the first passage 100, and out through the downstream portion 168 of the boundary wire feed channel 160 (see FIG. 7).

Figure 13:
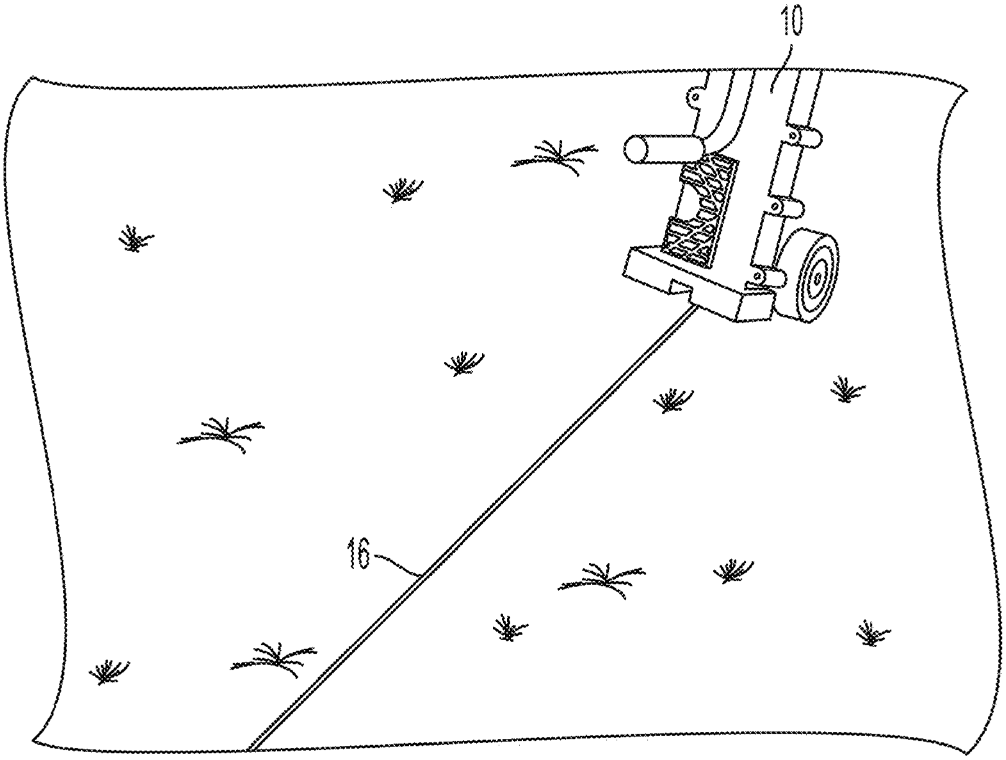

Once fed through the peg driver 10, the end of the boundary wire 16 may be secured in place relative to the support surface 18 such as through the use of peg 14 and/or by attaching it to a charging station or other element. With the end of the wire 16 secured, the user may then begin walking with the peg driver 10, rolling the driver 10 over the support surface 18 along the perimeter of the desired working region. As the user travels along the perimeter, wire 16 is uncoiled off of the spool 266 and fed through the boundary wire feed channel 160 whereby the wire 16 is deposited in a continuous length onto the support surface 18 along a path corresponding to that traveled by the peg driver 10 itself (see FIG. 13).

As the user travels along the perimeter of the working region, the peg driver 10 is configured such that the driver shaft 140 is generally maintained in the first or neutral position (see FIG. 5) by the recoil assembly 82. As such, the driver arm 200 remains in the rest position leaving the first open end 208 of the shaft channel 216 generally unobstructed so that a peg 14 can pass from the shaft channel 216 to the driver channel 74.

Figure 14:
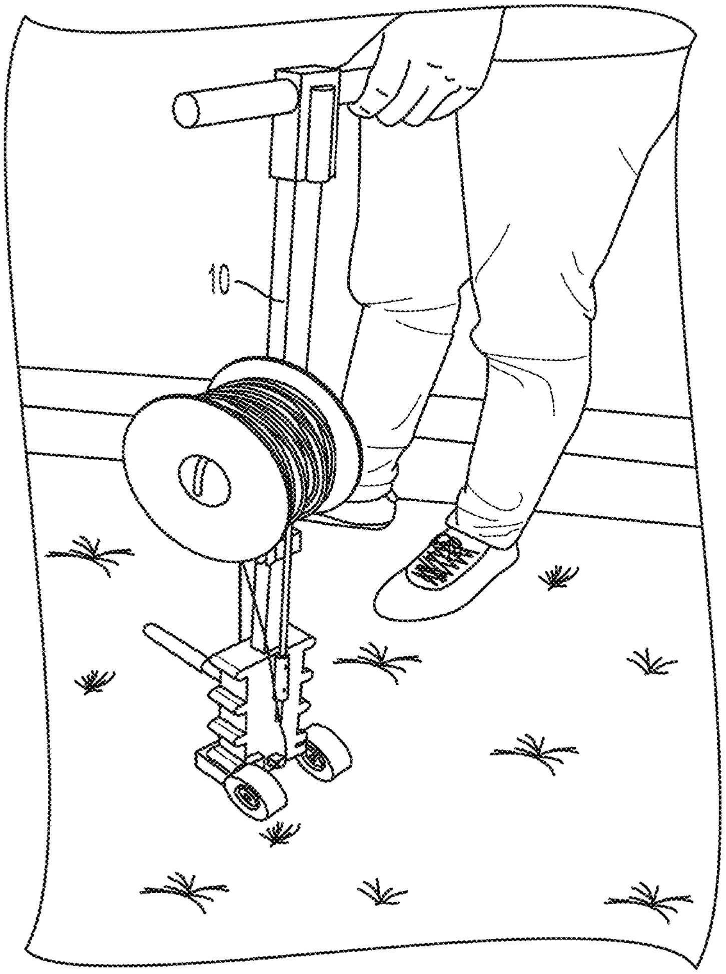

At predetermined intervals along the path, the user may secure the wire 16 in place using a peg 14. To do so, the user stops at the desired location and orients the peg driver 10 in a generally upright or vertical orientation (see FIG. 14). Once oriented, the user inserts a peg 14 into the second end 212 of the driver shaft 140 via the inlet gate 222 in a tip-down orientation (see FIG. 11). As described above, the size and shape of the inlet gate 222 restricts the orientation of the peg 14 such that the hook member 46 can only pass therethrough when pointing in the proper direction.

After the peg 14 passes through the gate 222, the peg 14 travels downwardly along the length of the shaft channel 216 under the force of gravity where it emerges out of the first open end 208 and enters into the first passage 100. As described above, the first open end 208 is not obstructed as the driver arm 200 is rotated out of the way in the rest position. The peg 14 then continues to fall axially downwardly through the first passage 100 until engaged by the detent 172 of the retention mechanism 78. The retention mechanism 78 then halts and retains the peg 14 in the loaded position (LP) whereby the peg axis 34 is parallel to the first axis 104 of the first passage and the tip 30 of the peg 14 is positioned proximate the outlet 124 (see FIG. 5).

Figure 15:
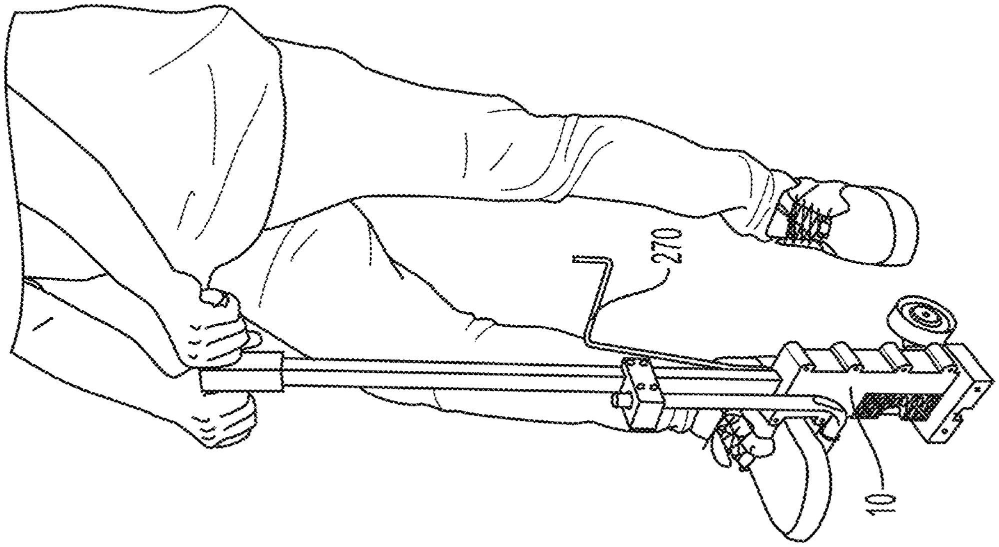

With the peg 14 in the loaded position (LP; see FIG. 5), the user may then grasp the handles 196*a*, 196*b* and apply a generally downward force thereto (see FIG. 15). By doing so, the shaft 140 begins to travel axially downwardly along the first passage 100 toward the outlet 124 (e.g., from the neutral position toward the actuated position) and the recoil lug 218 travels along the second passage 108 in the same direction compressing the recoil spring 188. While doing so, the driver arm 200 travels along the cam surface 136 whose contour causes the arm 200 to pivot from the stowed position into the engaged position (e.g., from FIG. 5 to FIG. 6).

Figure 16:
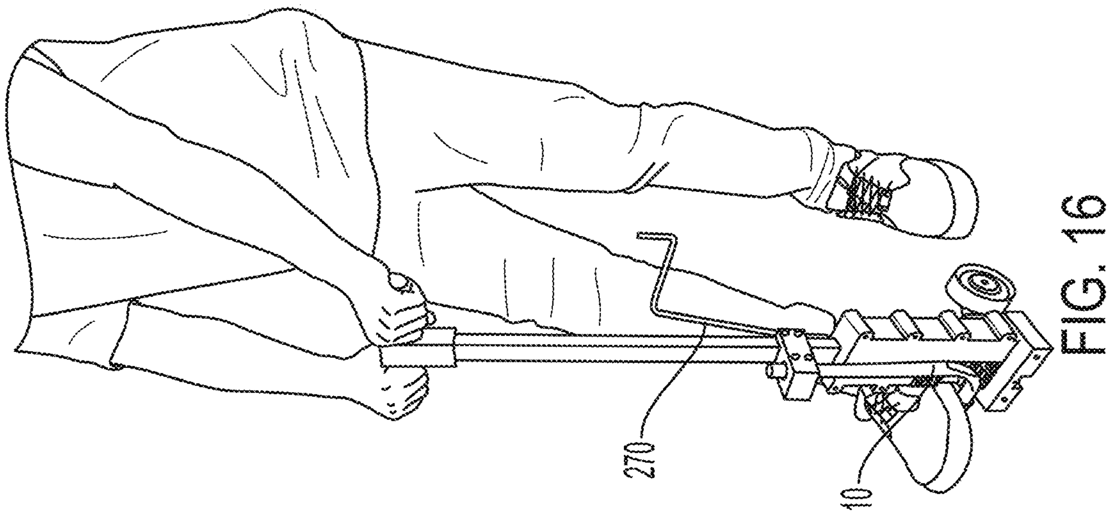

After the arm 200 is rotated into the engaged position, the arm 200 then comes into contact with and engages the contact surface 38 of the peg 14. After engagement, the forces applied by the user into the handles 196*a*, 196*b* are then transmitted into the peg 14 via the second leg 242 thereof. These applied forces then overcome the retention mechanism 78 forcing the peg 14 to travel downwardly through the outlet 124 and into engagement with the support surface 18. As force continues to be applied by the user—either via the handles 196*a*, 196*b* and/or the foot driver 250—the peg 14 continues to travel through the outlet 124 as the shaft portion 26 of the peg 14 is forced into the support surface 18 (see FIG. 16). As the head portion 22 of the peg 14 leaves the passage 100, the hook member 46 thereof collects the portion of the boundary wire 16 positioned within the passage 100 and captures against the support surface 18.

With the driving process complete, the user can then remove the force applied to the handles 196*a*, 196*b* whereby the recoil assembly 82 will bias the driver shaft 140 back toward the neutral position (see FIG. 5). At the same time, the arm 200 travels along the cam surface 136 pivoting from the engaged position back into the stowed position—whereby the first open end 208 of the shaft channel 216 is no longer obstructed and a peg 14 is able to freely pass from the shaft channel 216 to the driver channel 74.

With the peg driver 10 reset, the use can then return to traveling along the perimeter of the working region as described above.

FIGS. 18-22 illustrate another embodiment of the peg driver 1010. The peg driver 1010 is substantially similar to the peg driver 10 so only the differences will be described in detail herein. The peg driver 1010 includes a base 1054, a handle 1500 fixedly coupled to the base 1054 to define a handle axis 1504, and a foot driver 1508 configured to drive an individual peg 14 into a support surface 18.

Figure 20:
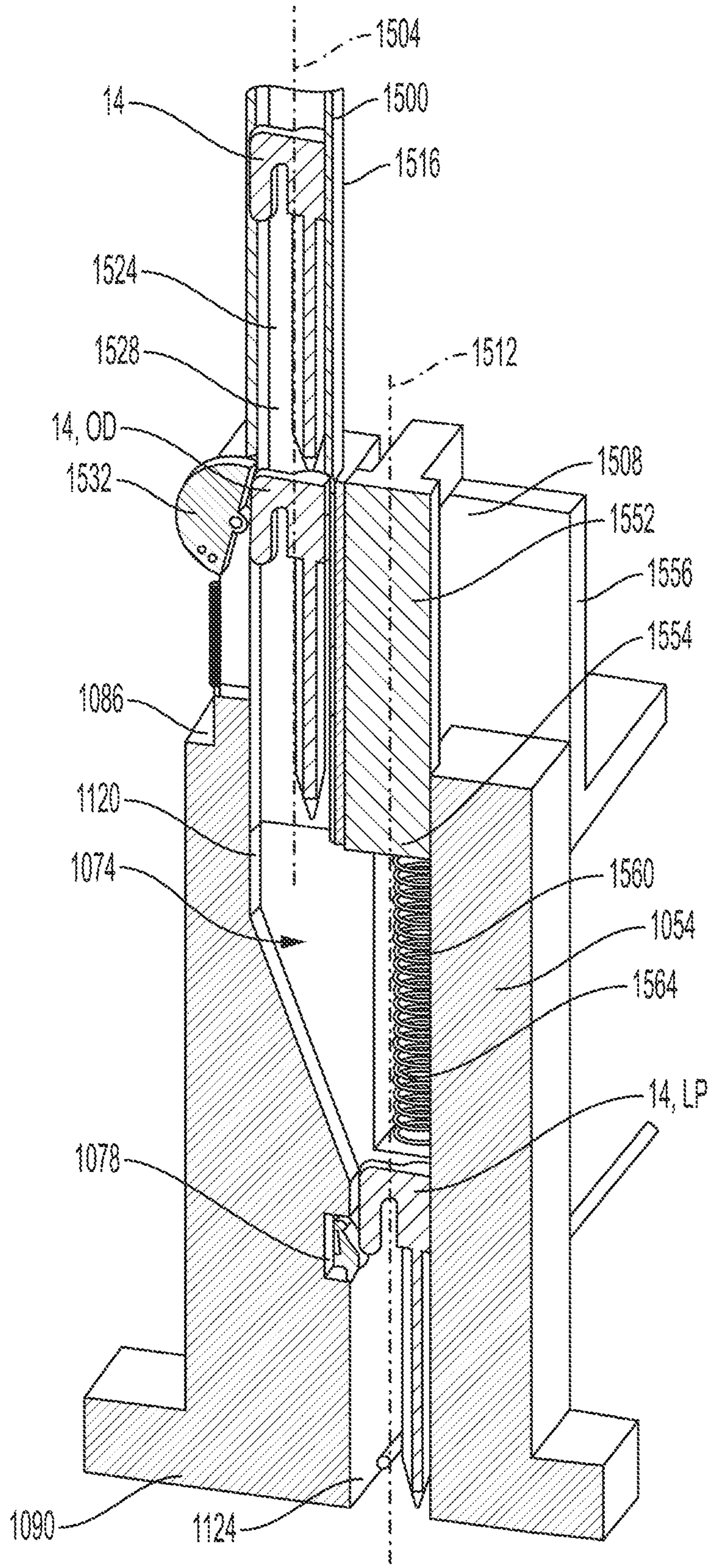
FIG. 20 is a section view taken along line 20-20 of FIG. 18.
Figure 21:
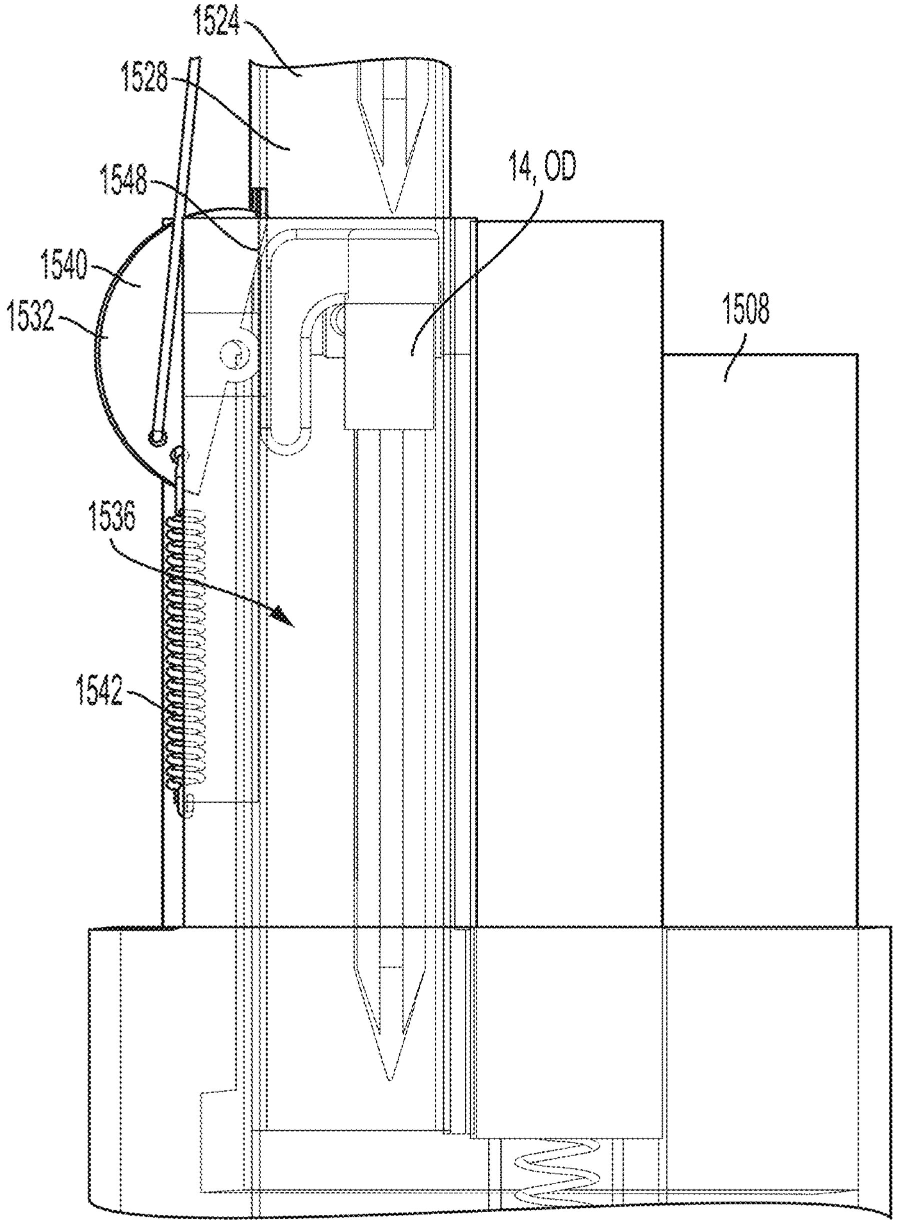
FIGS. 21-22 are detailed views of the indexing assembly of the peg driver of FIG. 18.
Figure 22:
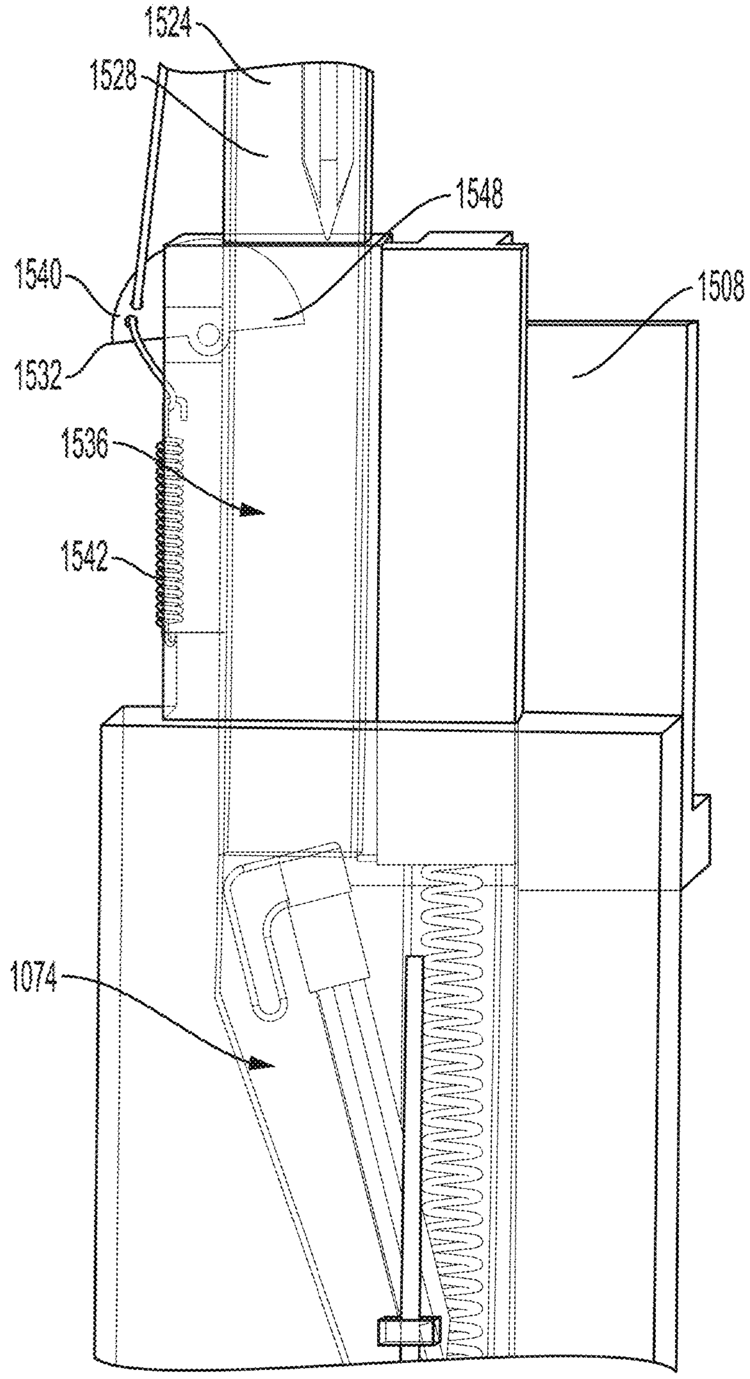

The base 1054, in turn, defines a driver channel 1074 with first end 1120 open to the first side 1086 of the base 1054 and an outlet 1124 open to the second side 1090 of the base 1054. As shown in FIG. 20, the first end 1120 of the channel 1074 is offset laterally from the outlet 1124 such that the driver axis 1512 and the handle axis 1504 are parallel to but offset laterally from each other. In the illustrated embodiment, the channel 1074 is shaped so that it smoothly transitions laterally from the first end 1120 to the outlet 1124 such that a peg 14 entering the channel 1074 via the first end 1120 will, under the force of gravity, travel both downwardly and laterally toward the outlet 1124 until engaged by the retention mechanism 1078 and maintained in the loaded position (LP).

The handle 1500 of the peg diver 1010 is fixedly coupled to the base 1054 and includes a handle tube 1516 and a handle 1520 coupled to the handle tube 1516 opposite the base 1054. The handle 1500 also defines an inlet gate 1222 at the handle end thereof. As shown in FIG. 20, the handle tube 1516 is hollow defining a tube channel 1524 along the axial length thereof that is open at both the top (e.g., via the inlet gate 1222) and open to the first end 1120 of the driver channel 1074 to form a continuous volume therewith. During use, a portion of the axial length of the resulting continuous volume serves as a magazine 1528 whereby a plurality of pegs 14 can be inserted and stored therein.

The peg driver 1010 also includes an indexing assembly 1532. The indexing assembly 1532 is in operable communication with both the tube channel 1524 and the driver channel 1074 and is configured to selectively release one peg 14 at a time from the magazine 1528 while retaining any remaining pegs 14 therein. In the illustrated embodiment, the indexing assembly 1532 includes a catch member 1536, a cammed detent 1540, and a user actuator 1544 in operable communication with the cammed detent 1540. During use, the indexing assembly 1532 is operable independently of the foot driver 1508 (described below).

The catch member 1536 of the indexing assembly 1532 includes a region within one of the tube channel 1524 and/or the driver channel 1074 or an element positioned within the channels 1524, 1074 causing the cross-sectional shape to narrow so that a peg 14 passing through both channels 1524, 1074 will be frictionally retained and held in an on-deck position (see position OD of FIG. 20). While the illustrated embodiment includes a narrowed region of the channels 1524, 1074 themselves, it is also understood that in other embodiments a spring-loaded detent, trap door, or other form of retention may also be used to capture and retain a peg 14 in the on-deck position.

The cammed detent 1540 of the indexing assembly 1532 is a movable member configured to both bias the peg 14 in the on-deck position through the catch member 1536 (e.g., force the peg 14 through the catch member 1536 until it is free to travel through the channels 1524, 1074) and simultaneously block the channels 1524, 1074 so that any remaining pegs 14 in the magazine 1528 are retained therein. In the illustrated embodiment, the cammed detent 1540 includes a semi-circular member rotatably coupled to one of the base 1054 and the handle tube 1516 and defining a leading edge 1548. During use, the cammed detent 1540 is rotatably adjustable between a rest or retracted position (see FIG. 21), in which the detent 1540 is positioned primarily outside the channels 1524, 1074 and does not engage the on-deck peg 14, and an actuated position (see FIG. 22), in which at least a portion of the detent 1540 is rotated into the channels 1524, 1074 such that any pegs 14 positioned in the magazine 1528 cannot pass therethrough. In the illustrated embodiment, the detent 1540 is biased toward the retracted position by a biasing member 1542.

The user actuator 1544 of the indexing assembly 1532 includes a pivotable lever 1546 coupled to the handle 1520 and actuatable by the user. More specifically, the actuator 1544 is coupled to the detent 1540 by a cable or wire whereby actuating the lever 1546 causes the detent 1540 to pivot from the retracted position toward the actuated position. While the illustrated actuator 1544 is a lever, it is understood that in other embodiments different forms of user interface may be used.

Figure 19:
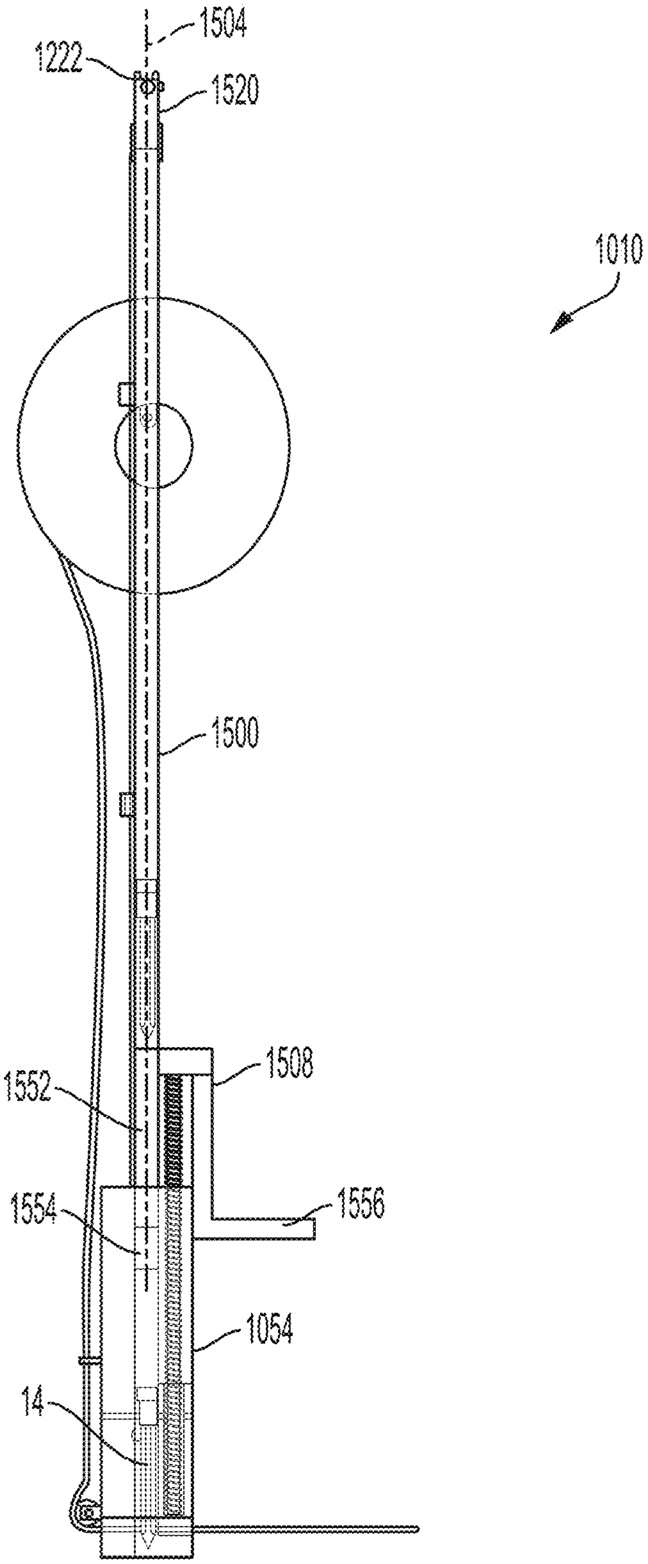
FIG. 19 is a side view of the peg driver of FIG. 18.

As shown in FIGS. 19 and 20, the foot driver 1508 of the peg driver 1010 includes a body having a plunger portion 1552 defining a distal end 1554, and a pad portion 1556 fixedly coupled to and movable together with the plunger portion 1552. During use, the user is configured to step or otherwise apply a downward force to the pad portion 1556 causing the plunger portion 1552 to move axially within the driver channel 1074 and drive a peg 14 into the support surface 18. More specifically, the peg driver 1010 is axially movable relative to the driver channel 1074 along the driver axis 1512 between a rest or neutral position (see FIG. 20), in which the distal end 1554 of the plunger portion 1552 is retracted away from the outlet 1124 (e.g., positioned proximate the first side 1086), and an actuated position, in which the distal end 1554 of the plunger portion 1552 is positioned proximate the outlet 1124.

In the illustrated embodiment, the foot driver 1508 is shaped such that the plunger portion 1552 is at least partially positioned within and movable axially within the driver channel 1074 while the pad portion 1556 is positioned outside the body 1054 and accessible by the user.

The foot driver 1508 also includes a recoil assembly 1560 in operable communication therewith and configured to bias the driver 1508 toward the neutral position. As shown in FIG. the illustrated recoil assembly 1560 incudes a coil spring 1564 embedded within the base 1054. However, in other embodiments, different forms of recoil may be used such as but not limited to a gas strut, and the like.

To operate the peg driver 1010, the user first loads a plurality of pegs 14 into the magazine 1528. To do so, the user inserts the first peg 14 into the magazine 1528 via the inlet gate 1222. The first peg 14 then travels downwardly through the tube channel 1524 under the force of gravity until it is engaged and retained in the on-deck position via the catch member 1536. With the on-deck peg 14 positioned, any subsequent pegs 14 loaded into the magazine 1528 (e.g., via the inlet gate 1222) begins stacking on top of each other vertically along the axial height of the magazine 1528 (see FIG. 20).

With the magazine 1528 filled, the user may then ready the first peg 14 for installation. To do so, the user actuates the user actuator 1544 (e.g., pivoting the lever 1546 relative to the handle 1520) causing the cammed detent 1540 to being rotating from the retracted position (see FIG. 21) toward the actuated position (see FIG. 22). While doing so, the leading edge 1548 of the cammed detent 1540 contacts the head portion 22 of the on-deck peg 14 biasing it axially downwardly and beyond the catch member 1536 allowing the peg 14 to freely fall the remaining distance to the loaded position (LP). At the same time, the body of the cammed detent 1540 enters the channels 1524, 1074 to block and isolate any pegs 14 remaining in the magazine 1528 therein.

With the first peg 14 now in the loaded position (LP), the user can release the user actuator 1544 allowing the cammed detent 1540 to rotate back into the retracted position. By doing so, the body of the cammed detent 1540 is generally removed from the channels 1524, 1074 allowing the remaining pegs 14 to drop down from the magazine 1528 until the leading peg 14 is captured and retained by the catch member 1536—placing it in the on-deck position (OD).

After a peg 14 is placed in the loaded position, the user can then install the peg 14 by stepping on or otherwise applying a downward force to the pad portion 1556 of the foot driver 1508. As described above, the application of force to the pad portion 1556 causes the plunger portion 1552 to contact and drive the loaded peg 14 into the support surface 18 capturing the boundary wire 16 therebetween as discussed above.

After the peg 14 is installed in the support surface 18, the user then removes the force from the foot driver 1508 whereby the recoil assembly 1560 biases the driver 1508 back into the rest position, allowing the process to be repeated.

FIGS. 23-26 illustrate another embodiment of the peg driver 2010. The peg driver 2010 is substantially similar to the peg driver 1010 so only the differences will be discussed in detail herein. The peg driver 2010 includes a rotary driver 2500 configured to drive a peg 14 in the loaded position (LP) into the support surface 18 capturing a segment of the boundary wire 16 therebetween. The rotary driver 2500 includes a barrel 2504, a plunger 2508 operably coupled to and driven by the barrel 2504, and a drive member 2512 operably coupled to and configured to drive the barrel 2504.

The barrel 2504 of the rotary driver 2500 is generally cylindrical in shape having a first end 2524, a second end 2528 opposite the first end 2524, and defining a pair of spiral grooves 2532*a*, 2532*b* formed into the outer surface thereof. The barrel 2504 also defines a barrel axis 2536. When assembled, the barrel 2504 is mounted adjacent to the driver channel 2074 such that the barrel axis 2536 is parallel to and offset from the driver axis 2512.

During use, the spiral grooves 2532*a*, 2532*b* of the barrel 2504 are configured to engage with a lug 2520 extending from the plunger 2508 such that rotation of the barrel 2504 about the barrel axis 2536 causes the plunger 2508 to reciprocate axially within the driver channel 2074. More specifically, the contour of the first groove 2532*a* dictates the relative speed and force applied by the plunger 2508 during the driving stroke (e.g., toward the outlet 2124) while the second groove 2532*b* dictates the relative speed and force applied by the plunger 2508 during the retraction stroke (e.g., away from the outlet 2124). In the illustrated embodiment, the first groove 2532*a* has the same contour as the second groove 2532*b*. However, in other embodiments the contour of the first groove 2532*a* may be different than the second groove 2532*b*. In such examples, the grooves 2532*a*, 2532*b* are configured so that the first groove 2532*a* is shallower to emphasize relatively higher force application (e.g., a higher mechanical advantage) while the second groove 2532*b* is steeper to emphasize a relatively faster retraction.

The plunger 2508 of the rotary driver 2500 includes a substantially rectangular body having a driver surface 2516 configured to engage the head portion 22 of a peg 14 in the loaded position. The plunger 2508 also includes a lug 2520 extending from the body and configured to be at least partially received within and travel along both the first and second grooves 2532*a*, 2532*b* of the barrel 2504. When assembled, the plunger 2508 is configured to reciprocate axially along the length of the driver channel 2074 between a retracted position (see FIG. 26), in which the plunger 2508 is positioned proximate the first end 2120 and the deployed position, in which the plunger 2508 is positioned proximate the outlet 2124.

Figure 23:
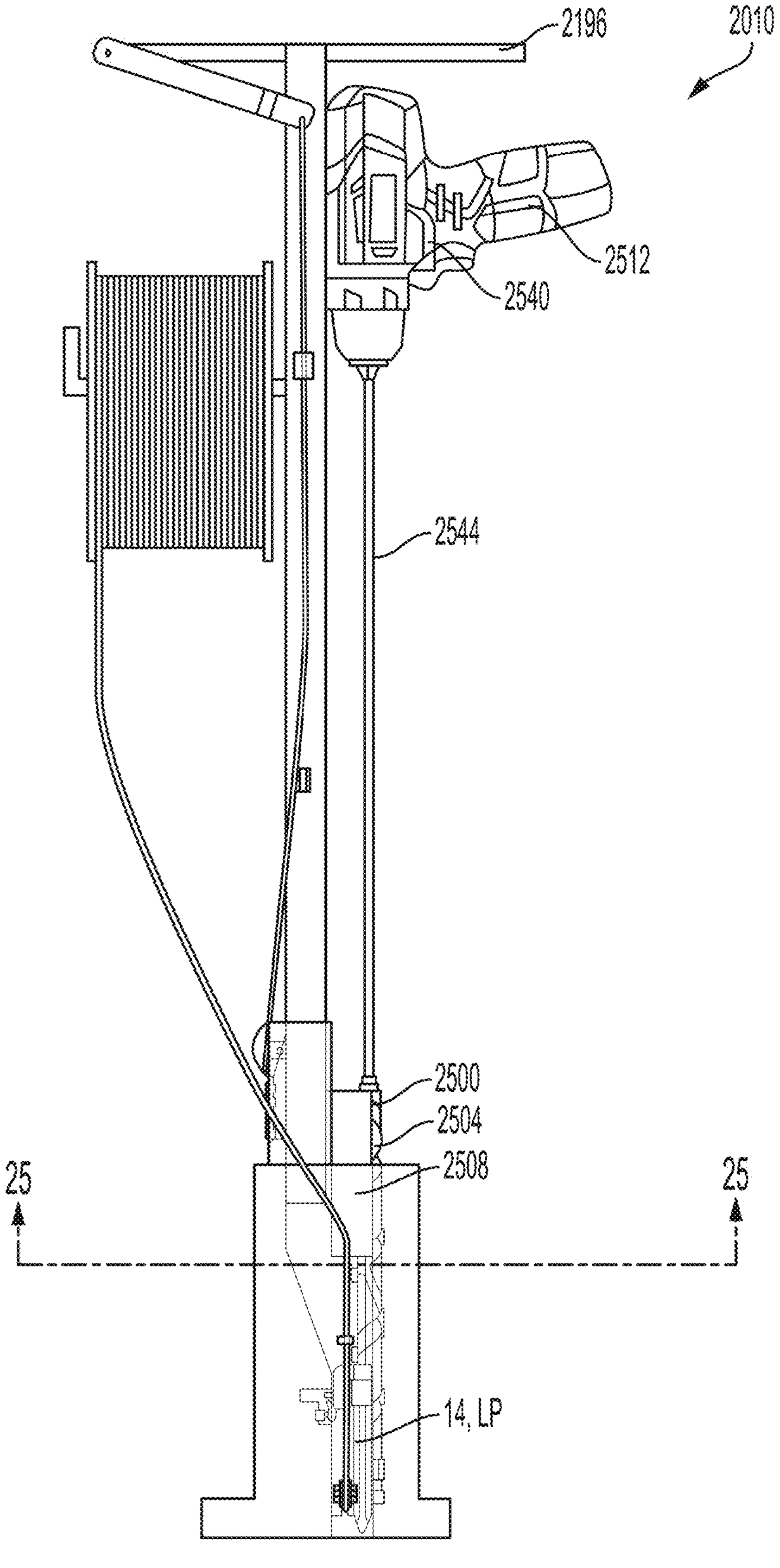
FIG. 23 is a front view of another embodiment of a peg driver.
Figure 24:
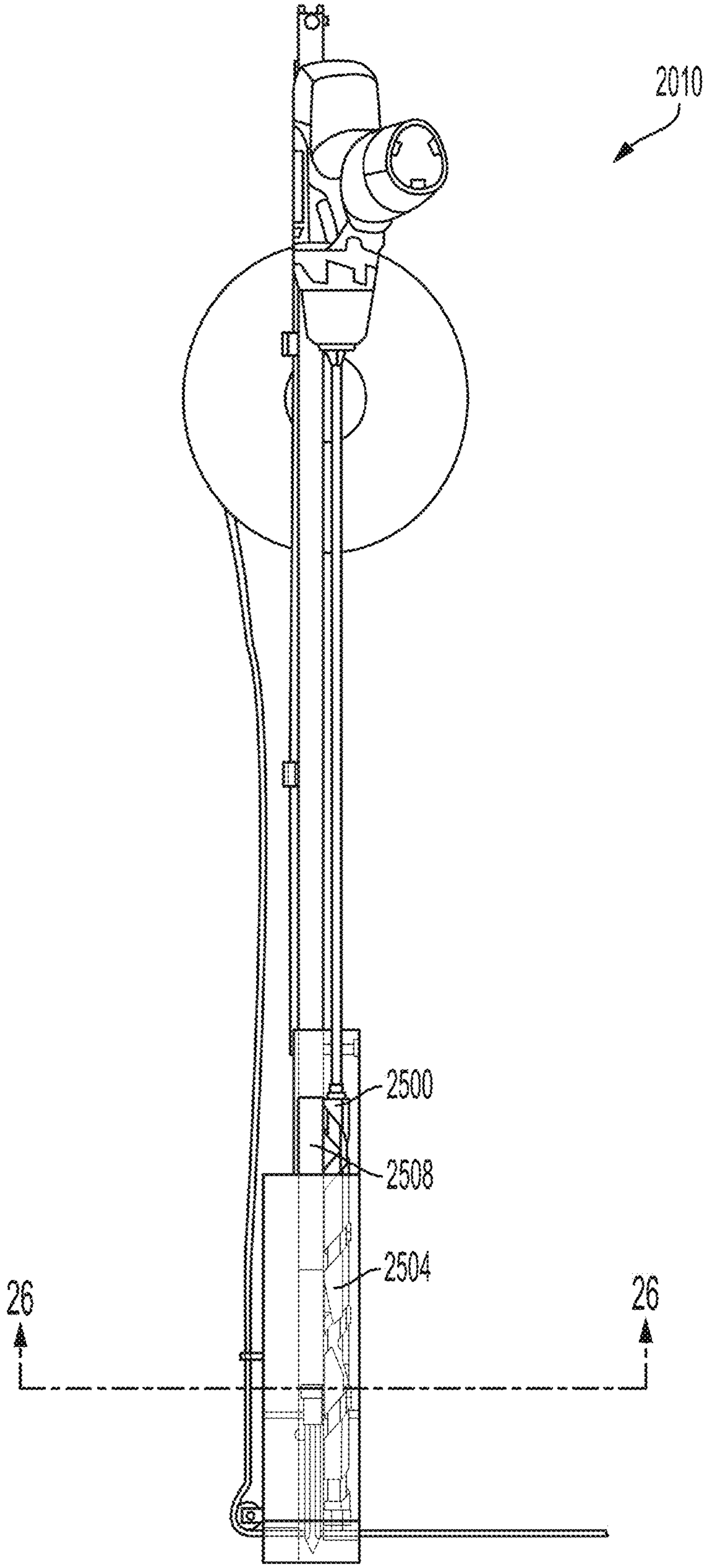
FIG. 24 is a side view of the peg driver of FIG. 23.
Figure 25:
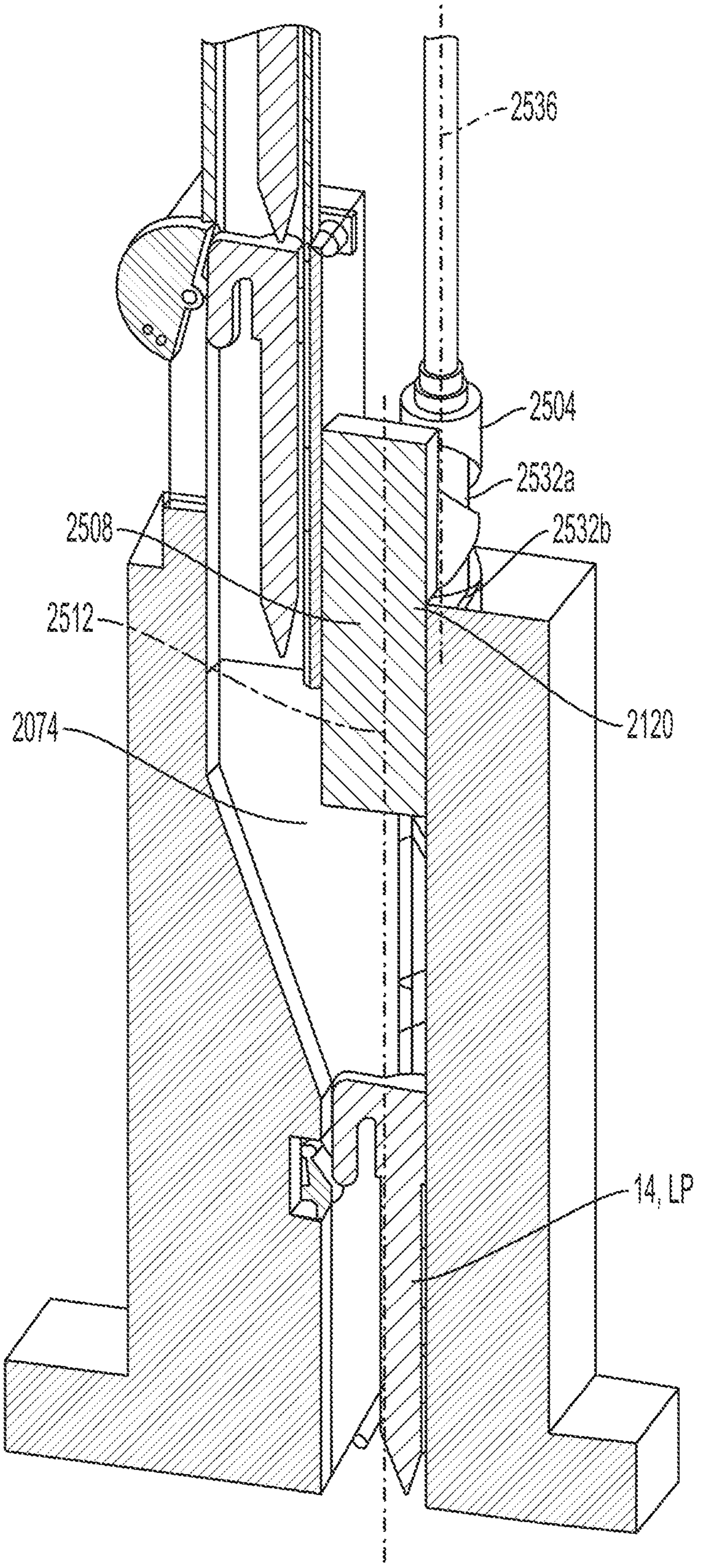
FIG. 25 is a section view taken along line 25-25 of FIG. 23.
Figure 26:
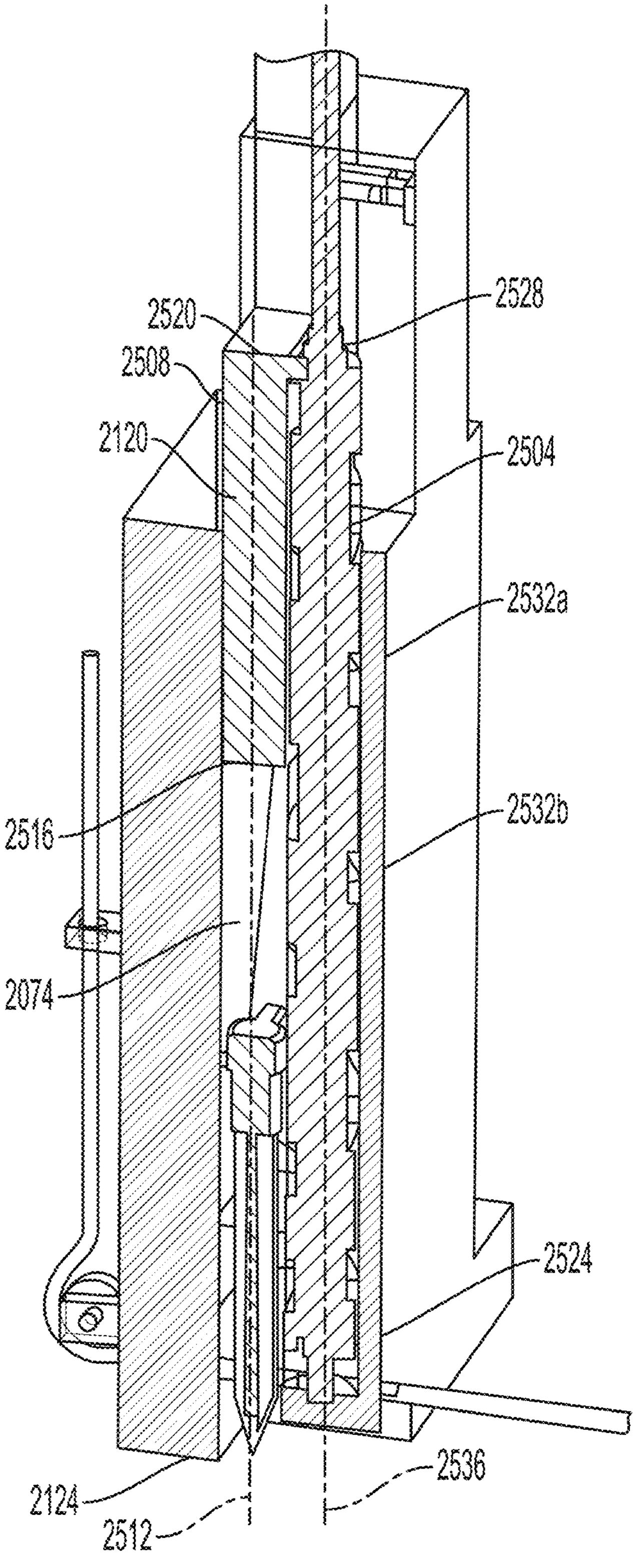
FIG. 26 is a section view taken along line 26-26 of FIG. 24.
Figure 27:
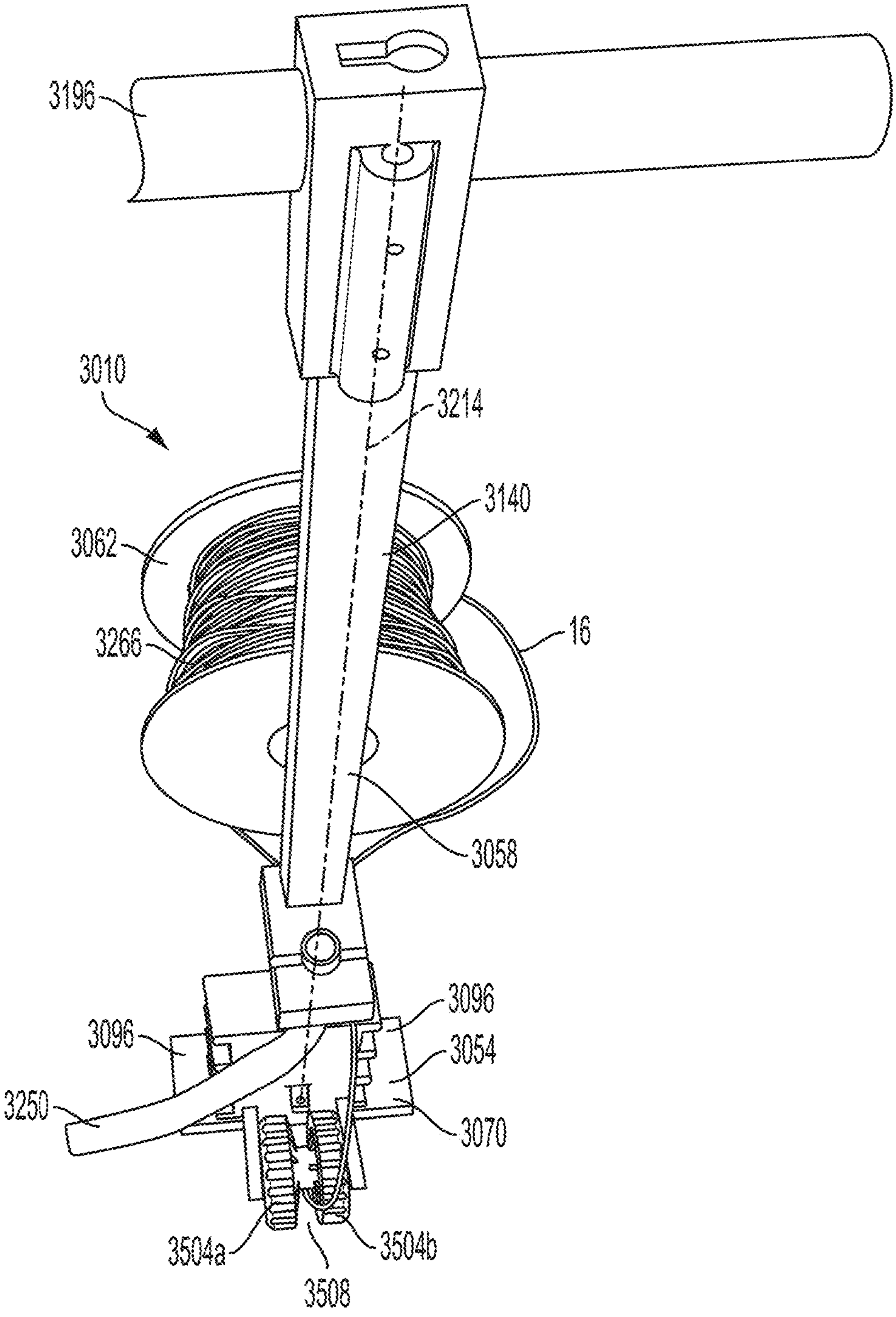
FIG. 27 is a top perspective view of another embodiment of a peg driver.
Figure 28:
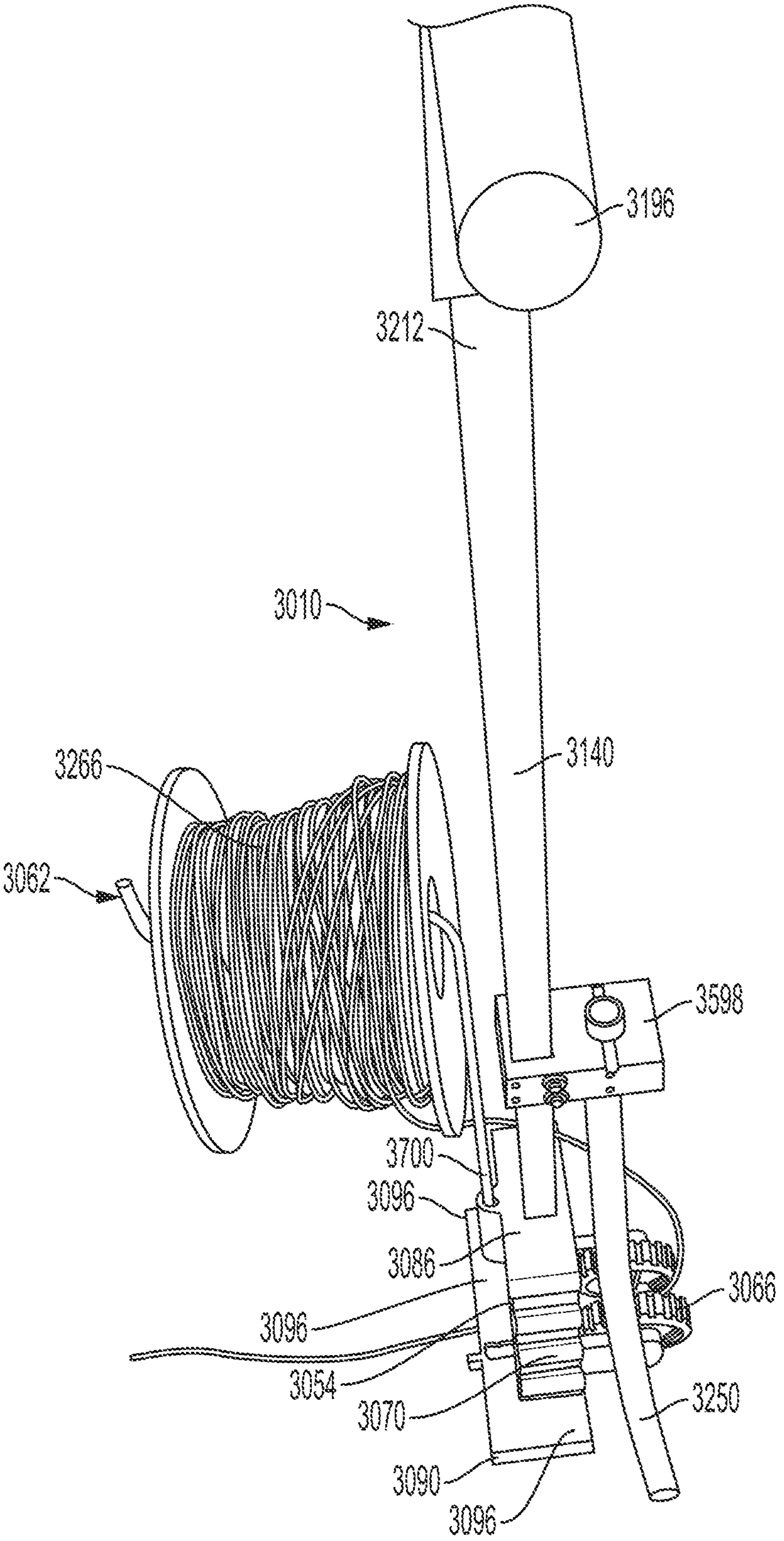
FIG. 28 is a side perspective view of the peg driver of FIG. 27.

The drive member 2512 of the rotary driver 2500 includes a power source configured to selectively apply a rotational torque to the barrel 2504. In the illustrated embodiment, the drive member 2512 includes a standard battery powered drill 2540 connected to the barrel 2504 via an elongated shaft 2544, however in other embodiments different forms of torque may be provided (e.g., an integrated electric motor, a gas-powered motor, and the like). As shown in FIG. 23, the rotary driver 2500 is configured so that the drill 2540 is mounted proximate the handle 2196 so that it can be readily accessed by the user.

To drive a peg 14 into the support surface 18, the user first loads a peg 14 into the loaded position (LP) as described above. Once loaded, the user then activates the drill 2540 (e.g., by depressing the trigger) whereby the drill 2540 applies a torque to the barrel 2504 via the shaft 2544 causing the barrel 2504 to begin rotating about the barrel axis 2536 in a first direction. The rotation of the barrel 2504, in turn, causes the lug 2520 of the plunger 2508 to travel along the first groove 2532*a* causing the plunger 2508 to begin traveling axially along the driver channel 2074 toward the outlet 2124.

As the barrel 2504 continues to rotate, the plunger 2508 continues to travel toward the outlet 2124 engaging the peg 14 and driving it into the support surface 18 whereby the hook member 46 captures the boundary wire 16 therebetween.

After the peg 14 has been installed, the user continues to actuate the drill 2540 whereby the lug 2520 transitions into the second groove 2532*b* whereby the rotation of the barrel 2504 causes the plunger 2508 to begin traveling away from the outlet 2124 and toward the retracted position. Once the plunger 2508 reaches the retracted position the user can release the trigger of the drill 2540 causing the barrel 2504 and plunger 2508 to stop.

In still other embodiments, the peg driver 2010 may include an activation assembly configured to activate and deactivate the drive member 2512 at the beginning and end of a peg driving cycle, respectively. In such an embodiment, the activation assembly may include a series of cams, levers, and connectors that, upon actuation by the user, starts the drive member 2512 and begins a peg driving cycle. The activate assembly is and then configured to automatically deactivates the drive member 2512 after a single peg driving cycle is complete. More specifically, the user actuates the activation assembly by manipulating a lever, button, or other user input when the plunger 2508 is in the retracted position. Once actuated, the activation assembly causes the drive member 2512 to begin rotating which, in turn, causes the plunger 2508 to travel from the retracted position toward the actuated position. Upon reaching the actuated position, the continued rotation of the drive member 2512 causes the plunger 2508 to travel back toward the retracted position. Once reaching the retracted position, the return of the plunger 2508 triggers the activation assembly which then causes the drive member 2512 to stop. The system is then set for another cycle.

FIGS. 27-46 illustrate another embodiment of a peg driver 3010. The peg driver 3010 is substantially similar to the peg driver 10, so only the differences will be discussed in detail herein. The peg driver 3010 includes a base 3054, a driver shaft 3140 configured to drive an individual peg 14 into a support surface 18, a foot driver 3250 coupled to the shaft 3140, and a boundary wire deployment assembly 3062.

The base 3054 of the peg driver 3010 includes a body 3070 having a first or top side 3086 and a bottom or second side 3090 opposite the top side 3086. The body 3070 also defines a driver channel 3074 that is open to at least the bottom side 3090.

The body 3070 also includes a baseplate 3500 that extends outwardly from the second side 3090 to define a base footprint that is larger than the cross-sectional shape of the base 3054 in both the width and depth dimensions. The cross-sectional area of the baseplate 3500 taken normal to the shaft axis 3214 may be between 200-300% of the cross-sectional shape of the body 3070 taken normal to the shaft axis 3214. More specifically, the cross-sectional area of the baseplate 3500 taken normal to the shaft axis 3214 may be 225%, 250%, or 275% of the cross-sectional shape of the body 3070 taken normal to the shaft axis 3214±10% (see FIG. 39). The baseplate 3500 extends horizontally outwardly from the body 3070 in at least two directions to form two or more footpads or footpad regions 3096 upon which the user can apply a downward force (e.g., with his or her foot) to stabilize the peg driver 3010 during the peg driving process (see FIG. 28). In the illustrated embodiment, the baseplate 3500 extends outwardly from the body 3070 in three directions (e.g., to both lateral sides and opposite the direction of travel T) to form three footpad regions 3096. However, in other embodiments, more or fewer footpads 3096 may be present.

In the illustrated embodiment, the baseplate 3500 forms a footprint that is between 160 mm and 190 mm wide and between 50 mm and 90 mm deep. In other embodiments, the baseplate 3500 may be between 170 mm and 180 mm wide. In still other embodiments, the baseplate 3500 may be between 60 mm and 80 mm deep, or 70 mm deep.

Figure 32:
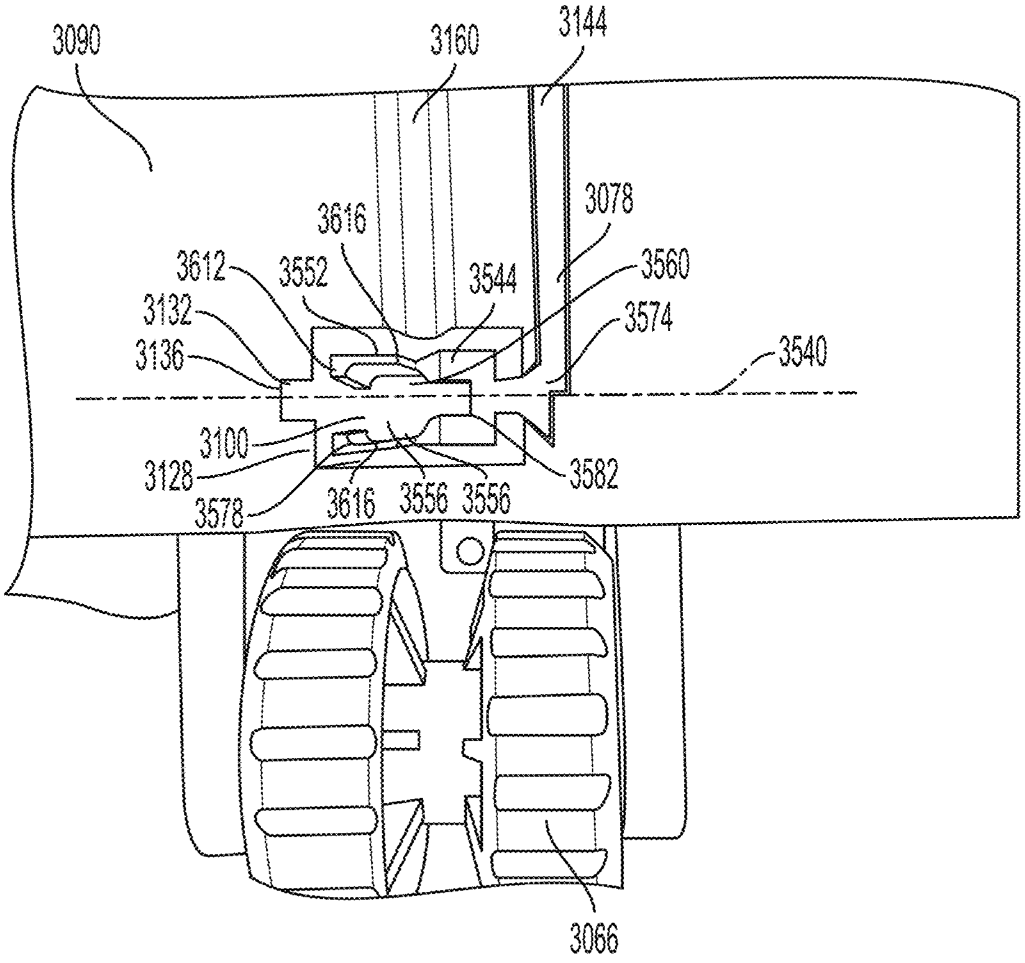
FIG. 32 is a bottom view of the base of the peg driver of FIG. 27 with an adapter installed in the drive channel.
Figure 33:
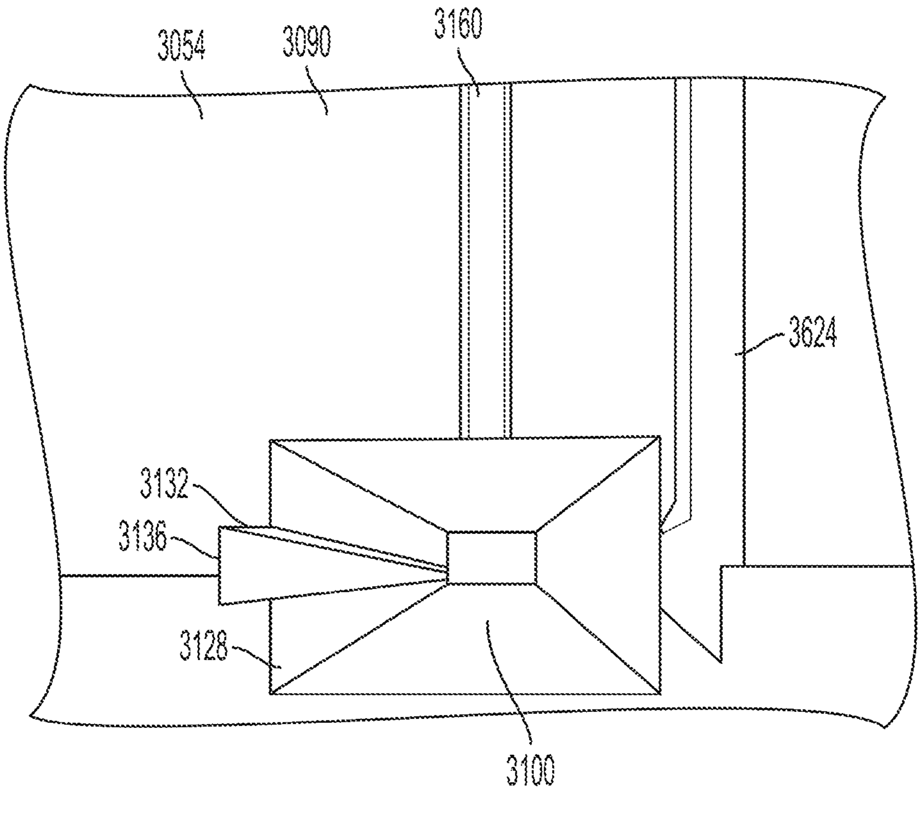
FIG. 33 is a bottom view of the base of the peg driver of FIG. 27 with the adapter removed from the drive channel.
Figure 34:
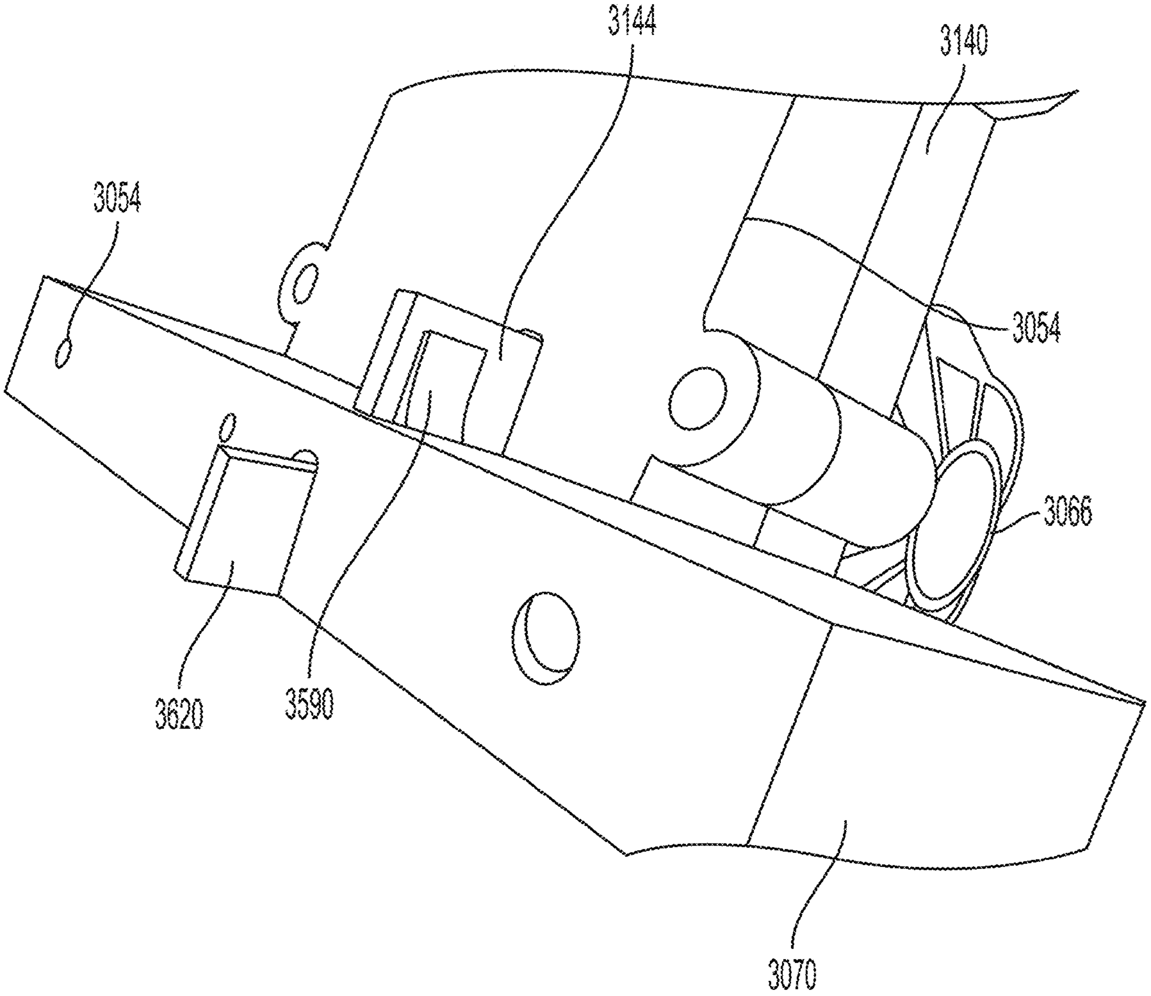
FIG. 34 is a detailed perspective view of the base of the peg driver of FIG. 27

The body 3070 of the peg driver 3010 may further include one or more wheels 3066 positioned proximate the second side 3090 of the body 3070 on the side facing the direction of travel T. The one or more wheels 3066 allow the peg driver 3010 to be more easily rolled along the support surface 18 while providing clearance for the boundary wire 16 being fed into the wire feed channel 3160. More specifically, the wheels 3066 provide two tread portions 3504*a*, 3504*b* forming a groove 3508 therebetween. As shown in FIG. 32, the wheels 3066 are positioned such that the groove 3508 is aligned with the wire feed channel 3160. In some embodiments, the two tread portions 3504*a*, 3504*b* and groove 3508 may be formed by a single wheel or two wheels mounted side-by-side.

Figure 31:
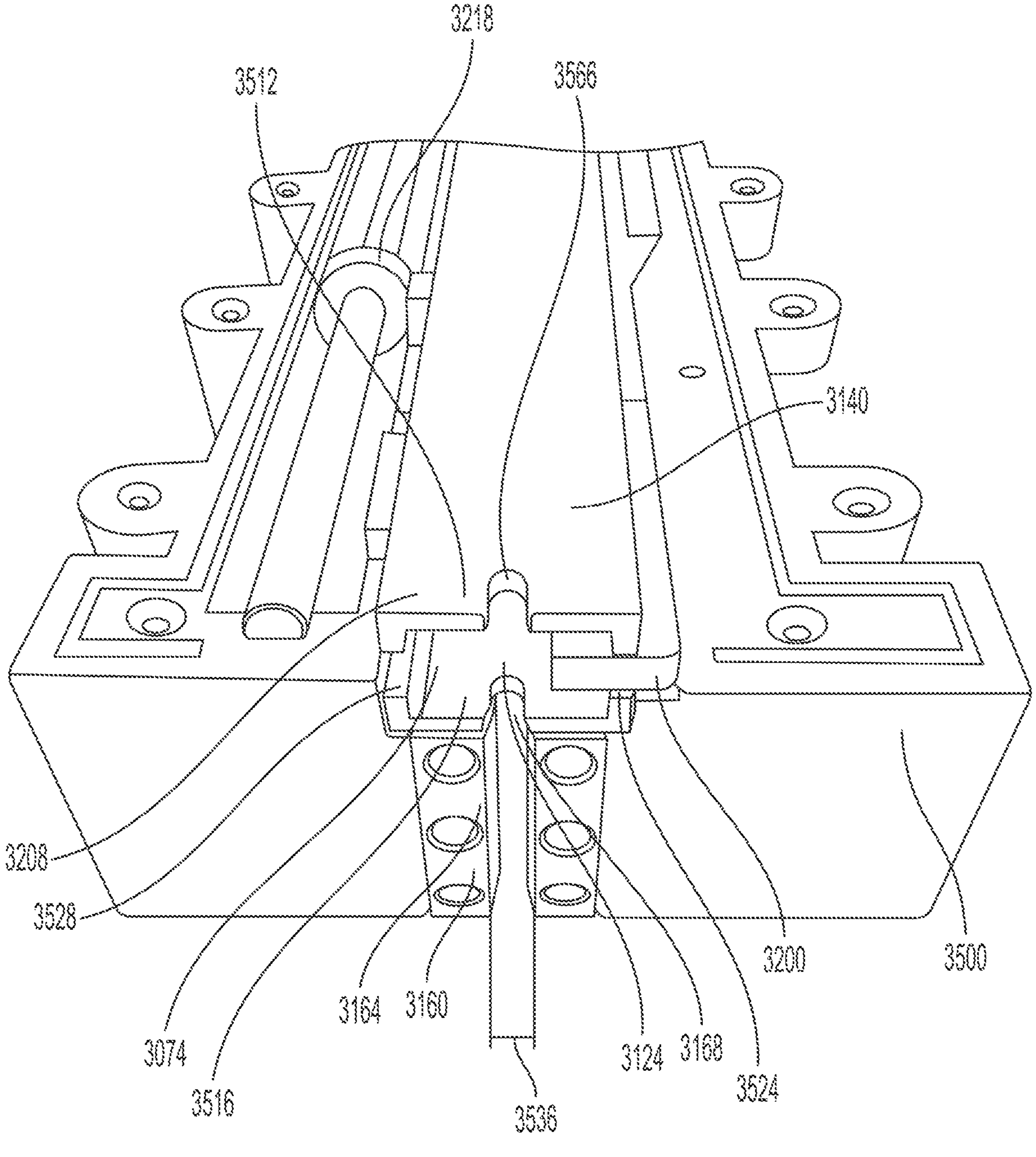
FIG. 31 is the section view of FIG. 29 viewed from the bottom side of the peg driver.

The boundary wire feed channel 3160 of the body 3070 includes an upstream portion 3164 and a downstream portion 3168. As shown in FIG. 31, the downstream portion 3168 of the boundary wire feed channel 3160 is open to the second side 3090 and defines a slot width 3536. In the illustrated embodiment, the slot width 3536 generally corresponds to the diameter of boundary wire 16. As shown in FIG. 31, the slot width 3536 is generally constant along the entire height of the downstream portion 3168.

The driver channel 3074 of the peg driver 3010 includes a first passage 3100 defining a first axis 3104. The first passage 3100, in turn, is oriented vertically within the base 3054 having a first end 3120 open to the first side 3086 of the body 3070 and a second end or outlet 3124 open to the second side 3090 of the body 3070. As shown in FIG. 32, the cross-sectional shape of the first passage 3100 includes a first portion 3128, generally corresponding to the exterior cross-sectional shape of the driver shaft 3140, and a second portion 3132 extending radially outwardly from the first portion 3128 to define a cam surface 3136. More specifically, the cross-sectional shape of the first portion 3128 is generally rectangular having a width and depth that substantially corresponds to the width and depth of the exterior of the driver shaft 3140 (explained below).

The driver shaft 3140 of the driver assembly 3058 includes an elongated body having a first end 3208, and a second end 3212 opposite the first end 3208. The driver shaft 3140 also defines a shaft axis 3214 therethrough. As shown in FIG. 31, the driver shaft 3140 body 3204 is hollow in construction defining a driver channel 3074 therethrough.

The exterior surfaces of the driver shaft 3140 also form an exterior cross-sectional shape 3512 taken normal to the axis 3214. Similarly, the driver channel 3074 produces an interior cross-sectional shape 3512 taken normal to the axis 3214. The exterior cross-sectional shape 3512 generally corresponds to the interior cross-sectional shape of the first portion 3128 of the first passage 3100 to allow the driver shaft 3140 to slide axially within the passage 3100 while generally maintaining co-axial alignment therebetween. In the illustrated embodiment, both the interior cross-sectional shape 3512 and the exterior cross-sectional shape 3516 are rectangular. However, in other embodiments one or both cross-sectional shapes 3512, 3516 may be different (e.g., polygonal, circular, asymmetric, and the like). Furthermore, the illustrated exterior cross-sectional shape 3512 and the interior cross-sectional shape 3516 are constant along the entire axial length of the driver shaft 3140. However, in other embodiments, the interior and/or exterior cross-sectional shapes 3512, 3516 may vary along the axial length of the driver shaft 3140.

The driver shaft 3140 also includes a driver notch 3524 formed into the body 3204 at the first end 3208 thereof (see FIG. 31). The driver notch 3524 is sized and shaped to allow at least a portion of the driver arm 3200 to pass therethrough. More specifically, the notch 3524 is sized and shaped so that the second leg 242 of the driver arm 3200 may at least partially obstruct the driver channel 3074 while remaining flush with the first end 3208 thereof when the arm 3200 is in the engaged position.

The driver shaft 3140 also includes a mounting notch 3528 formed into the body 3204 and open to the first end thereof. During use, the mounting notch 3528 is sized, shaped, and positioned to permit a mounting tab 3532 of the retention mechanism 3078 to extend therethrough (described below). In the illustrated embodiment, the mounting notch 3528 is positioned opposite the driver notch 3524 but may be positioned elsewhere in other embodiments.

The driver shaft 3140 also includes a pair of wire slots 3566 open to the first end 3208 and sized to allow at least a portion of the boundary wire 16 to be positioned therein. More specifically, the slots 3566 are formed into two opposing walls that are generally aligned with the wire feed channel 3160 (see FIG. 31). The positioning of the slots 3566 allow the segment of the boundary wire 16 that is extending through the wire feed channel 3160 to be at least partially positioned within the slots 3566 when the driver shaft 3140 is in the actuated position. By doing so, the wire slots 3566 allow the first end 3208 of the shaft 3140 to rest flush against the support surface 18 when the driver shaft 3140 is in the actuated position without pinching or being obstructed by the width of the wire 16 itself. As such, the wire slots 3566 allow for a deeper stroke length of the driver shaft 3140 which allows for the peg 14 to be more deeply inserted into the support surface 18.

During use, the user is able to slide the driver shaft 3140 axially along the length of the passage 3100 between a first or neutral position (see FIG. 29), where the first end 3208 is positioned a first distance from the outlet 3124, and an actuated position (see FIG. 30), in which the first end 3208 is positioned a second distance from the outlet 3124 that is less than the first distance. In the illustrated embodiment, the first end 3208 is positioned proximate the outlet 3124 of the first passage 3100 when the driver shaft 3140 is in the actuated position. In some embodiments, the first end 3208 of the driver shaft 3140 may be flush with the outlet 3124 when the driver shaft 3140 is in the actuated position. In still other embodiments, the first end 3208 of the driver shaft 3140 may extend beyond the outlet 3124 when the driver shaft 3140 is in the actuated position.

In still other embodiments, the peg driver 3010 may include a depth setting assembly to allow the user to adjust or modify the position of the first end 3208 of the driver shaft 3140 relative to the outlet 3124 when the driver shaft 3140 is in the actuated position. In such embodiments, the depth setting assembly may include, but is not limited to, pins, stops, wedges, and the like that may be mechanically adjusted and that are configured to engage a portion of the driver shaft 3140 and/or the recoil lug 3218. The depth setting assembly may also include a collar and/or other attachment that is coupled to the exterior of the driver shaft 3140 above the top side 3086 and which engages the top side 3086 when the driver shaft 3140 is in the desired location. In embodiments where a depth setting assembly is present, the user may adjust the final position of the driver shaft 3140 to accommodate for desired setting depths of the pegs 14, different peg designs, and the like.

Figure 29:
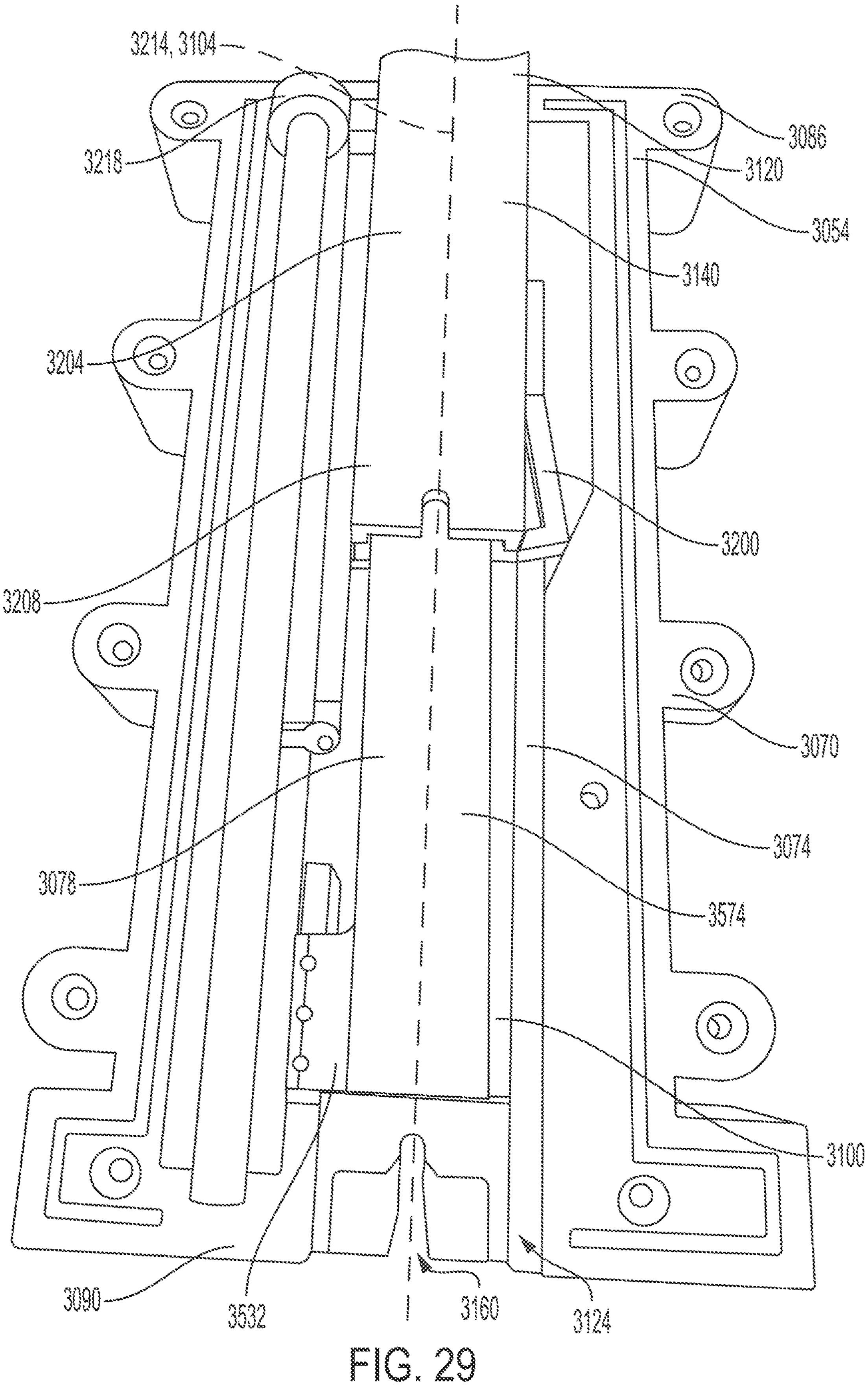
FIG. 29 is a section view of the peg driver of FIG. 27 with the driver shaft in the neutral position.
Figure 30:
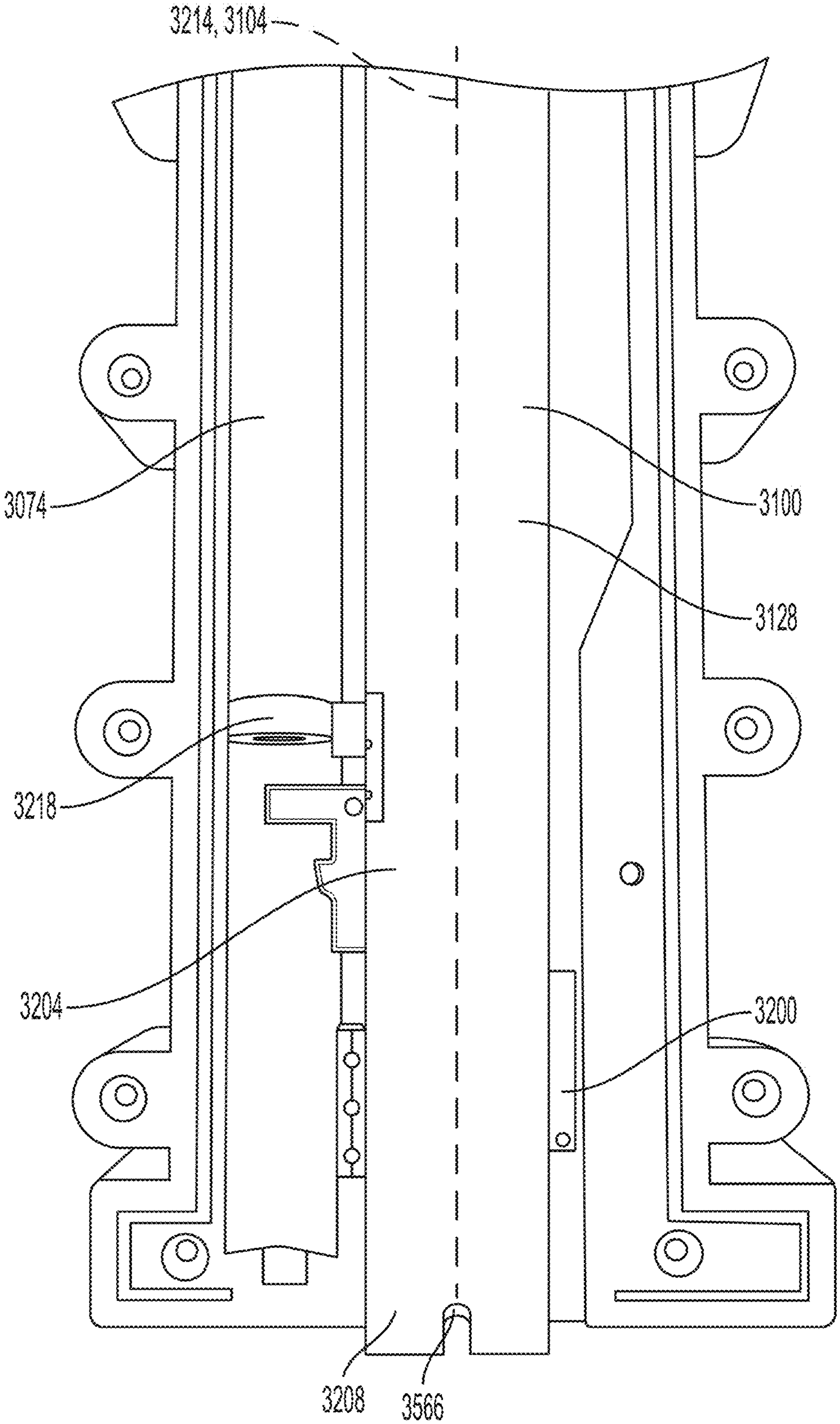
FIG. 30 is the section view of the peg driver of FIG. 27 with the driver shaft in the actuated position.

As shown in FIGS. 29 and 31, the retention mechanism 3078 of the base 3054 is in operable communication with the first passage 3100 of the driver channel 3074 and configured to maintain the peg 14 in a "loaded position" (LP) to await final driving and installation into the support surface 18. More specifically, the retention mechanism 3078 includes an adapter 3574 that is positionable in the first passage 3100 proximate the outlet 3124 and that is configured to maintain the peg 14 in a pre-determined position relative to the first axis 3104 of the first passage 3100 within a pre-determined position-tolerance envelope.

The adapter 3574 of the retention mechanism 3078 includes an adapter body 3544 configured to be positioned within the first passage 3100, and a mounting tab 3144 extending from the adapter body 3544 and configured to releasably couple the adapter body 3544 to the base 3054 while properly positioning the adapter body 3544 within the passage 3100. The adapter body 3544 defines an inlet side 3576 and an outlet side 3577. The outlet side 3577 is adjacent the outlet 3124, and the inlet side 3576 is axially spaced from the outlet 3124 (e.g., opposite the outlet 3124). The inlet side 3576 may include beveled edges to ease the ability of the peg 14 to be inserted therein. As shown in FIG. 32, the adapter body 3544 is substantially elongated in shape having an exterior cross-sectional shape 3552 sized so that the adapter 3574 can be positioned within and travel axially along the driver channel 3074. More specifically, the illustrated adapter 3574 has a rectangular exterior cross-sectional shape 3552 that is sized to substantially correspond with the size of the interior cross-sectional shape 3512 of the driver shaft 3140. While the illustrated exterior cross-sectional shape 3552 corresponds with the interior cross-sectional shape 3512 of the driver shaft 3140, it is understood that in other embodiments the exterior cross-sectional shape 3552 of the adapter 3574 may include different shapes so long as the adapter 3574 fits within the driver channel 3074. In the illustrated embodiment, the axial length of the adapter 3574 is greater than or equal to the overall length of the peg 14.

Figure 45:
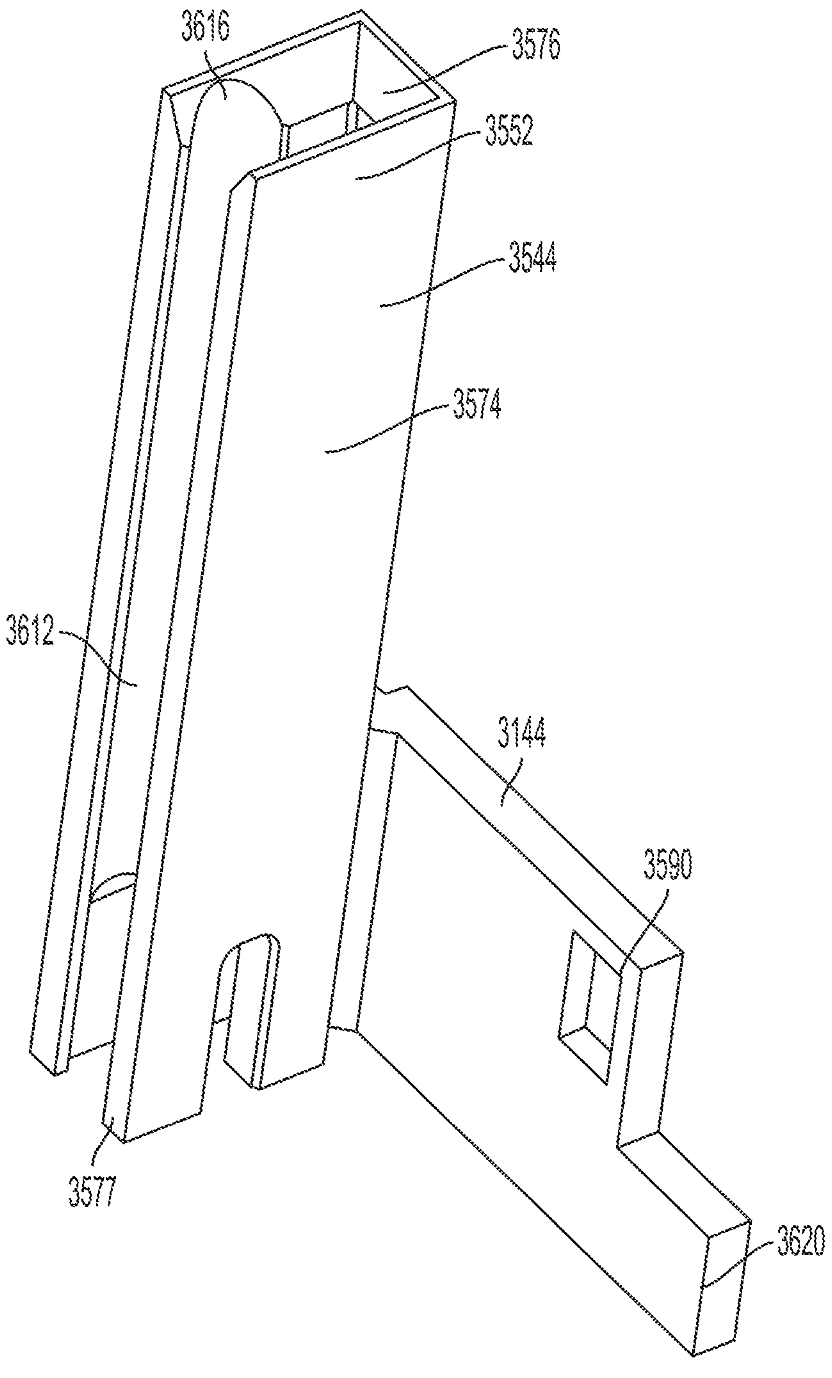
FIG. 45 is a perspective view of the adapter of FIG. 32.
Figure 46:
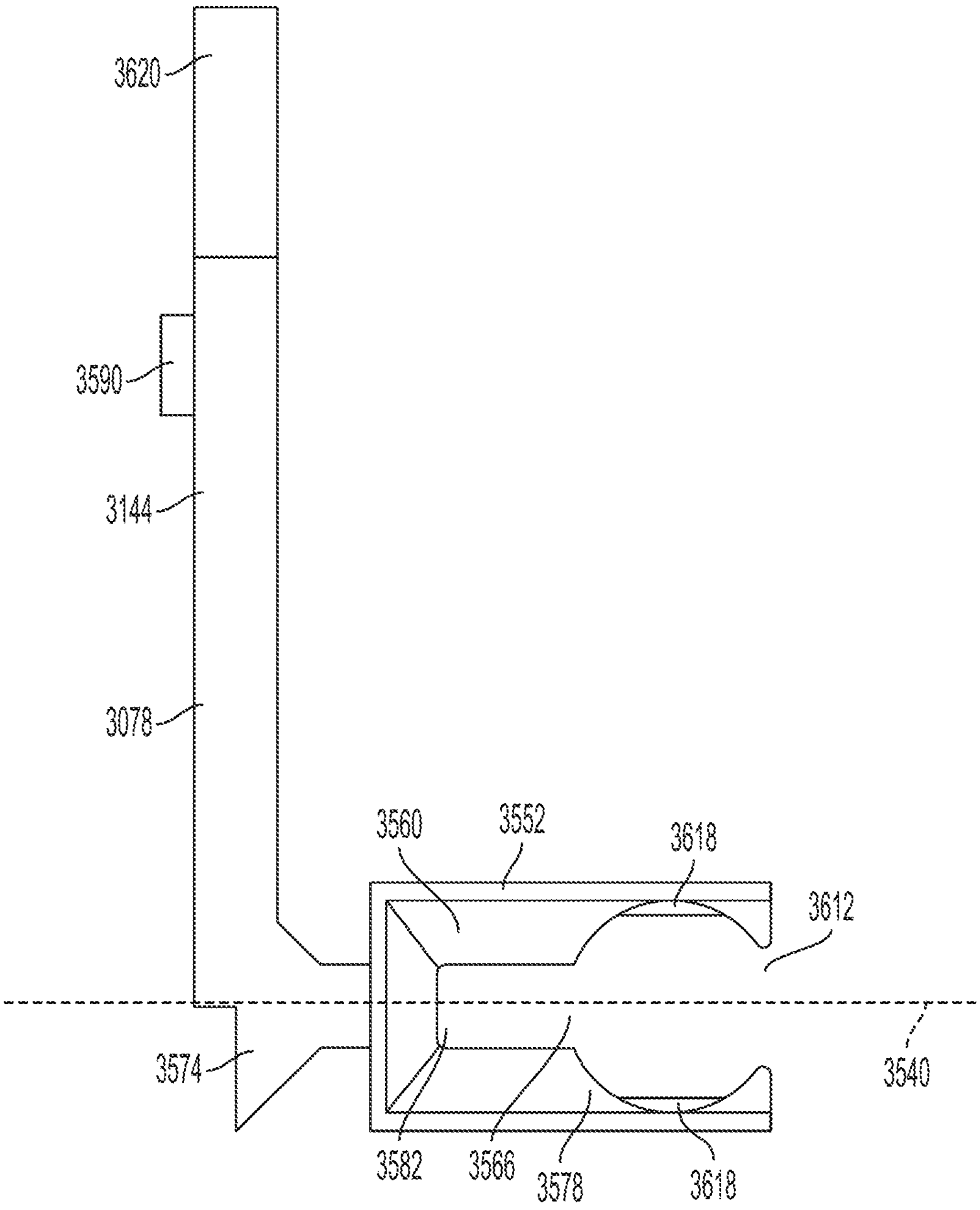
FIG. 46 is a top view of the adapter of FIG. 32.

With further reference to FIGS. 31 and 45-46, the adapter 3574 also defines an adapter channel 3556 extending axially through the adapter body 3544 to define an interior cross-sectional shape 3560. The interior cross-sectional shape 3560, in turn, generally corresponds with the size and shape of the peg 14. More specifically, the interior cross-sectional shape 3560 of the adapter 3574 includes a first portion 3578 that has a circular cross-section that corresponds to the shaft portion 26 of the peg 14, and a second portion 3582 that has a rectangular cross-section that corresponds to the hook member 46 of the peg 14. During use, the size and shape of the interior cross-sectional shape 3560 is configured to restrain the relative position of the peg 14 within the passage 3100 both when the peg 14 is in the loaded position (LP) and during the peg driving process. More specifically, the interior cross-sectional shape 3560 of the adapter 3574 is configured to restrain the position of the peg 14 translationally (e.g., the offset distance between the peg axis 34 and the first axis 3104), angularly (e.g., the skewed angle produced between the peg axis 34 and the first axis 3104), and rotationally (e.g., the rotational angle produced between the hook member 46 and the datum 3540) while allowing the peg 14 to travel axially therethrough. In the illustrated embodiment, the retention mechanism 3078 is configured to maintain the peg axis 34 within ±0.5 degrees relative to the first axis 3104 when in the loaded position (LP). In other embodiments, the retention mechanism 3078 is configured to maintain the peg axis 34 within ±0.125 degrees, ±0.25 degrees, ±0.75 degrees, ±1 degree, ±1.25 degrees, and ±1.5 degrees of the first axis 3104 when the peg 14 in the loaded position (LP). Furthermore, in the illustrated embodiment, the retention mechanism 3078 is configured to restrict the maximum rotation of the peg 14 about the peg axis 34 relative to the driver channel 3074 over the peg driving process (e.g., from the loaded position (LP) to the moment the peg 14 exits the outlet 3124) to no greater than ±0.5 degrees. In other embodiments, the retention mechanism 3078 is configured to restrict relative rotation between the peg 14 and the driver channel 3074 about the peg axis 34 over the peg driving process to no greater than ±0.125 degrees, ±0.25 degrees, ±0.75 degrees, ±1 degree, ±1.25 degrees, and ±1.5 degrees. In still other embodiments, the retention mechanism 3078 is configured to maintain the position of the hook member 46 of the peg 14 within ±0.5 degrees relative to the peg hook datum plane 3540 when in the loaded position (LP). In other embodiments, the retention mechanism 3078 is configured to maintain the peg hook member 46 within ±0.125 degrees, ±0.25 degrees, ±0.75 degrees, ±1 degree, ±1.25 degrees, and ±1.5 degrees relative to the peg hook datum plane 3540 when the peg 14 is in the loaded position (LP).

Furthermore, the interior cross-sectional shape 3560 of the adapter 3574 includes an open end 3612 such that the overall shape of the channel 3556 is "C-shaped." During use, the walls 3616 of the adapter 3574 are biased slightly inwardly (e.g., the interior cross-sectional shape 3560 is slightly undersized) to produce a clamping force against the peg 14 to capture and maintain the peg 14 in place such that the peg 14 will not move axially through the channel 3556 under the force of gravity alone. As a result of the open end 3612, the walls 3616 are then able to bias outwardly as the peg 14 is biased axially through the channel 3556 by the driver shaft 3140 (e.g., through the outlet 3124 and into the support surface 18). The adapter 3574 further includes a pair of opposing flats 3618 (FIG. 46) that extend inwardly from the channel 3556. The flats 3618 interact with the tip of the peg 14 (e.g., where the tip 30 begins to taper inwardly) to retain the peg 14 in the adapter 3574. While the illustrated adapter 3574 relies on the clamping force provided by the walls 3616 and the flats 3168 to capture and retain the peg 14 within the channel 3556, it is understood that in other embodiments different form of retention may be used such as, but not limited to, high friction materials applied to the walls of the channel 3556, forming high friction textures into the walls of the channel 3556, incorporating spring loaded tabs into the adapter 3574, and the like. Furthermore, the open end 3612 of the channel 3556 also serves as an access point to allow the driver arm 3200 to continuously engage the peg 14 along the entire axial length of the adapter 3574.

The adapter 3574 also includes a mounting tab 3144 extending from the adapter body 3544 and configured to maintain the adapter body 3544 within the passage 3100 during operation. More specifically, the mounting tab 3144 is configured to center and co-axially align the adapter body 3544 within the passage 3100 so that the driver shaft 3140 can pass between the adapter body 3544 and the walls of the passage 3100 when traveling between the neutral position to the actuated position. As shown in FIG. 31, the mounting tab 3144 includes a wall or member that extends outwardly from the adapter body 3544 and that is received within a corresponding slot 3624 formed by the base 3054. When the adapter 3574 is installed in the peg driver 3010, the mounting tab 3144 is positioned so that it aligns with and passes through the mounting notch 3528 of the driver shaft 3140 so that the driver shaft 3140 maintains maximum travel capabilities without interfering with the adapter 3574 itself.

In some embodiments, the adapter 3574 is removeable from the passage 3100. In such embodiments, the mounting tab 3144 extends into a slot 3624 formed in the body 3070 of the base 3054 (see FIG. 31) and is secured by a stop member or detent 3590. More specifically, when the adapter 3574 is fully received in the passage 3100, the detent 3590 extends from and engages the body 3070 of the base 3054 and prevents the adapter 3574 from being removed from the passage 3100 (see FIG. 34). To remove the adapter 3574, the stop member 3590 can be depressed such that it disengages with the body 3070 of the base 3054 and the adapter 3574 can be removed axially from the passage 3100 via the outlet 3124. The adapter 3574 can be removed to dislodge or otherwise remove a jammed peg 14 from the driver channel 3074.

While the illustrated adapter 3574 includes a stop member or detent 3590 to selectively couple the adapter 3574 to the peg driver 3010, in other embodiments different forms of coupling may also be used. For example, in some embodiments the adapter 3574 may further include a fastener, and the like. Furthermore, in some embodiments the distal end 3620 of the mounting tab 3144 may extend from the body 3070 and be exposed from the outside thereof (see FIG. 34). In such embodiments, the distal end 3620 may have some form of indicia included thereon to allow the user to identify which type of adapter 3574 is currently installed in the peg driver 3010 without having to turn over the device.

In still other embodiments, the adapter 3574 can also be removed and replaced with an adapter that is configured to receive a different peg design therein. In such embodiments, the peg driver 3010 may include a first adapter having a first interior cross-sectional shape configured to correspond with a first peg design, and a second adapter having a second interior cross-sectional shape different from the first interior cross-sectional shape that is configured to correspond with a second peg design that is different from the first peg design. In such embodiments, the user may interchange the two adapters as needed to accommodate the different peg designs.

Figure 35:
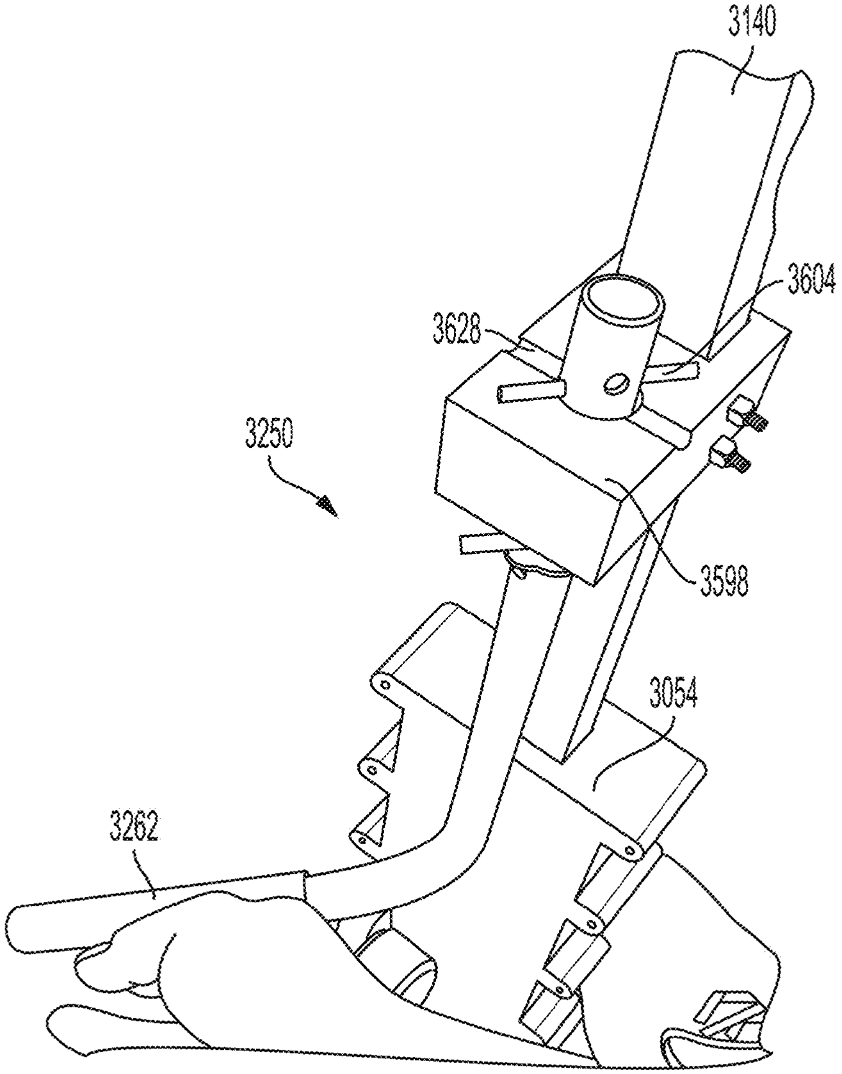
FIG. 35 is a detailed view of the foot driver of the peg driver of FIG. 27.
Figure 36:
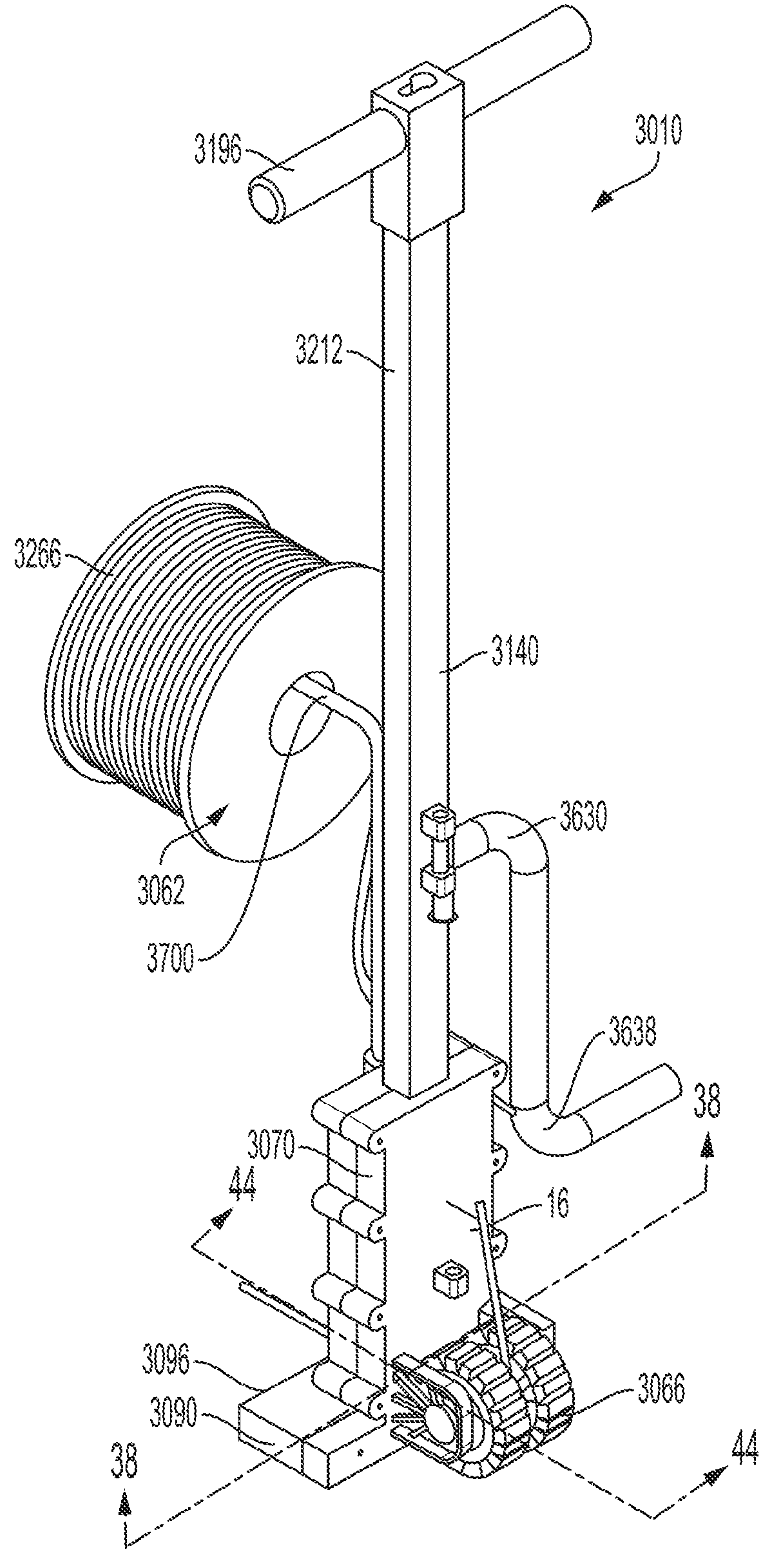
FIG. 36 is a perspective view of the peg driver of FIG. 27.
Figure 37:
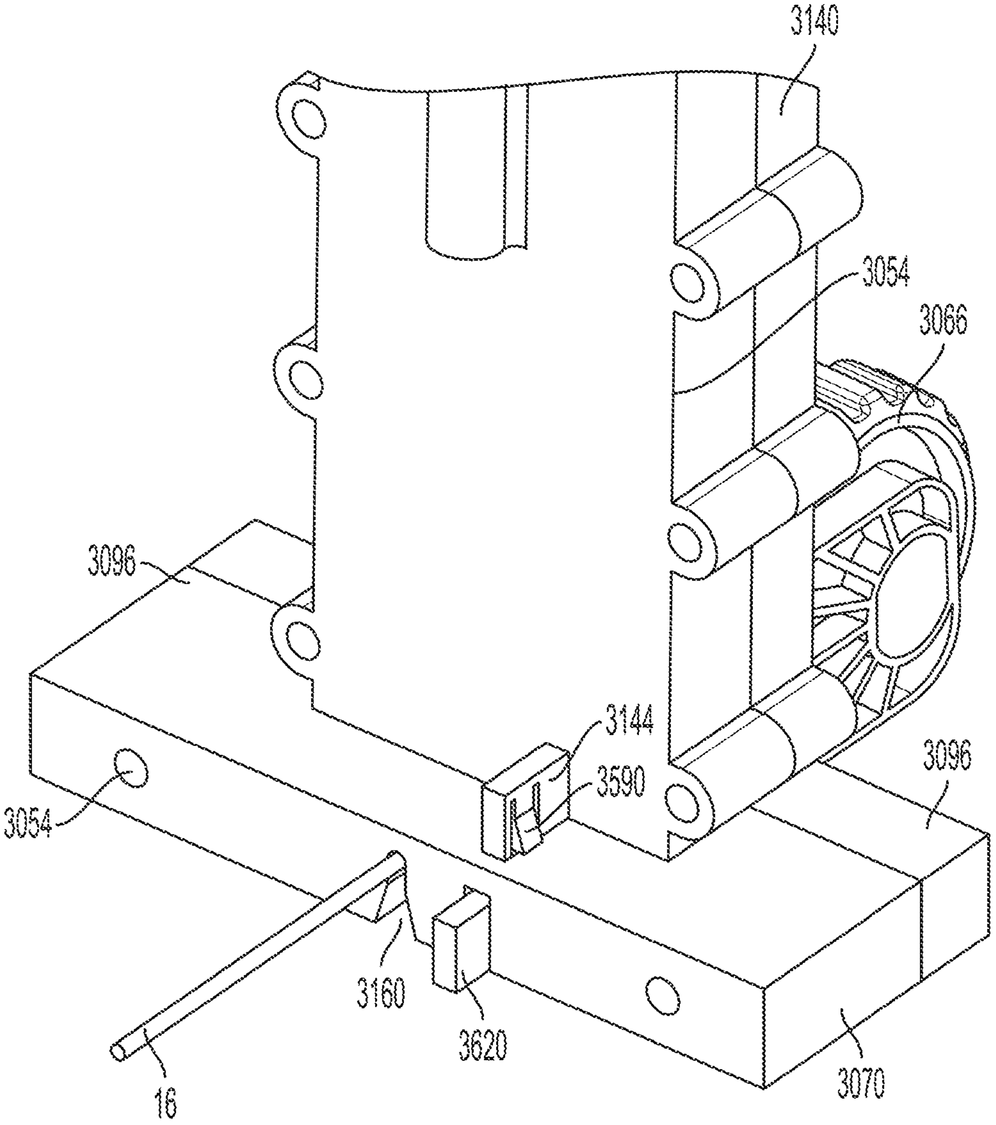
FIG. 37 is a detailed perspective view of the base of the peg driver of FIG. 27.
Figure 38:
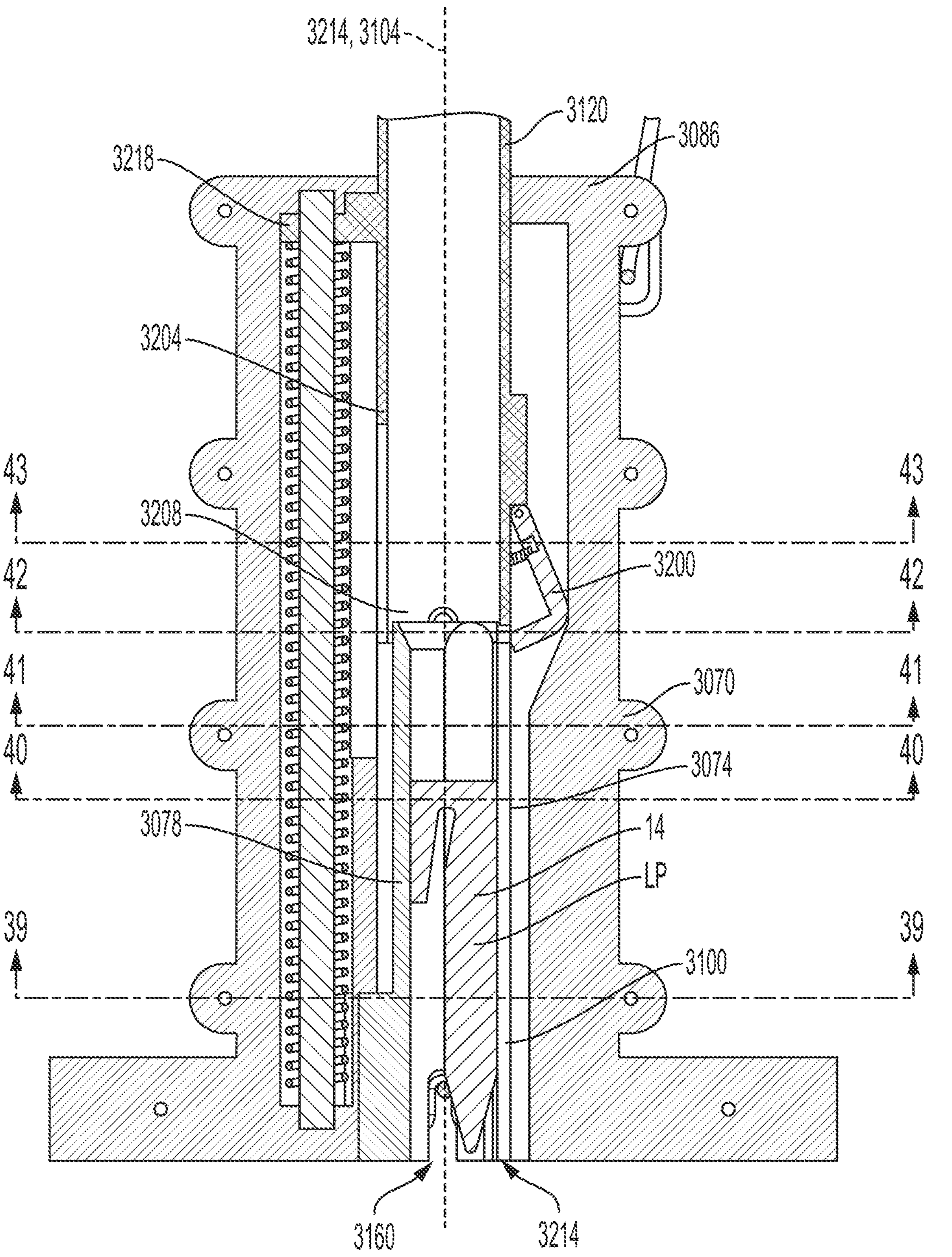
FIG. 38 is a section view taken along line 38-38 of FIG. 36.
Figure 39:
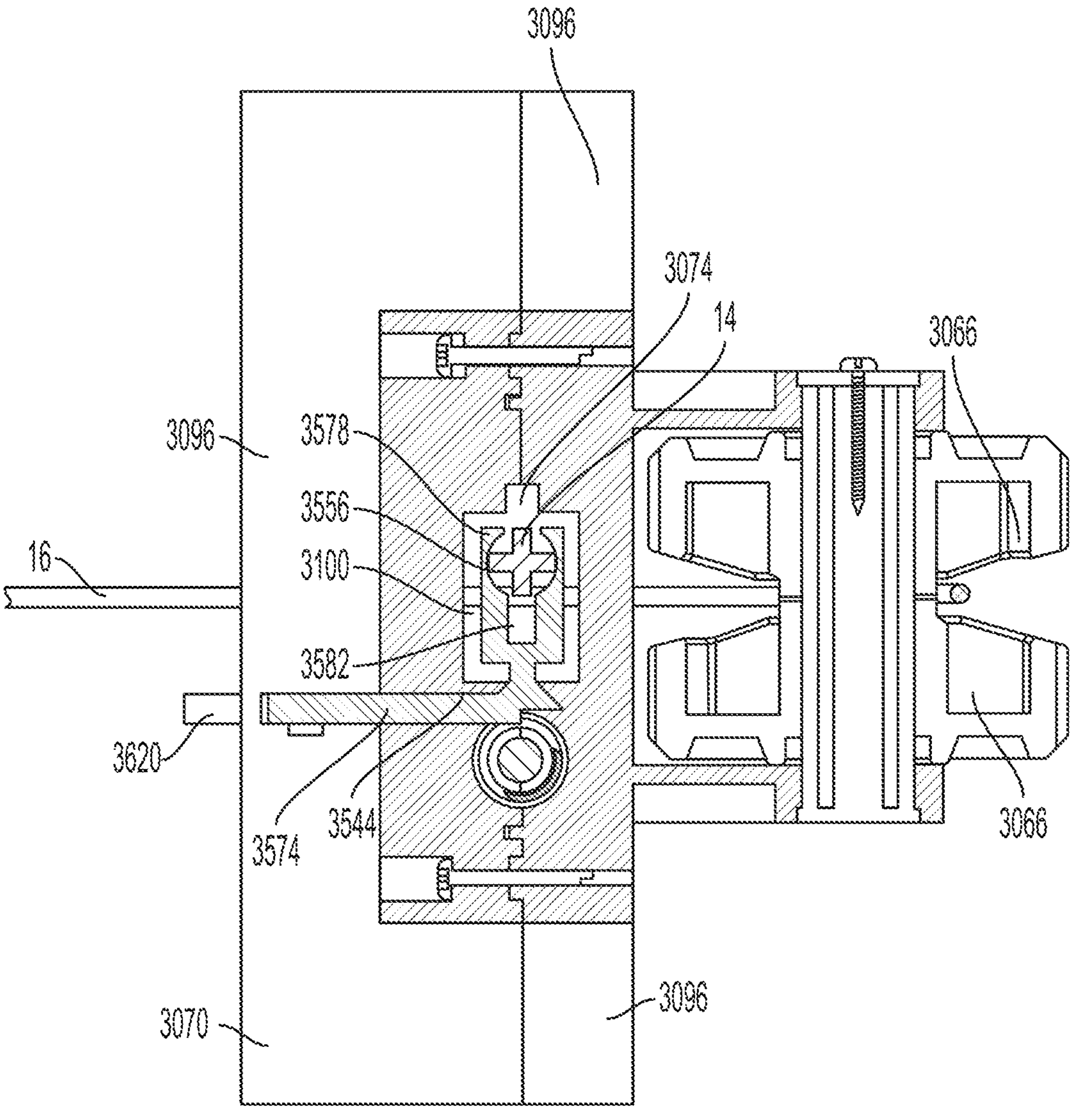
FIG. 39 is a section view taken along line 39-39 of FIG. 38.
Figure 40:
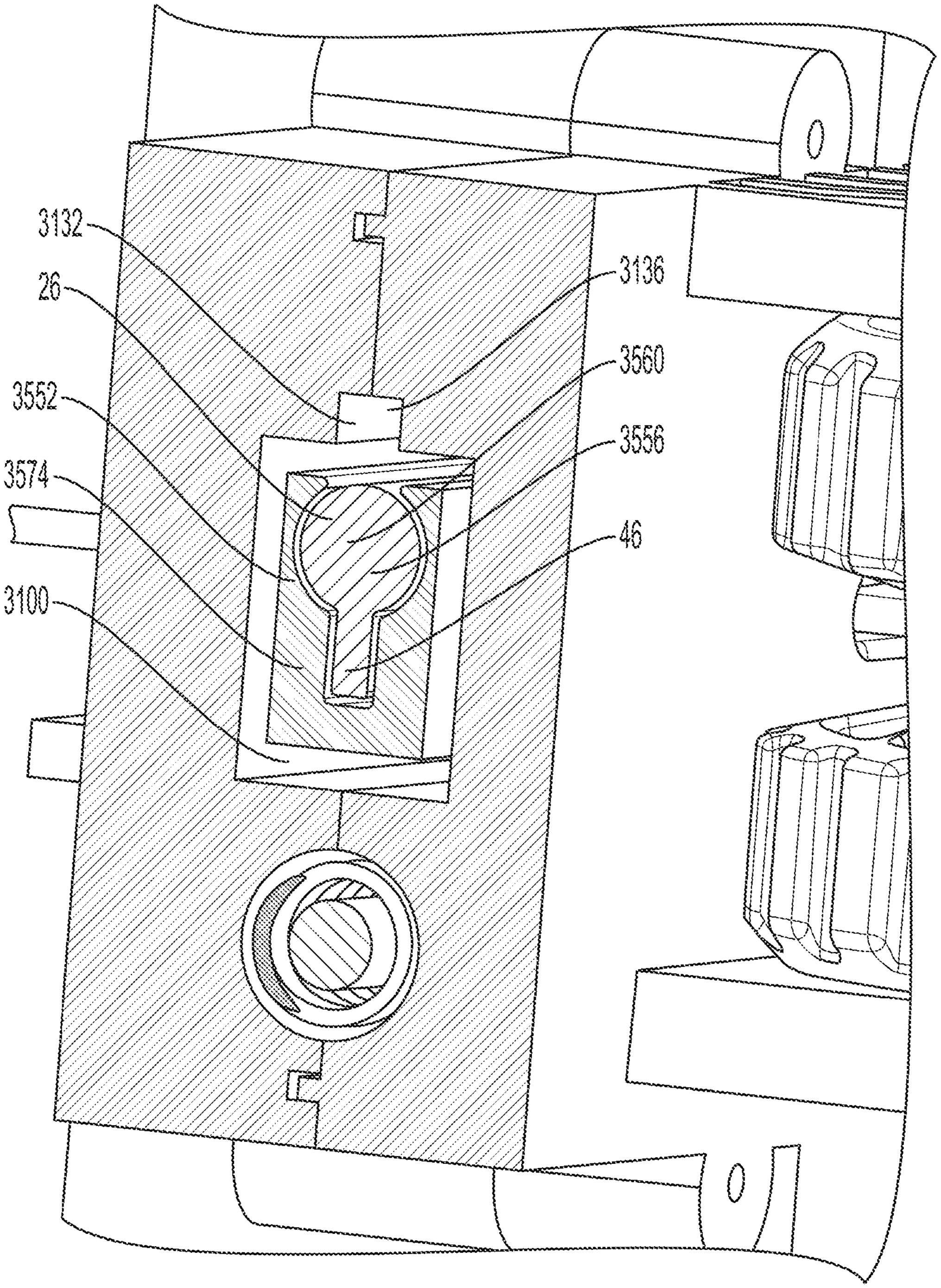
FIG. 40 is a section view taken along line 40-40 of FIG. 38.
Figure 41:
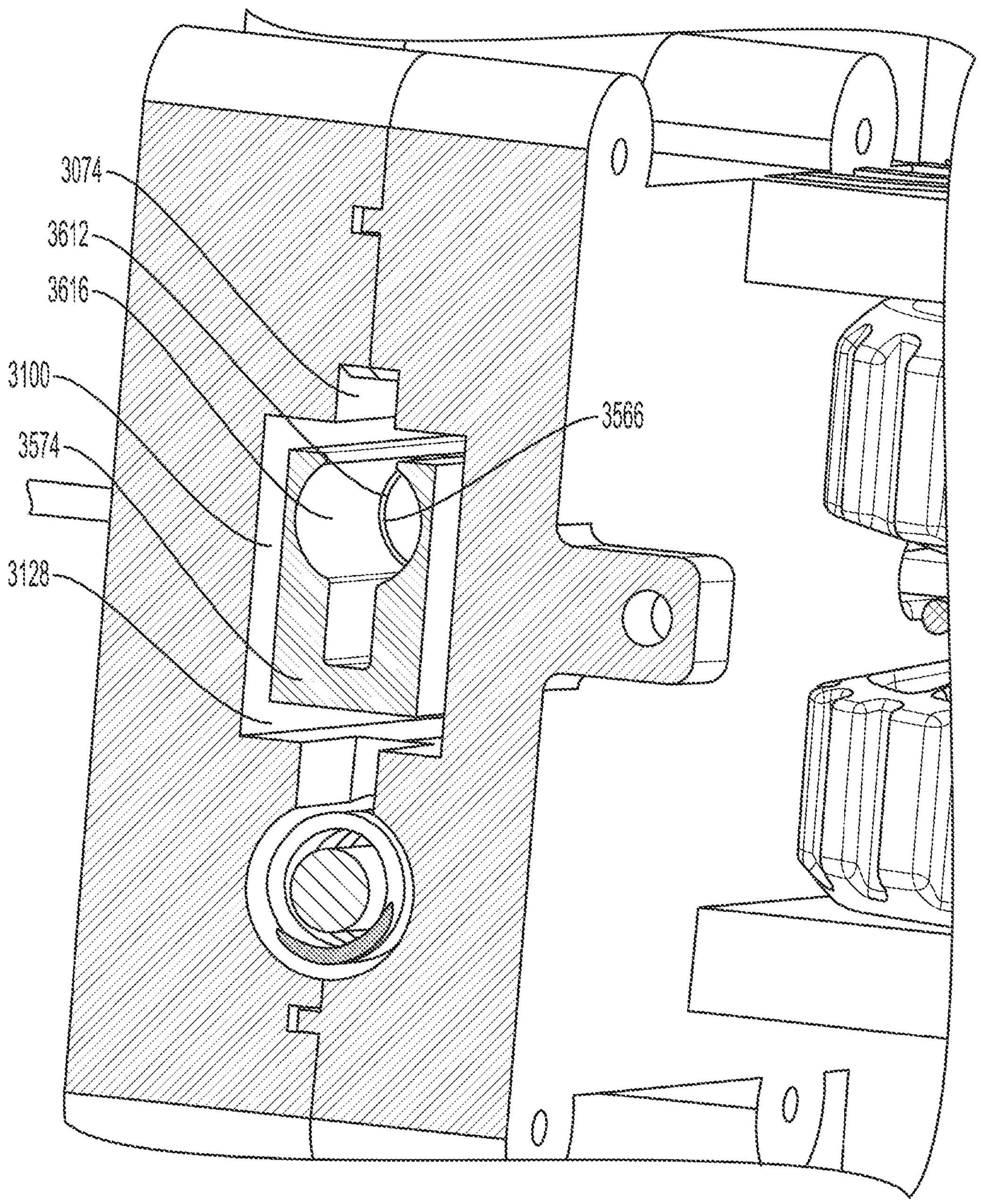
FIG. 41 is a section view taken along line 41-41 of FIG. 38.
Figure 42:
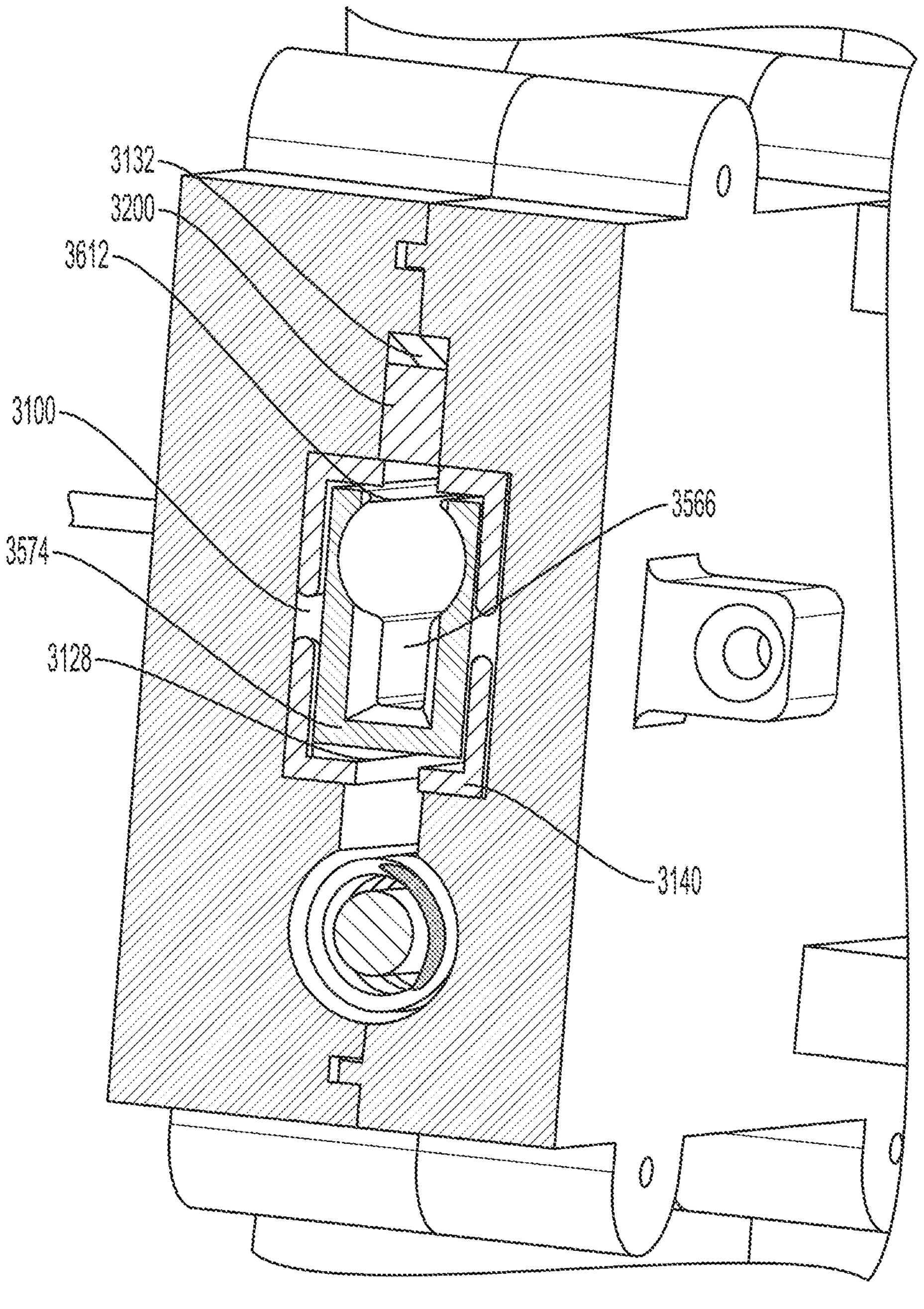
FIG. 42 is a section view taken along line 42-42 of FIG. 38.
Figure 43:
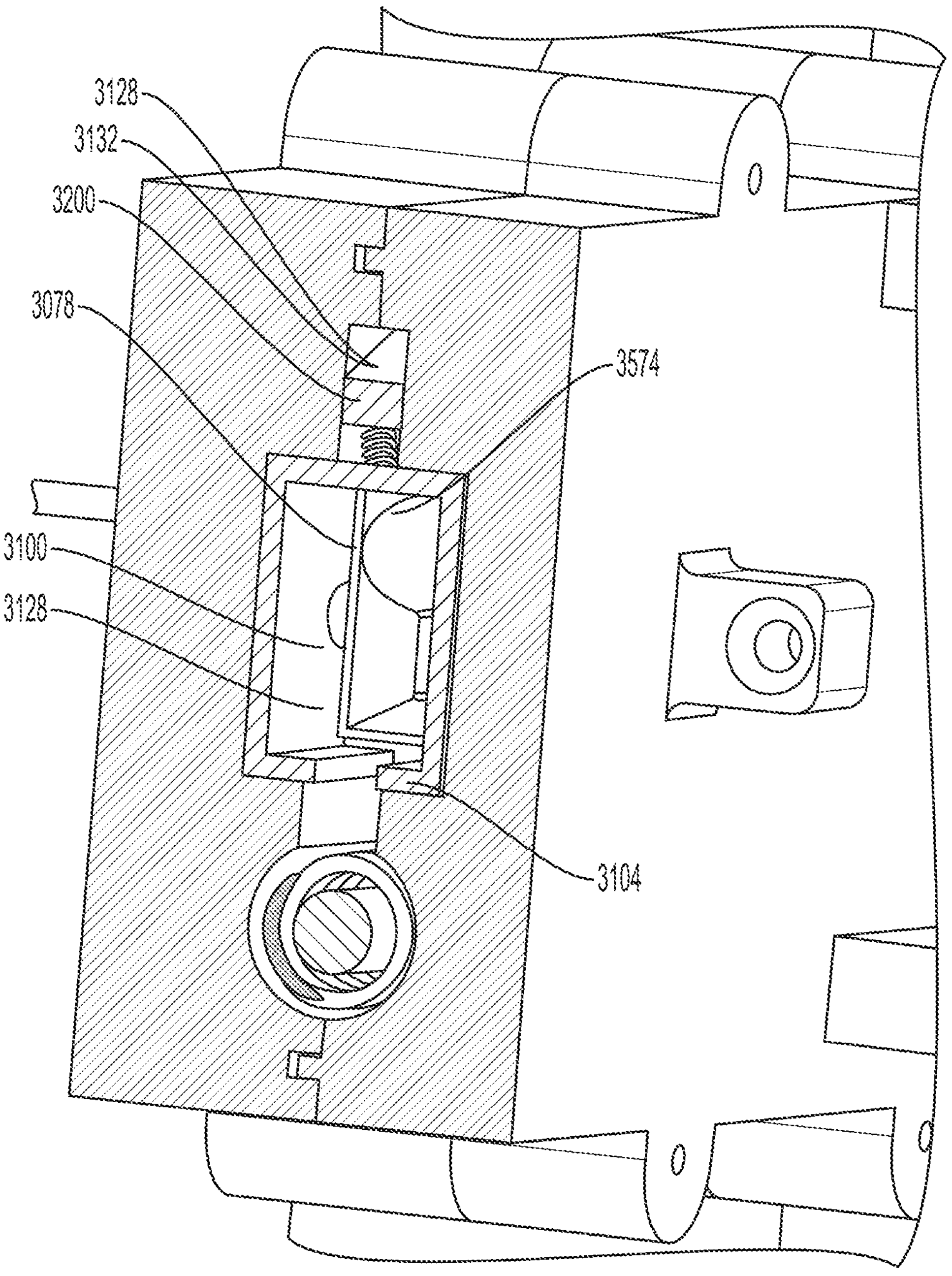
FIG. 43 is a section view taken along line 43-43 of FIG. 38.
Figure 44:
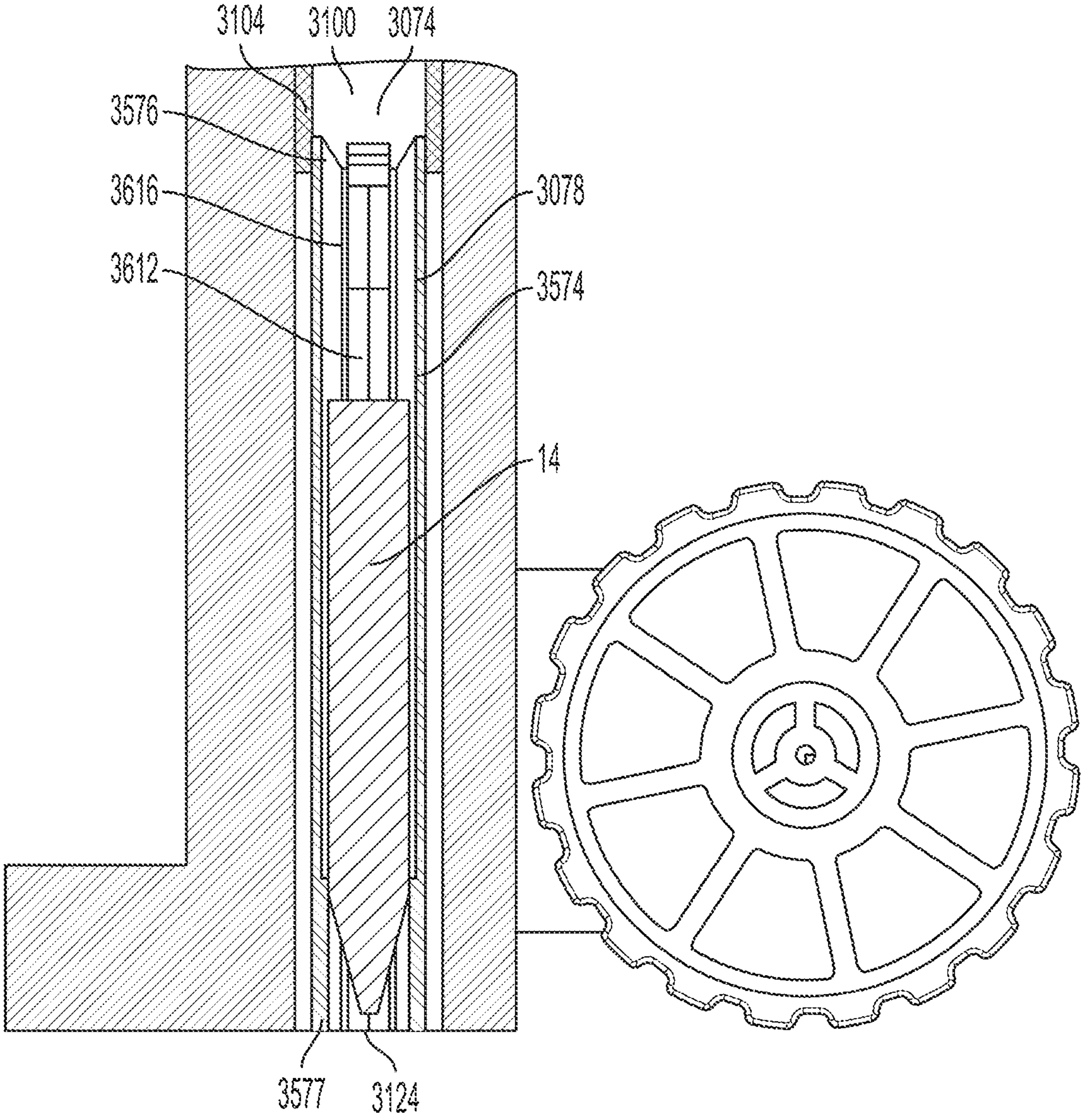
FIG. 44 is a section view taken along line 44-44 of FIG. 36.

As shown in FIG. 35, the foot driver 3250 of the peg driver 3010 includes a mount 3598 that is fixedly coupled to the shaft 3140 and a pedal 3262 that is movably coupled to the mount 3598. More specifically, the pedal 3262 is coupled to the mount 3598 such that the pedal 3262 is able to rotate with respect to the mount 3598 about an axis of rotation while being fixed axially with respect thereto (e.g., having one degree of freedom therebetween). In the illustrated embodiment, the axis of rotation is parallel to the shaft axis 3214 so that the pedal 3262 travels about a horizontal plane when the shaft axis 3214 is in an upright or vertical orientation. During use, the foot driver 3250 is configured to provide a supplemental point against which the user can apply force to the driver shaft 3140 to drive the peg 14 into the support surface 18.

In the illustrated embodiment, the foot driver 3250 also includes a series of channels or detents 3628 configured to selectively retain the pedal 3262 in one of a plurality of pre-selected positions relative to the driver shaft 3140. In some embodiment, the detents 3628 may correspond to a given set of angular displacements (e.g., every 45 degrees, every 90 degrees, and the like). In still other embodiments, the detents 3628 may be offset at an irregular interval generally corresponding to angular positions deemed useful or ergonomic. In the illustrated embodiment, the detents 3628 are formed as grooves cut into the mount 3598 into which a retention bar 3604 may rest. However, in other embodiments different forms or constructions of detents 3628 may be present.

Figure 47:
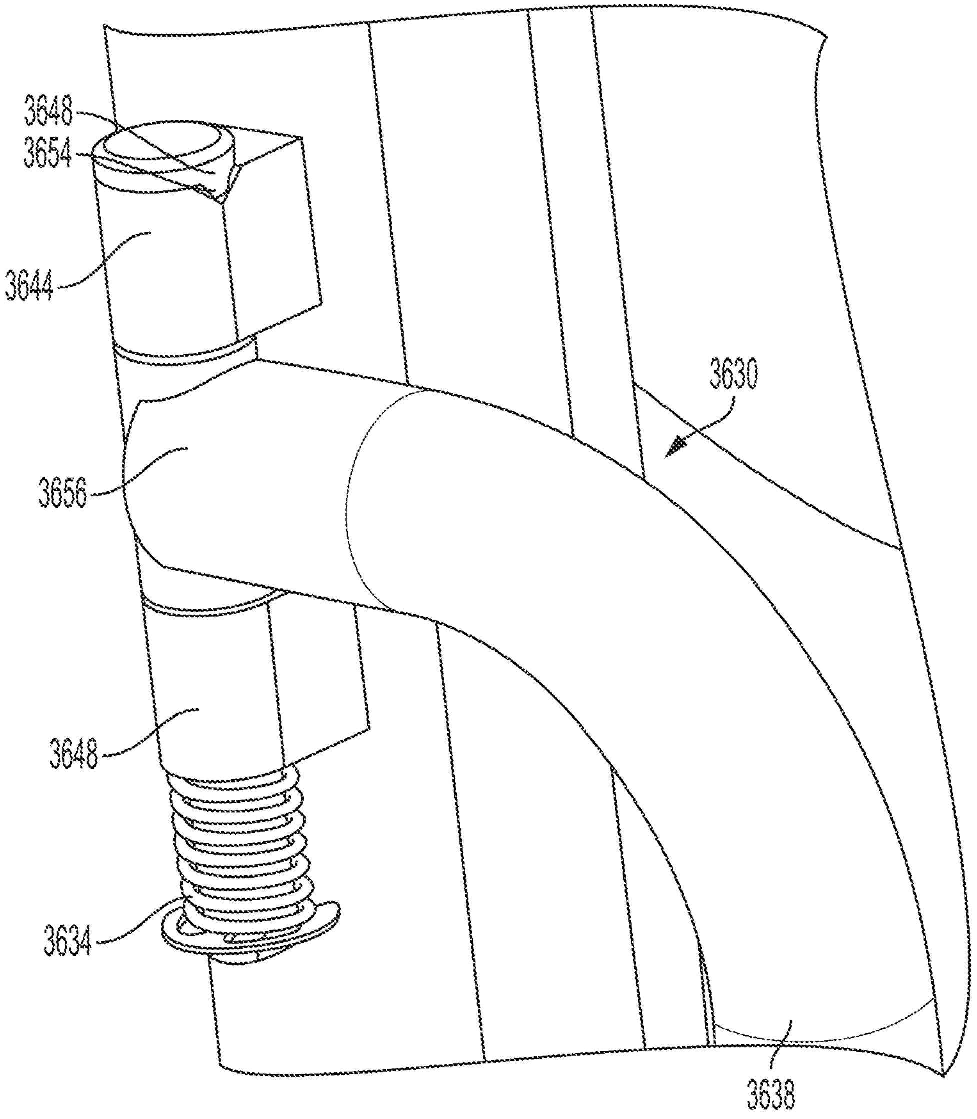
FIG. 47 is a detailed perspective view of the foot driver of the peg driver of FIG. 36.
Figure 48:
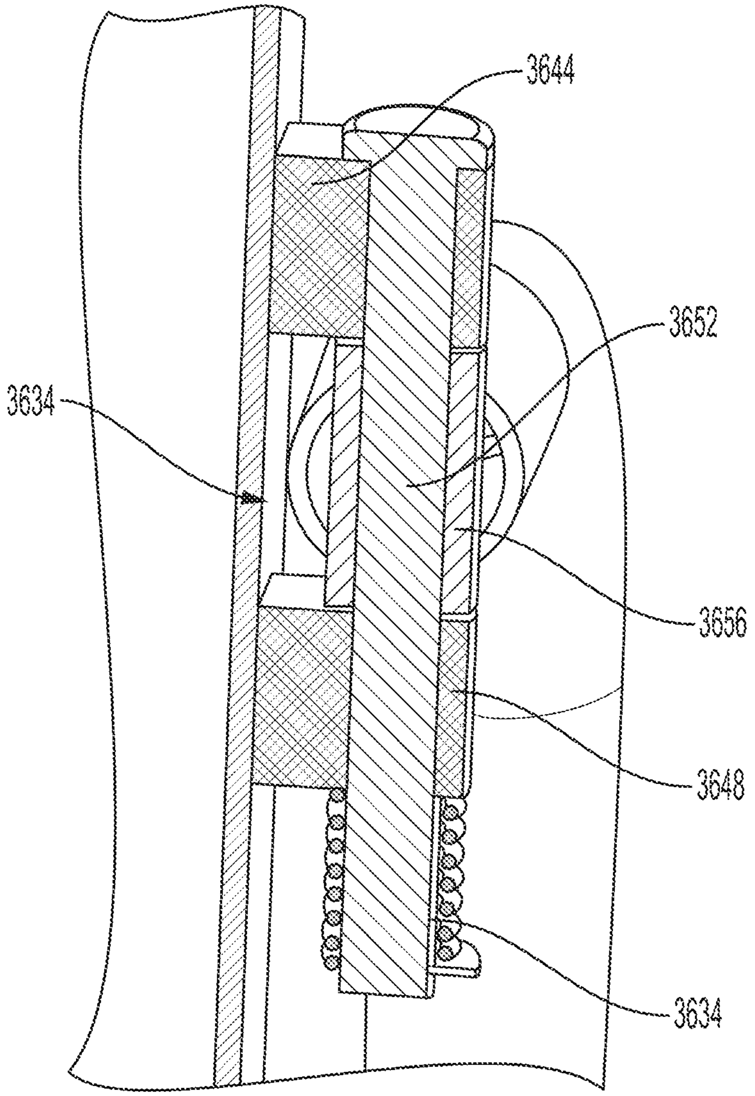
FIG. 48 is a section view of the foot driver of the peg driver of FIG. 36.

Alternatively, the peg driver 3010 may include a spring-loaded foot driver 3630, shown in FIGS. 47-48. The foot driver 3630 includes a mount 3634 that is fixedly coupled to the shaft 3140, a pedal 3638 that is moveably coupled to mount 3634, and a biasing member 3642. More specifically, the pedal 3638 is coupled to the mount 3634 such that the pedal 3638 is able to rotate with respect to the mount 3634 about an axis of rotation while being fixed axially with respect thereto (e.g., having one degree of freedom therebetween). In the illustrated embodiment, the axis of rotation is parallel to the shaft axis 3214 so that the pedal 3638 travels about a horizontal plane when the shaft axis 3214 is in an upright or vertical orientation. During use, the foot driver 3630 is configured to provide a supplemental point against which the user can apply force to the driver shaft 3140 to drive the peg 14 into the support surface 18. The pedal 3638 moves between an at-rest position and an actuated position.

In the illustrated embodiment the mount 3634 includes a first mount portion 3644, a second mount portion 3648 vertically spaced from the first mount portion 3644, a shaft 3652 that extends between the first and second mount portions 3644, 3648, and a series of notches or grooves 3654 configured to selectable retain the pedal 3638 in one of a plurality of pre-selected positions relative to the driver shaft 3140. The pedal 3638 is connected to the mount via the shaft 3652. More specifically, the shaft 3652 is inserted into a connection portion 3656 of the pedal 3638 which rotates together as a unit with the shaft 3652. During use, the biasing member 3642 is configured to bias a notch of the shaft 3752 into engagement with a corresponding groove or notch 3654 of the first mount portion 3644. In some embodiment, the grooves 3654 may correspond to a given set of angular displacements (e.g., every 45 degrees, every 90 degrees, and the like). In the illustrated embodiment the grooves 3654 have an angular displacement of 180 degrees. In the illustrated embodiment, the grooves 3654 are formed as grooves cut into the first mount portion 3654 into which a nub 3648 of the shaft 3652 can rest. As the shaft 3652 rotates relative to the mount 3634, the pedal 3638 also rotates relative to the mount 3634.

The biasing member 3634 is coupled to the shaft 3652 and biases the shaft 3652 and the pedal 3638 to the at-rest position. The biasing member 3634 is adjacent to the second mount portion 3648 and may be a spring. During use, the force supplied by the user to the foot driver 3630 must overcome the biasing member 3634 force to move the pedal 3638 from the at-rest position to the actuated position.

The boundary wire deployment assembly 3062 of the peg driver 3010 is configured to rotatably support a spool 3266 of boundary wire 16 and feed a continuous length of the boundary wire 16 from the spool 3266 and through the boundary wire feed channel 160 during installation. The spool 3266 is mounted to the peg driver 3010 via a bracket 3700. The bracket 3700, in turn, is mounted to the base 3054 (see FIG. 28). More specifically, the bracket 3700 is shaped such that the spool 3266 is positioned adjacent to the base 3054 such that the center of gravity of the spool 3266 is positioned as low as possible relative to the overall height of the peg driver 3010.

The peg driver 3010 may further include a peg basket or peg container (not shown) that can hold extra pegs. The peg basket may be coupled to the driver shaft 3140 so that it is within easy reach of the user without having to bend over or release grip of the handle 3196. The basket may encompass or be secured to the driver shaft 3140 to better manage the weight of the pegs 14 contained therein relative to the overall peg driver 3010 structure.

What is claimed is:

1. A peg driver for use with a peg having a hook member and defining a peg axis, the peg driver comprising:

a base at least partially defining a driver channel having an outlet, wherein the driver channel defines a channel axis extending through the outlet and the driver channel;

a driver shaft having a first end and a second end opposite the first end, wherein the driver shaft defines a shaft channel open to the driver channel, and wherein the first end of the driver shaft is at least partially positioned within the driver channel and is movable axially along the channel axis between a rest position and an actuated position; and a driver arm movably coupled to the driver shaft proximate to the first end thereof, wherein the driver arm is movable together with the driver shaft axially along the channel axis, and the driver arm is movable with respect to the driver shaft between a retracted position, in which the driver arm obstructs the shaft channel by a first amount, and a deployed position, in which the driver arm obstructs the shaft channel by a second amount greater than the first amount, and wherein the driver arm is configured to move from the retracted position to the deployed position as the driver shaft moves from the rest position to the actuated position.

2. The peg driver of claim 1, further comprising a recoil assembly configured to bias the driver shaft toward the rest position.

3. The peg driver of claim 1, further comprising a handle coupled to the driver shaft proximate to the second end.

4. The peg driver of claim 1, wherein the second end of the driver shaft defines an inlet gate configured to restrict possible orientations of the hook member of the peg as it passes therethrough.

5. The peg driver of claim 1, wherein the driver arm is configured to engage and drive the peg into a support surface.

6. The peg driver of claim 5, wherein moving the driver shaft from the rest position to the actuated position causes the driver arm to engage and drive the peg into the support surface.

7. The peg driver of claim 1, wherein the driver arm includes a driver surface, and wherein the driver surface is perpendicular to the channel axis when the driver arm is in the deployed position.

8. The peg driver of claim 1, wherein the driver shaft defines a shaft axis, and wherein the shaft axis is coaxial with the channel axis.

9. The peg driver of claim 1, further comprising a footpad coupled to and movable together with the driver shaft in at least an axial direction.

10. The peg driver of claim 9, wherein the footpad is rotatable relative to the driver shaft about an axis of rotation that is parallel to the channel axis.

11. The peg driver of claim 1, further comprising a retention mechanism at least partially positioned within the driver channel and configured to maintain the peg within the driver channel.

12. The peg driver of claim 11, wherein the retention mechanism is configured to maintain the peg within the driver channel such that the peg axis is parallel to the channel axis.

13. The peg driver of claim 1, further comprising a boundary wire feed channel oriented perpendicular to and offset from the channel axis.

14. The peg driver of claim 1, wherein the first end of the driver shaft is positioned a first distance from the outlet in the rest position, and wherein the first end of the driver shaft is positioned a second distance from the outlet in the actuated position that is less than the first distance.

15. The peg driver of claim 1, further comprising an adapter at least partially positioned within the shaft channel, the adapter defining an interior cross-sectional shape that corresponds to the peg to restrain a relative position of the peg translationally, angularly, and rotationally while allowing the peg to travel axially through the adapter.

16. The peg driver of claim 15, wherein the adapter is removable from the shaft channel.

17. A peg driver for driving a peg into a support surface, the peg driver comprising:

a base defining a driver channel with an inlet and an outlet;

a hollow driver shaft coupled to the base and movable between a rest position and an actuated position, the hollow driver shaft being open to the inlet and defining a first end at least partially positioned within the base; and a driver arm movably coupled with the driver shaft proximate to the first end thereof, wherein the driver arm is movable with respect to the driver shaft between a retracted position coinciding with the rest position of the hollow driver shaft, in which the driver arm permits passage of the peg through the hollow driver shaft to a loaded position between the driver arm and the outlet, and a deployed position coinciding with the actuated position of the hollow driver shaft, in which the driver arm is configured to engage the peg and drive the peg from the loaded position into the support surface.

18. The peg driver of claim 17, wherein the driver channel defines a cam surface engageable by the driver arm while the hollow driver shaft moves from the rest position toward the actuated position to move the driver arm from the retracted position to the deployed position.

19. The peg driver of claim 17, further comprising a retention mechanism in communication with the driver channel, the retention mechanism configured to hold the peg in the loaded position.

20. A peg driver for driving a peg into a support surface, the peg driver comprising:

a base defining a driver channel with an inlet and an outlet, wherein the driver channel defines a channel axis;

a hollow driver shaft coupled to the base and movable between a rest position and an actuated position, the hollow driver shaft being open to the inlet and defining a first end at least partially positioned within the base; and a driver arm movably coupled with the driver shaft proximate to the first end of the driver shaft, the driver arm defining a driver surface configured to engage the peg, wherein the driver arm is movable with respect to the driver shaft between a retracted position coinciding with the rest position of the hollow driver shaft, in which the driver arm permits passage of the peg through the hollow driver shaft to a loaded position between the driver arm and the outlet, and a deployed position coinciding with the actuated position of the hollow driver shaft, in which the driver surface is perpendicular to the channel axis and configured to engage the peg and drive the peg through the outlet.

* * * * *